US012701272B2

(12) United States Patent
Davoodi et al.

(10) Patent No.: US 12,701,272 B2
(45) Date of Patent: Aug. 4, 2026

(54) REAL TIME STREAMING IN COLLABORATIVE WORKSPACE ENVIRONMENT

(71) Applicant: Bluescape Buyer LLC, Chicago, IL (US)

(72) Inventors: Karim Davoodi, Waterloo (CA); Rupen Chanda, Austin, TX (US)

(73) Assignee: Bluescape, Chicago, IL (US)

( * ) Notice: Subject to any disclaimer, the term of this patent is extended or adjusted under 35 U.S.C. 154(b) by 0 days.

(21) Appl. No.: 18/636,130

(22) Filed: Apr. 15, 2024

(65) Prior Publication Data

US 2024/0348842 A1 Oct. 17, 2024

Related U.S. Application Data

(60) Provisional application No. 63/459,224, filed on Apr. 13, 2023.

(51) Int. Cl.
| | |
|---|---|
| *H04N 21/2187* | (2011.01) |
| *H04N 21/231* | (2011.01) |
| *H04N 21/239* | (2011.01) |
| *H04N 21/242* | (2011.01) |
| *H04N 21/266* | (2011.01) |

(52) U.S. Cl.
CPC ....... *H04N 21/2187* (2013.01); *H04N 21/231* (2013.01); *H04N 21/2393* (2013.01); *H04N 21/242* (2013.01); *H04N 21/26613* (2013.01)

(58) Field of Classification Search
CPC ............. H04N 21/2187; H04N 21/231; H04N 21/2393; H04N 21/242; H04N 21/26613
See application file for complete search history.

(56) References Cited

U.S. PATENT DOCUMENTS

| | | | |
|---|---|---|---|
| 9,270,724 B1 * | 2/2016 | Morgan .............. | H04W 12/033 |
| 10,304,037 B2 | 5/2019 | Foley et al. | |
| 11,126,325 B2 | 9/2021 | Jakobovits et al. | |

(Continued)

FOREIGN PATENT DOCUMENTS

| | | | | |
|---|---|---|---|---|
| CN | 115225934 A | * | 10/2022 | ......... H04N 21/4405 |

OTHER PUBLICATIONS

English translation version of CN 115225934 (Year: 2022).*

*Primary Examiner* — Gigi L Dubasky
(74) *Attorney, Agent, or Firm* — Haynes Beffel & Wolfeld LLP; Andrew L. Dunlap; Hannah W. Powell

(57) ABSTRACT

Systems and methods are provided for live streaming content in a collaboration session. The method includes receiving, by a server device, a first data from a first client device, the first data comprising a source of the live streamed content and a key to access the live streamed content in a collaboration workspace. The method includes, establishing, at the server device, a connection to the source of the live streamed content using the key to access the live streamed content. The method includes, receiving, by the server device, the live streamed content from the source of the live streamed content. The method includes, sending, by the server device, the live streamed content to the first client device for display in the collaboration workspace. The method includes, receiving, by the server device, a second data from the first client device for sharing the collaboration workspace including the live streamed content.

15 Claims, 55 Drawing Sheets

(56)         References Cited

U.S. PATENT DOCUMENTS

| 11,178,446 | B2 | | 11/2021 | Kiryanov et al. | |
| 2018/0176621 | A1 | * | 6/2018 | Grubbs | H04N 21/25875 |
| 2022/0124131 | A1 | * | 4/2022 | Chanda | H04L 65/1073 |
| 2024/0414412 | A1 | * | 12/2024 | Azuolas | H04N 21/4788 |

* cited by examiner

STREAMING DATA PROCESSING ENGINE
110

761

763

```
id: '62f1sd7e4d18fda1ed09c988',
type: 'video',
title: 'name.mp4',
actualHeight: 1080,
actualWidth: 1920,
rect: [12969, -40322, 22345, -35048],
order: 80408,
originalFilename: 'file.mp4',
assetPath: 'sessions/objects/MCxOjQK8WTooI-hQatlb/62f1sd7e4d18fda1ed09c988.mp4',
thumbBasename: 'sessions/objects/MCxOjQK8WTooI-hQatlb/62f1sd7e4d18fda1ed09c988_thumb',
thumbExt: 'PNG',
```

```
id: '62f1sd7e4d18fda1ed09c988',
type: 'video',

// New field
livevideo: {
    type: '',          // string, 'RTMP' | 'LOCAL_SCREEN' | 'LOCAL_VIDEO'
    audioSource: '',   // string, the name of audio source, ex: 'MacBook Pro Microphone'
    videoSource: '',   // string, the name of video source, ex: 'FaceTime HD Camera'
    resolution: '',    // string
    mask: [0, 0, 0, 0],// rect of float value between 0 and 1
    flipHorizontal: false, // boolean,
    recordDurationSec: 0,  // int,
},  // rest of video fields ....
```

FIG. 11D

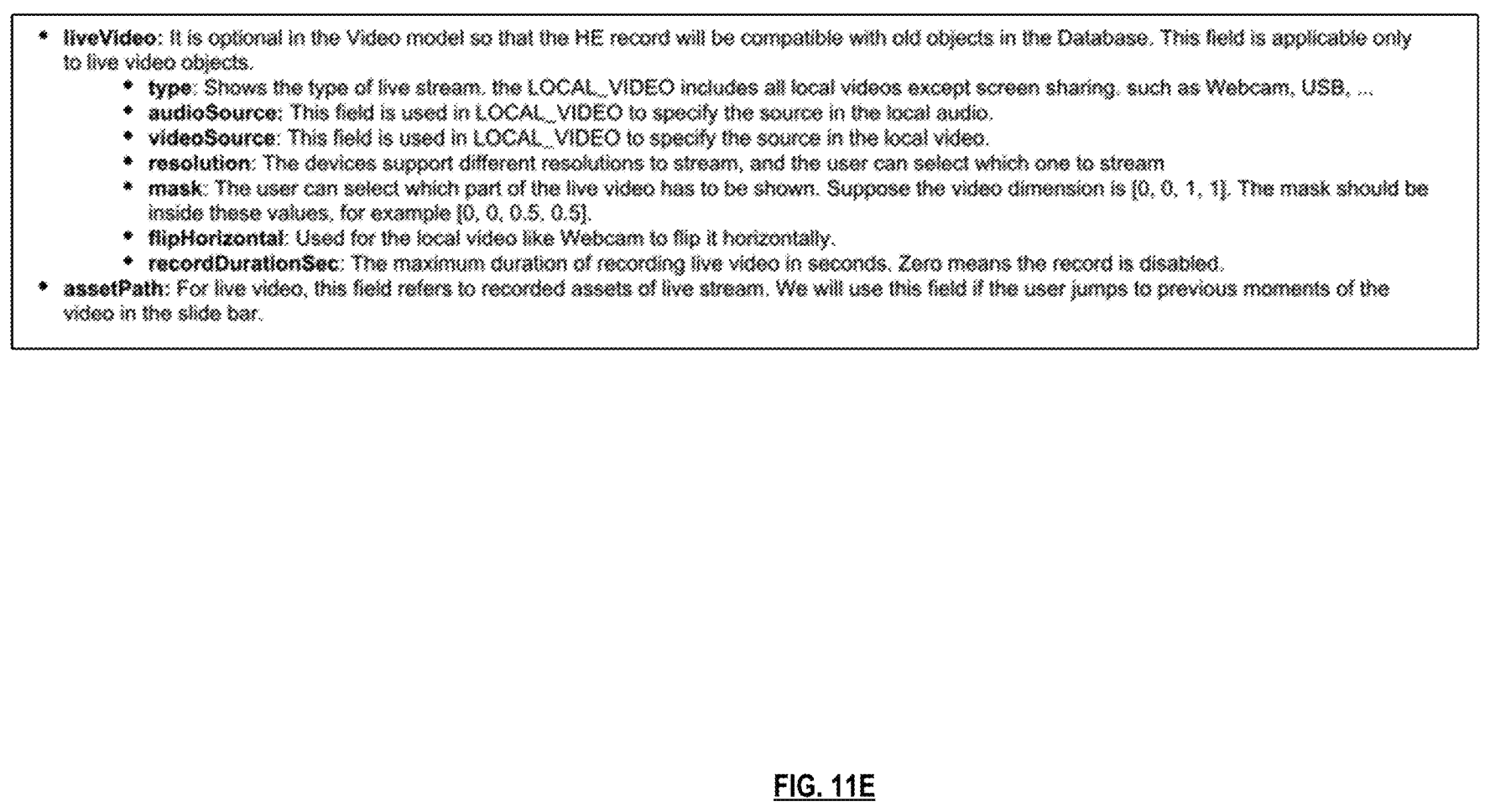

* liveVideo: It is optional in the video model so that the HE record will be compatible with old objects in the Database. This field is applicable only to live video objects.
  * type: Shows the type of live stream, the LOCAL_VIDEO includes all local videos except screen sharing, such as Webcam, USB, ...
  * audioSource: This field is used in LOCAL_VIDEO to specify the source in the local audio.
  * videoSource: This field is used in LOCAL_VIDEO to specify the source in the local video.
  * resolution: The devices support different resolutions to stream, and the user can select which one to show.
  * mask: The user can select which part of the live video has to be shown. Suppose the video dimension is [0, 0, 1, 1]. The mask should be inside these values, for example [0, 0, 0.5, 0.5].
  * flipHorizontal: Used for the local video like Webcam to flip it horizontally.
  * recordDurationSec: The maximum duration of recording live video in seconds. Zero means the record is disabled.
* assetPath: For live video, this field refers to recorded assets of live stream. We will use this field if the user jumps to previous moments of the video in the slide bar.

FIG. 11E

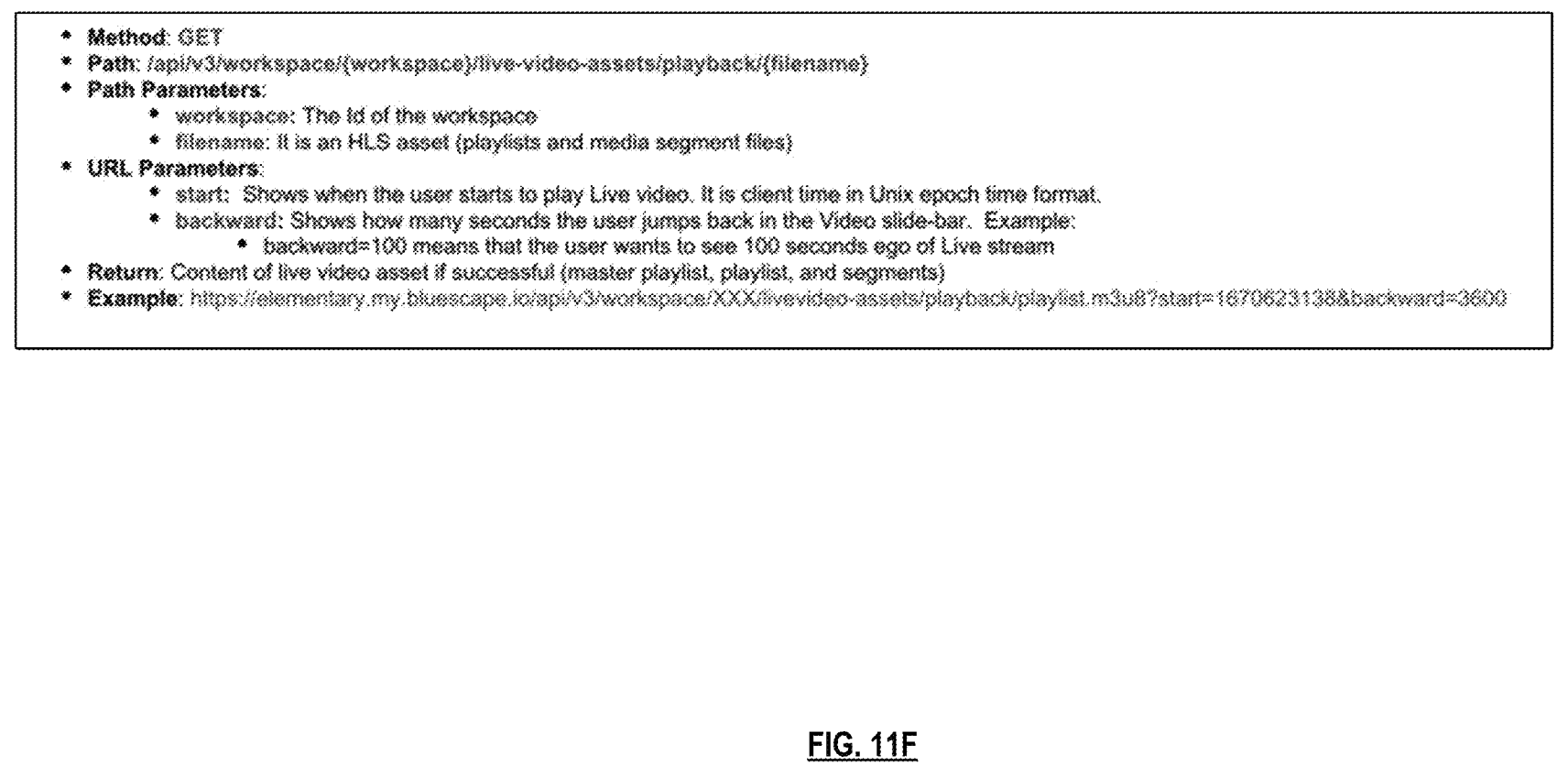

- Method: GET
- Path: /api/v3/workspace/{workspace}/live-video-assets/playback/{filename}
- Path Parameters:
  - workspace: The Id of the workspace
  - filename: It is an HLS asset (playlists and media segment files)
- URL Parameters:
  - start: Shows when the user starts to play Live video. It is client time in Unix epoch time format.
  - backward: Shows how many seconds the user jumps back in the Video side-bar. Example:
    - backward=100 means that the user wants to see 100 seconds ago of Live stream
- Return: Content of live video asset if successful (master playlist, playlist, and segments)
- Example: https://{hostname}.my.bluescape.io/api/v3/workspace/XXX/live-video-assets/playback/playlist.m3u8?start=1670631388&backward=2600

FIG. 11F

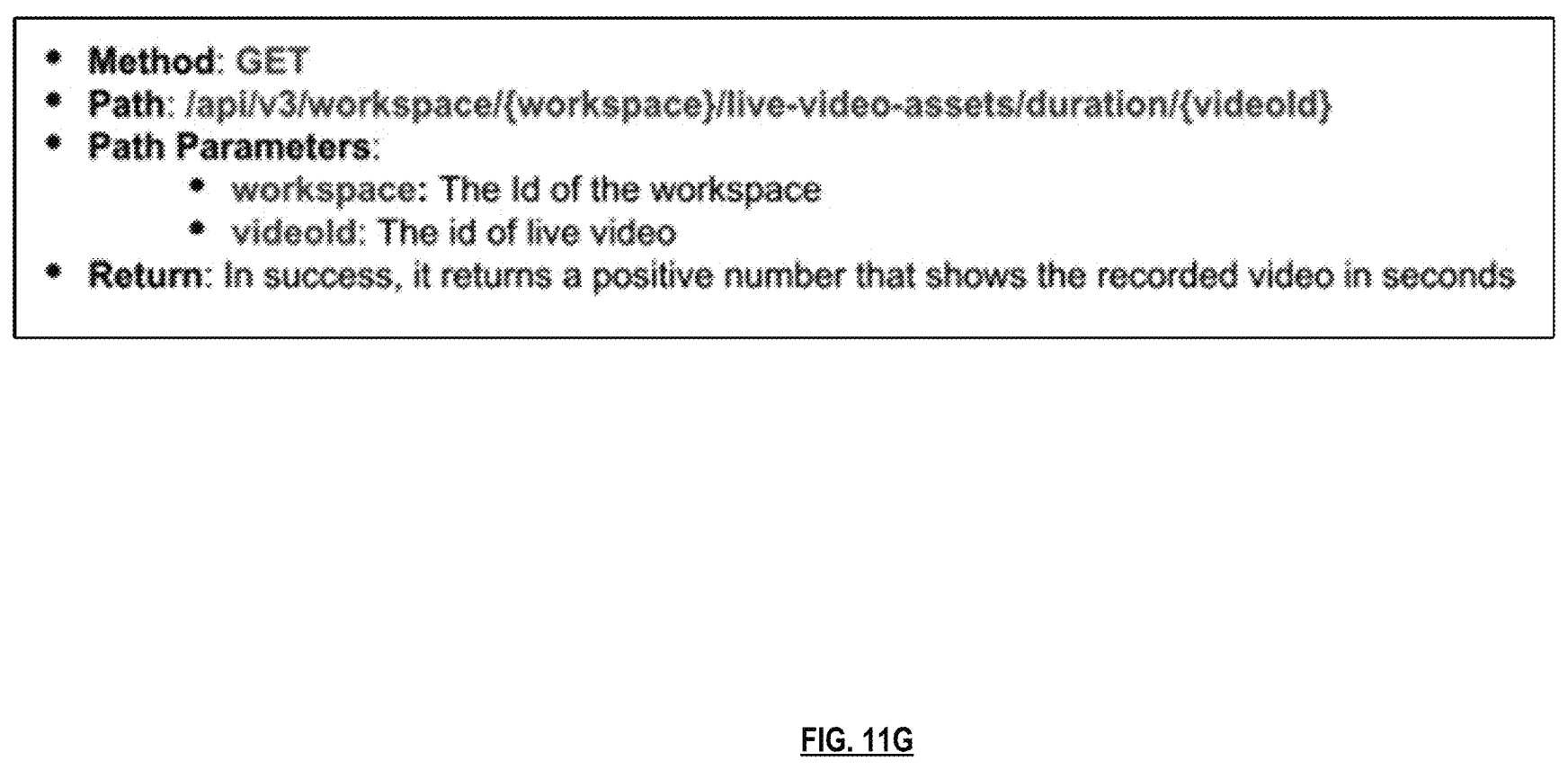

- Method: GET
- Path: /api/v3/workspace/{workspace}/live-video-assets/duration/{videoId}
- Path Parameters:
  - workspace: The Id of the workspace
  - videoId: The Id of live video
- Return: In success, it returns a positive number that shows the recorded video in seconds

FIG. 11G

- Methods: POST, PUT, GET, DELETE
- Path: /api/v3/workspace/(workspace)/live-video-assets/stream-key/((Id)
- Path Parameters:
  - workspace: The Id of the workspace
  - Id: The Id of the stream key in GET, PUT, and DELETE
- Body parameter in POST:

```
{
  'stream_key': 'string', // The stream key
  'actor_id': 'string', // User ID, the owner of video object
  'target_id': 'string', // The live video object ID
  'workspace_id': 'string', // The workspace ID
}
```

FIG. 11H

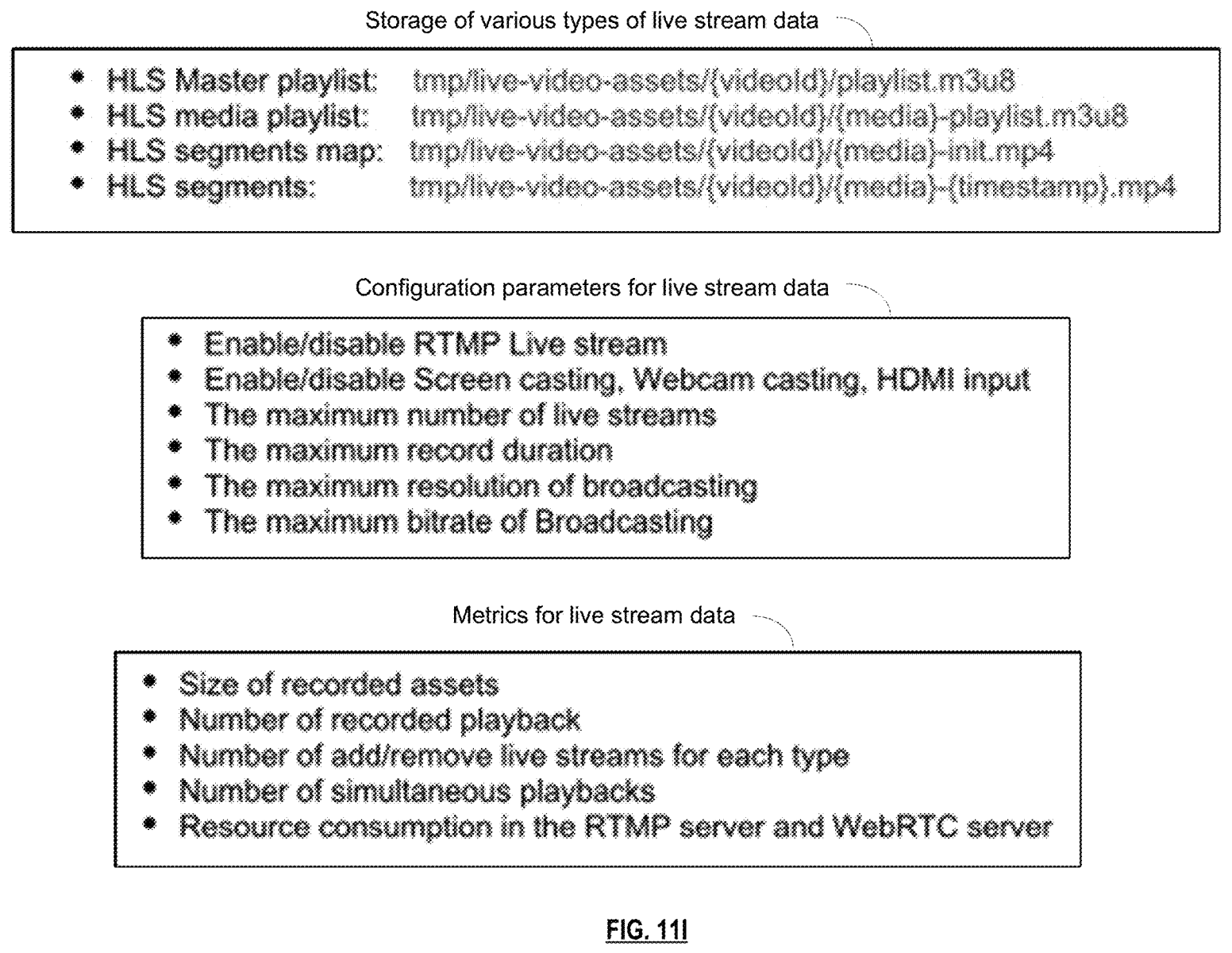

Storage of various types of live stream data

- HLS Master playlist:   /tmp/live-video-assets/{videoId}/playlist.m3u8
- HLS media playlist:   /tmp/live-video-assets/{videoId}/{media}-playlist.m3u8
- HLS segments map:   /tmp/live-video-assets/{videoId}/{media}-init.mp4
- HLS segments:   /tmp/live-video-assets/{videoId}/{media}-{timestamp}.mp4

Configuration parameters for live stream data

- Enable/disable RTMP Live stream
- Enable/disable Screen casting, Webcam casting, HDMI input
- The maximum number of live streams
- The maximum record duration
- The maximum resolution of broadcasting
- The maximum bitrate of Broadcasting Metrics for live stream data

- Size of recorded assets
- Number of recorded playback
- Number of add/remove live streams for each type
- Number of simultaneous playbacks
- Resource consumption in the RTMP server and WebRTC server

FIG. 11I

REAL TIME STREAMING IN COLLABORATIVE WORKSPACE ENVIRONMENT

PRIORITY APPLICATION

This application claims the benefit of U.S. Provisional Patent Application No. 63/459,224, entitled, "Real Time Streaming in Collaborative Workspace Environment," filed on 13 Apr. 2023, which application is incorporated herein by reference.

FIELD OF INVENTION

The present technology relates to collaboration systems that enable users to actively collaborate in a virtual workspace in a collaboration session. More specifically, the technology relates to collaboration incorporating real time streaming data.

BACKGROUND

Collaboration systems are used in a variety of environments to allow users to participate in content generation and content review. Users of a collaboration system can join collaboration sessions from locations around the world.

During a collaboration session, the participants of a collaboration session can jointly review digital assets to develop consensus in real time scenarios. In some cases, such digital assets may include live streaming data from external sources such as camera feeds, etc. Each participant of the collaboration session may need to establish a separate connection to the live streaming data. This type of scenario can cause various issues such as asynchronous playback of the live streaming data on different client devices. The users may not be able to review a particular instance in the video live stream due to asynchronous playback of live streaming data. It then becomes difficult to develop a consensus in real time amongst participants of the collaboration session.

An opportunity arises to provide a method for synchronous playback of live stream data in a collaboration workspace.

SUMMARY

A first system and a first method for providing live streamed content in a collaboration session are disclosed. The method includes receiving, by a server device, a first data from a first client device. The first data comprises a source of the live streamed content and a key to access the live streamed content in a collaboration workspace. The method includes establishing, at the server device, a connection to the source of the live streamed content using the key to access the live streamed content. The method includes receiving, by the server device, the live streamed content from the source of the live streamed content. The method includes sending, by the server device, the live streamed content to the first client device for display in the collaboration workspace. The method includes receiving, by the server device, a second data from the first client device, including at least a second user's identifier using a second client device, for sharing the collaboration workspace including the live streamed content. The method includes sending, by the server device, collaboration data including the live streamed content to the second client device, and causing display of the live streamed content in the collaboration workspace at the second client device.

In one implementation, the method includes storing, by the server device, the live streamed content received from the source of the live streamed content in a storage linked to the server device. The method includes receiving, by the server device, a request from the first client device to playback a recorded copy of the live streamed content. The method includes sending, by the server device, the stored live streamed content to the first client device to playback the recorded copy of the live streamed content.

In one implementation, the method includes establishing a leader-follower type collaboration session wherein in the leader-follower type collaboration session, the first client device is a leader and the second client device is a follower. The method includes synchronizing the playback of the recorded copy of the live streamed content at the second client device with the playback of the recording copy of the live streamed content at the first client device.

In one implementation, the method includes receiving, by the server device, a third data from the first client device wherein the third data includes a starting timestamp and an ending timestamp corresponding to a segment of the live streamed content and an identifier of the live streamed data. The method includes storing, by the server device in a storage linked to the server device, the third data identifying the segment of the live streamed content.

The third data can include a segment identifier identifying the segment of the live streamed content. The first data, the second data and the third data can include inputs provided by the users via user interface elements displayed on the collaboration workspace. The first, second and third does not imply any particular order or priority amongst the data or the inputs.

In one implementation, the method includes receiving, by the server device, the segment identifier from the first client device. The method includes retrieving, by the server device, from the storage, the segment of the live streamed content by querying the storage using the segment identifier received from the first client device. The method includes sending, by the server device, the retrieved video segment to the first client device for playback in the collaboration workspace.

Systems which can be executed using the methods are also described herein.

Computer program products which can execute the methods presented above are also described herein (e.g., a non-transitory computer-readable recording medium having a program recorded thereon, wherein, when the program is executed by one or more processors the one or more processors can perform the methods and operations described above).

A second system and a second method for providing live streamed content in a collaboration session are disclosed. The method includes, receiving, by a server device, a first data from a first client device, the first data comprising live feed from an application running at the first client device and a first key to access the application from a collaboration workspace. The method includes, receiving, by the server device, a second data from a second client device, the second data comprising a second key to access live feed from the application running at the first client device. The method includes, matching, by the server device, the second key received from the second client device to the first key received from the first client device. The method includes, receiving, by the server device, live stream data of the application from the first client device. The method includes sending, by the server device, when the first key matches the second key, the live streamed data of the application to the second client device for display in the collaboration workspace.

In one implementation, the method includes, receiving, at the server device, an data from the first client device, the data comprising a source of a live streamed content and a key to access the live streamed content in a collaboration workspace. The method includes, establishing, by the server device, a connection with the source of the live streamed content using the key to access the live streamed content. The method includes, receiving, by the server device, the live streamed content from the source of the live streamed content. The method includes, sending, by the server device, the live streamed content to the first client device and the second client device for display in the collaboration workspace.

In one implementation, the method includes, receiving, by the server device, a third data from the first client device wherein the third data includes a starting timestamp and an ending timestamp corresponding to a segment of the live streamed content and an identifier of the live streamed data. The method includes, storing, by the server device in a storage linked to the server device, the third data identifying the segment of the live streamed content.

The third data can include a segment identifier identifying the segment of the live streamed content. The first data, the second data and the third data can include inputs provided by the users via user interface elements displayed on the collaboration workspace. The first, second and third does not imply any particular order or priority amongst the data or the inputs.

In one implementation, the method include, receiving, by the server device, the segment identifier from the first client device. The method includes, retrieving, by the server device, from the storage, the segment of the live streamed content by querying the storage using the segment identifier received from the first client device. The method includes, sending, by the server device, the retrieved video segment to the first client device for playback in the collaboration workspace.

Systems which can be executed using the methods are also described herein.

Computer program products which can execute the methods presented above are also described herein (e.g., a non-transitory computer-readable recording medium having a program recorded thereon, wherein, when the program is executed by one or more processors the one or more processors can perform the methods and operations described above).

Other aspects and advantages of the present technology can be seen on review of the drawings, the detailed description, and the claims, which follow.

BRIEF DESCRIPTION OF THE DRAWINGS

The technology will be described with respect to specific embodiments thereof, and reference will be made to the drawings, which are not drawn to scale, described below.

FIGS. 2A, 2B, 2C, 2D, 2E, 2F, 2G, 2H, 2I and 2J present various user interface elements for initiating, viewing and managing live streamed data in a collaboration workspace.

FIGS. 11A, 11B, 11C, 11D, 11E, 11F, 11G, 11H and 11I present an example implementation of live streaming technology for use in a collaboration workspace.

DETAILED DESCRIPTION

Figure 1A:
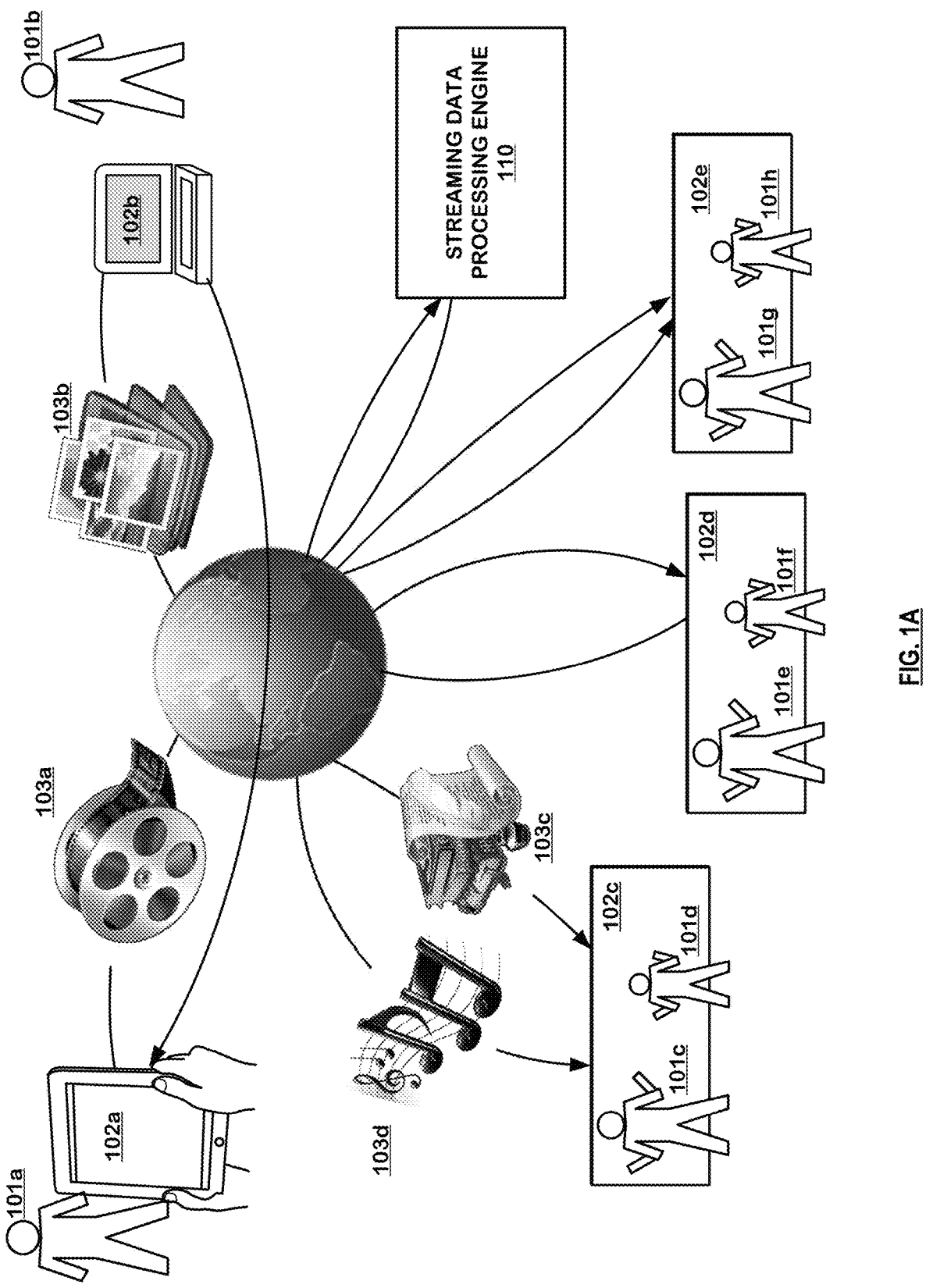
FIGS. 1A and 1B illustrate example aspects of a system implementing logic for streaming live data in a collaboration session.

A detailed description of embodiments of the present technology is provided with reference to FIGS. 1A-1I.

The following description is presented to enable a person skilled in the art to make and use the technology and is provided in the context of a particular application and its requirements. Various modifications to the disclosed embodiments will be readily apparent to those skilled in the art, and the general principles defined herein may be applied to other embodiments and applications without departing from the spirit and scope of the present technology. Thus, the present technology is not intended to be limited to the embodiments shown, but is to be accorded the widest scope consistent with the principles and features disclosed herein.

Introduction

Collaboration systems are used in a variety of environments to allow users to contribute and participate in content generation and review. Users of collaboration systems can join collaboration sessions from remote locations around the globe. The participants of a collaboration session can review, edit, organize and comment on a variety of digital asset types such as documents, slide decks, spreadsheets, images, videos, software applications, program code, user interface designs, search results from one or more sources of digital assets or search engines, etc.

The technology disclosed allows sharing of live stream content such as videos, screen casting, etc. using a shared collaboration workspace in a collaboration session. Participants of the collaboration session can view live streamed content in the shared collaboration workspace and new participants can be easily included in the collaboration session. The technology disclosed allows live streaming of locally sourced and remotely sourced data.

The locally sourced data can be live streamed in a collaboration session using the shared collaboration workspace. The locally sourced data can include data from the local client device (also referred to as client-side computing device). For example, such data can be sourced from a USB storage device connected to the client device or from another local storage linked to the client device. The live streaming data can be sourced from other types of devices such as a camera connected the computing device. The live streaming data can also include screen casting of content from the client device. The user can screen cast the entire display screen linked to the computing device or one or more selected applications running on the client device. For example, a user can share live feed from an application running on the user's client device. Examples of such applications can include a software development environment in which a first user is writing program code in the programming environment (such as a program editor) and one or more other users are viewing the development environment in a live feed. Another example of such as application is video player that is playing back a video on a client device. The video can be stored locally on a storage connected to the client device. The user can share the video feed from her client device with other users participating in the collaboration session.

The remotely sourced data can include live stream from one or more remote cameras (such as IP cameras) connected to the client device over the Internet via one or more servers. Remote cameras can be placed at different locations around the world. The remote cameras can be stationary, i.e., fixed at a location or can be mobile such as installed on a drone, mounted on a vehicle, etc.

The live streaming data obtained from local or remote sources is placed in a shared collaboration workspace which is then shared with participants of the collaboration session. The shared collaboration workspace (also referred to as collaboration workspace, virtual workspace or workspace) can be implemented using a spatial event map technology. The collaboration server shares at least a portion of the spatial event map with each participant of the collaboration session. Further details of the shared collaboration workspace as implemented using the spatial event map technology are presented below. The technology disclosed provides an easy and efficient way of multi-party or multi-user collaboration using the spatial event map technology.

The technology disclosed allows recording of locally sourced or remotely sourced live streamed data. The live streamed data is recorded by a server (also referred to as a collaboration server) and can be stored in a storage linked to the server or in the server itself. The recorded live stream data can be played back by a user in the shared collaboration workspace in a collaboration session. For example, if a user wants to review a portion or a segment of a live stream data in detail with other participants or by herself, the user can use tools provided by the technology disclosed to review the recorded live stream data. The user can also create one or more clips of the live stream data for review with other participants in the collaboration session. The recorded video can be paused and played back at desired timestamps for detailed review and analysis of the content. The users can annotate on the video. The annotations can be stored with image frames on which the annotation is added by a user. The user can add comments and link other documents to videos. The shared collaboration workspace stores the data associated with the video using the spatial event map.

The technology disclosed allows participants to collaborate using a variety of collaboration models. For example, in a leader-follower collaboration model, one participant acts as a leader of the collaboration session and other participants in the collaboration session follow the leader and view portions of the digital whiteboard (also referred to as a workspace, a virtual workspace, a collaboration workspace, a digital canvas, a display canvas and/or a canvas) on which the leader is working or view a portion of the workspace that is being presented by the leader. In another collaboration model, multiple participants can simultaneously work on digital assets in the workspace and co-edit digital assets in a digital whiteboard at different locations.

When a recorded video is played back by a user, the collaboration session can be conducted in a leader-follower collaboration model. The user who plays back the recorded video becomes the leader and other participants of the collaboration session follow the leader and view the recorded video as played back by the leader. The leader can pause the video during the playback, rewind or fast forward the video playback. The followers (or following participants) view the same content as the leader is viewing. The leader can also make annotations on the video (or images from the video). When the leader invokes the annotation function, the video playback pauses and the leader can annotate on the paused frame of the video. The annotation is stored in the spatial event map and linked to the frame on which it was annotated. The annotations, notes or other files linked to the video are stored in the spatial event map and available to the users of the collaboration for review during this session or any session in the future in which they collaborate using the same shared collaboration workspace.

In one implementation, the technology disclosed implements a synchronous video playback of the recorded video. In synchronous video playback, the technology disclosed synchronizes the video playback at the followers' computing devices to video playback at the leader's computing device so that all participants of the collaboration session watch the video playback in a synchronized manner. This allows synchronized playback of the recorded video (or recorded screen casting) even when some participants may be located at geographically remote locations from the location of the server and further some participants may have slower Internet connection as compared to other participants. Further details of the synchronized video playback are presented in U.S. patent application Ser. No. 16/845,983, entitled, "SYNCHRONOUS VIDEO CONTENT COLLABORATION ACROSS MULTIPLE CLIENTS IN A DISTRIBUTED COLLABORATION SYSTEM," filed on Apr. 10, 2020, now issued as U.S. Pat. No. 11,178,446, which is fully incorporated into this application by reference.

The following sections present some key elements of the collaboration system, followed by details of the technology disclosed.

Workspace or Virtual Workspace

In order to support an unlimited amount of spatial information for a given collaboration session, the technology disclosed provides a way to organize a virtual space termed the "workspace" (also referred to as a "virtual workspace", "collaboration workspace" or a "digital whiteboard"). The workspace can be characterized by a multi-dimensional and in some cases two-dimensional plane with essentially unlimited extent in one or more dimensions for example, in such a way that new content can be added to the space. The content can be arranged and rearranged in the space, and a user can navigate from one part of the space to another.

Digital assets (or objects), in a collaboration session, are arranged on the workspace. Their locations in the workspace are important for performing the gestures. One or more digital displays in the collaboration session can display a portion of the workspace, where locations on the display are mapped to locations in the workspace. The tools for operating on the digital assets are also displayed on the workspace along a top edge of the digital display and/or along the left and right edges of the digital display. The tools for creating video clips or for playback of recorded videos are presented in a toolbar. Multiple live stream objects can be created in a workspace and arranged in any manner as required by the user. Multiple users can also create live stream objects in the same shared collaboration workspace in a collaboration session.

Viewport

One or more digital displays in the collaboration session can display a portion of the workspace, where locations on the display are mapped to locations in the workspace. A mapped area, also known as a viewport within the workspace is rendered on a physical screen space. Because the entire workspace is addressable using coordinates of locations, any portion of the workspace that a user may be viewing itself has a location, width, and height in coordinate space. The concept of a portion of a workspace can be referred to as a "viewport". The coordinates of the viewport are mapped to the coordinates of the screen space. The coordinates of the viewport can be changed which can change the objects contained within the viewport, and the change would be rendered on the screen space of the display client. Details of the workspace and the viewport are presented in U.S. patent application Ser. No. 15/791,351, entitled, "Virtual Workspace Including Shared Viewport Markers in a Collaboration System," filed on Oct. 23, 2017, now issued as U.S. Pat. No. 11,126,325, which is fully incorporated into this application by reference.

In case of a leader-follower model of collaboration, the viewport at the follower's computing device displays the same portion of the workspace as displayed in the viewport of the leader's computing device. During playback of the recorded video, the collaboration session can be conducted in a leader-follower type of collaboration. In this case, the playback of the video at the followers' computing devices is synchronized to playback of the video at the leader's computing device to facilitate collaboration and discussion related to the content in the video.

Spatial Event Map

The "unlimited workspace" problem includes the need to track how people (or users) and devices interact with the workspace over time. In order to solve this core problem, the technology disclosed includes a so-called "spatial event map". The spatial event map contains information needed to define digital assets and events in a workspace. It is useful to consider the technology from the point of view of space, events, maps of events in the space, and access to the space by multiple users, including multiple simultaneous users. The spatial event map can be considered (or represent) a sharable container of digital assets that can be shared with other users. The spatial event map includes location data of the digital assets in a two-dimensional or a three-dimensional space. The technology disclosed uses the location data and other information about the digital assets (such as the type of digital asset, shape, color, etc.) to display digital assets on the digital display linked to computing devices used by the participants of the collaboration session. The technology disclosed builds the live streaming of videos, live streaming of screen casts and live streaming of other types of data on top of the spatial event map technology. The spatial event map provides the required data to share the live streaming objects with users in a collaboration session. The spatial event map allows playback of the recorded live streaming data in the shared collaboration workspace.

A spatial event map contains data related to digital assets in the workspace for a given collaboration session. The spatial event map defines arrangement of digital assets on the workspace. The locations of digital assets in the workspace are important for performing gestures or for performing other types of operations such as edits to contents of digital assets, etc. The spatial event map contains information needed to define digital assets, their locations, and events in the workspace. A spatial events map system, maps portions of workspace to a digital display e.g., a touch enabled display. Details of workspace and spatial event map are presented in our U.S. application Ser. No. 14/090,830, entitled, "Collaboration System Including a Spatial Event Map," filed Nov. 26, 2013, now issued as U.S. Pat. No. 10,304,037, which is included in this application and fully set forth herein. Any changes to the digital assets are reflected in the spatial event map using the events. The spatial event map can be shared with other users and multiple users can collaboratively work on the refinements, editing, selection, curation of digital assets.

The server node (or server-side node or server-side network node) provides at least a portion of the spatial event map identifying events in the virtual workspace to client nodes (or client-side nodes or client-side network nodes). The spatial event map allows for displaying or rendering a portion of the shared virtual workspace in the display space on the display of the client nodes. The shared virtual workspace can include one or more digital assets. As updates are detected to the shared virtual workspace in response to input events at one or more client nodes, the server node sends update events to spatial event maps at the other client nodes.

The client node receives, from the server node, at least a portion of the spatial event map identifying events in the virtual workspace. The spatial event map allows the client node to display or render at least a portion of the shared virtual workspace. The shared virtual workspace can include one or more digital assets. The client node can send update events to server node in response to input events at the client node. The client node can receive updates events from the server node in response to input events at one or more other client nodes.

Space

In order to support an unlimited amount of spatial information for a given collaboration session, the technology disclosed provides a way to organize digital assets in a virtual space termed as the workspace, which can, for example, be characterized by a 2-dimensional plane (along X-axis and Y-axis) with essentially unlimited extent in one or both dimensions, for example. The workspace is organized in such a way that new content such as digital assets can be added to the space, that content can be arranged and rearranged in the space, that a user can navigate from one part of the space to another, and that a user can easily find needed things in the space when it is needed. The technology disclosed can also organize content on a 3-dimensional workspace (along X-axis, Y-axis, and Z-axis).

Events

Interactions with the workspace are handled as events. People, via tangible user interface devices, and systems can interact with the workspace. Events have data that can define or point to a target digital asset to be displayed on a physical display, and an action as creation, modification, movement within the workspace and deletion of a target digital asset, and metadata associated with them. Metadata can include information such as originator, date, time, location in the workspace, event type, security information, and other metadata.

Tracking events in a workspace enables the system to not only present the spatial events in a workspace in its current state, but to share it with multiple users on multiple displays, to share relevant external information that may pertain to the content and understand how the spatial data evolves over time. Also, the spatial event map can have a reasonable size in terms of the amount of data needed, while also defining an unbounded workspace.

Environment

FIG. 1A illustrates example aspects of a digital display collaboration environment. In the example, a plurality of users 101a, 101b, 101c, 101d, 101e, 101f, 101g and 101h (collectively 101) may desire to collaborate with each other when reviewing various types of content including digital assets including documents, images, videos and/or web applications or websites. The plurality of users may also desire to collaborate with each other in the creation, review, and editing of digital assets such as complex images, music, video, documents, and/or other media, all generally designated in FIG. 1A as 103a, 103b, 103c, and 103d (collectively 103). The participants or users in the illustrated example use a variety of computing devices configured as electronic network nodes, in order to collaborate with each other, for example a tablet 102a, a personal computer (PC) 102b, many large format displays 102c, 102d, 102e (collectively devices 102). The participants can also use one or more mobile computing devices and/or tablets with small format displays to collaborate. In the illustrated example the large format display 102c, which is sometimes referred to herein as a "wall", accommodates more than one of the users, (e.g., users 101c and 101d, users 101e and 101f, and users 101g and 101h).

In an illustrative embodiment, a display array can have a displayable area usable as a screen space totaling on the order of 6 feet in height and 30 feet in width, which is wide enough for multiple users to stand at different parts of the wall and manipulate it simultaneously. It is understood that large format displays with displayable area greater than or less than the example displayable area presented above can be used by participants of the collaboration system. The one or more large format displays 102c, 102d and/or 102e can have display sizes up to 85 inches (around 7 feet) or more. In some cases, a large format display such as 102c, 102d and/or 102e comprises two or more digital displays or large format digital displays arranged horizontally (or vertically) to provide larger display sizes. In such cases, large format displays can be arranged in a two-by-two format in which four large format displays are arranged in a 2×2 matrix organization to create larger display area or display surface. In some cases, more than four large format digital displays may be arranged to provide even larger display surfaces. The technology disclosed allows participants of the collaboration session to collaborate efficiently using large format digital displays (or large format display screens).

The user devices, which are referred to as client nodes, have displays on which a screen space is allocated for displaying events in a workspace. The screen space for a given user may comprise the entire screen of the display, a subset of the screen, a window to be displayed on the screen and so on, such that each has a limited area or extent compared to the virtually unlimited extent of the workspace.

The collaboration system of FIG. 1A includes a streaming data processing engine 110 that implements logic to receive a source of the live streamed content and a key to access the live streamed content from a client node via a collaboration workspace. The streaming data processing engine 110 includes logic to establish a connection (via the collaboration server or the server node) to the source of the live streamed content using the key to access the live streamed content. The streaming data processing engine 110 that implements logic to receiving the live streamed content from the source of the live streamed content. The streaming data processing engine 110 includes logic to facilitate sending of the live streamed content to one or more client nodes for display in the collaboration workspace. The streaming data processing engine 110 includes logic to the send the live streamed content to one or more other client nodes when identifiers of such client devices are received from the client device of a leader of the collaboration session. Theses additional client nodes can live stream the content in a follower mode. In this leader-follower collaboration model, the leader can pause or stop the distribution of the live streamed content to followers. The streaming data processing engine 110 can include logic to store live streamed content in a storage device accessible to the collaboration server. The leader of the collaboration session can access the recorded content and playback the recorded content or playback a portion of the recorded content for in the collaboration session for review with other participants (or followers) in the collaboration session. The streaming data processing engine 110 includes logic to synchronize the playback of the recorded copy of the live streamed content at the follower client node with the playback of the recording copy of the live streamed content at the leader client node. The live streamed content or playback of the recorded live streamed content can be performed in an asynchronous mode, i.e., all client nodes connected to the server node in the collaboration session can play the live streamed content of the recorded content at their own pace with any synchronization. This means that one user may be viewing content that is different from the content viewed by another participant. The participants can independently access the recorded content and view that content on their own pace. Different participants may be viewing different image frames in the same video or in different live streams and/or recorded videos.

Figure 1B:
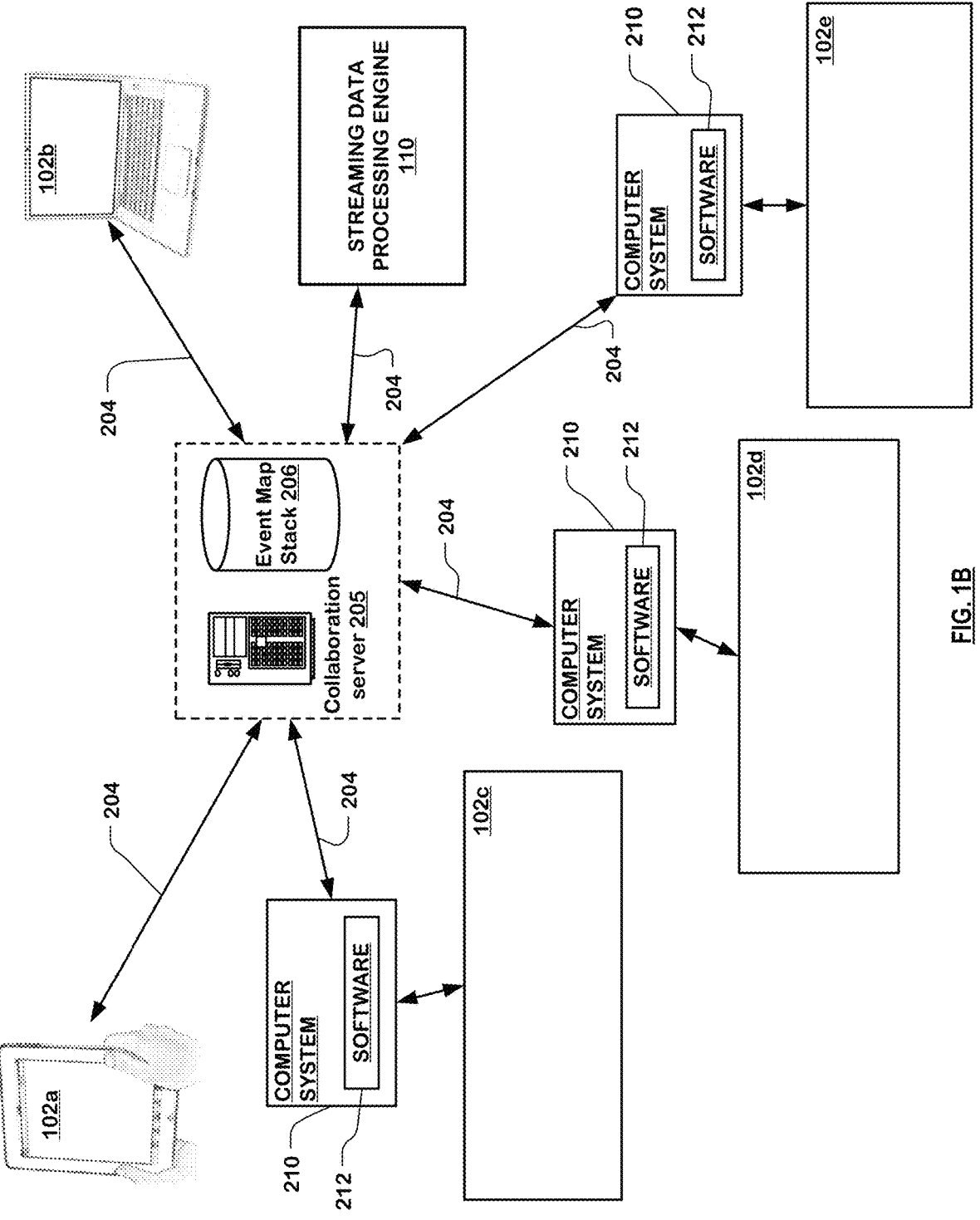

FIG. 1B shows a collaboration server 205 (also referred to as the server node or the server node) and a database 206 that can constitute a server node. The server node is configured with logic to receive stroke data from a client node and process this data prior to propagating to other client nodes in the collaboration session. Similarly, FIG. 1B shows client nodes (or client nodes) that can include computing devices such as desktop and laptop computer, hand-held devices such as tablets, mobile computers, smart phones, and large format displays that are coupled with computer system 210. Participants of the collaboration session can use a client node to participate in a collaboration session.

FIG. 1B illustrates additional example aspects of a digital display collaboration environment. As shown in FIG. 1B, the large format displays 102c, 102d, 102e sometimes referred to herein as "walls" are controlled by respective client, communication networks 204, which in turn are in network communication with a central collaboration server 205 configured as a server node or nodes, which has accessible thereto a database 206 storing spatial event map stacks for a plurality of workspaces. The database 206 can also be referred to as an event map stack or the spatial event map as described above. The streaming data processing engine 110 can be implemented as part of the collaboration server 205 or it can be implemented separately and can communicate with the collaboration server 205 via the communication networks 204.

As used herein, a physical network node is an active electronic device that is attached to a network, and is capable of sending, receiving, or forwarding information over a communication channel. Examples of electronic devices which can be deployed as network nodes, include all varieties of computers, workstations, laptop computers, hand-held computers and smart phones. As used herein, the term "database" does not necessarily imply any unity of structure. For example, two or more separate databases, when considered together, still constitute a "database" as that term is used herein.

The application running at the collaboration server 205 can be hosted using software such as Apache or nginx, or a runtime environment such as node.js. It can be hosted for example on virtual machines running operating systems such as LINUX. The collaboration server 205 is illustrated, heuristically, in FIG. 1B as a single computer. However, the architecture of the collaboration server 205 can involve systems of many computers, each running server applications, as is typical for large-scale cloud-based services. The architecture of the collaboration server 205 can include a communication module, which can be configured for various types of communication channels, including more than one channel for each client in a collaboration session. For example, with near-real-time updates across the network, client software can communicate with the server communication module using a message-based channel, based for example on the WebSocket protocol. For file uploads as well as receiving initial large volume workspace data, the client software 212 (as shown in FIG. 1B) can communicate with the collaboration server 205 via HTTPS. The collaboration server 205 can run a front-end program written for example in JavaScript served by Ruby-on-Rails, support authentication/authorization based for example on OAuth, and support coordination among multiple distributed clients. The collaboration server 205 can use various protocols to communicate with client nodes. Some examples of such protocols include REST-based protocols, low latency web circuit connection protocol and web integration protocol. Details of these protocols and their specific use in the co-browsing technology is presented below. The collaboration server 205 is configured with logic to record user actions in workspace data, and relay user actions to other client nodes as applicable. The collaboration server 205 can run on the node. JS platform for example, or on other server technologies designed to handle high-load socket applications.

The database 206 stores, for example, a digital representation of workspace data sets for a spatial event map of each session where the workspace data set can include or identify events related to objects displayable on a display canvas, which is a portion of a virtual workspace. The database 206 can store digital assets and information associated therewith, as well as store the raw data, intermediate data and graphical data at different fidelity levels, as described above. A workspace data set can be implemented in the form of a spatial event stack, managed so that at least persistent spatial events (called historic events) are added to the stack (push) and removed from the stack (pop) in a first-in-last-out pattern during an undo operation. There can be workspace data sets for many different workspaces. A data set for a given workspace can be configured in a database or as a machine-readable document linked to the workspace. The workspace can have unlimited or virtually unlimited dimensions. The workspace data includes event data structures identifying digital assets displayable by a display client in the display area on a display wall and associates a time and a location in the workspace with the digital assets identified by the event data structures. Each device 102 displays only a portion of the overall workspace. A display wall has a display area for displaying objects, the display area being mapped to a corresponding area in the workspace that corresponds to a viewport in the workspace centered on, or otherwise located with, a user location in the workspace. The mapping of the display area to a corresponding viewport in the workspace is usable by the display client to identify digital assets in the workspace data within the display area to be rendered on the display, and to identify digital assets to which to link user touch inputs at positions in the display area on the display.

The collaboration server 205 and database 206 can constitute a server node, including memory storing a log of events relating to digital assets having locations in a workspace, entries in the log including a location in the workspace of the digital asset of the event, a time of the event, a target identifier of the digital asset of the event, as well as any additional information related to digital assets, as described herein. The collaboration server 205 can include logic to establish links to a plurality of active client nodes (e.g., devices 102), to receive messages identifying events relating to modification and creation of digital assets having locations in the workspace, to add events to the log in response to said messages, and to distribute messages relating to events identified in messages received from a particular client node to other active client nodes.

The logic in the collaboration server 205 can comprise an application program interface, including a specified set of procedures and parameters, by which to send messages carrying portions of the log to client nodes, and to receive messages from client nodes carrying data identifying events relating to digital assets which have locations in the workspace. Also, the logic in the collaboration server 205 can include an application interface including a process to distribute events received from one client node to other client nodes.

The events compliant with the API can include a first class of event (history event) to be stored in the log and distributed to other client nodes, and a second class of event (ephemeral event) to be distributed to other client nodes but not stored in the log.

The collaboration server 205 can store workspace data sets for a plurality of workspaces and provide the workspace data to the display clients participating in the session. The workspace data is then used by the computer systems 210 with appropriate software 212 including display client software, to determine images to display on the display, and to assign digital assets for interaction to locations on the display surface. The server 205 can store and maintain a multitude of workspaces, for different collaboration sessions. Each workspace can be associated with an organization or a group of users and configured for access only by authorized users in the group.

In some alternatives, the collaboration server 205 can keep track of a "viewport" for each device 102, indicating the portion of the display canvas (or canvas) viewable on that device, and can provide to each device 102 data needed to render the viewport. The display canvas is a portion of the virtual workspace. Application software running on the client device responsible for rendering drawing objects, handling user inputs, and communicating with the server can be based on HTML5 or other markup-based procedures and run in a browser environment. This allows for easy support of many different client operating system environments.

The user interface data stored in database 206 includes various types of digital assets including graphical constructs (drawings, annotations, graphical shapes, etc.), image bitmaps, video objects, multi-page documents, scalable vector graphics, and the like. The devices 102 are each in communication with the collaboration server 205 via a communication network 204. The communication network 204 can include all forms of networking components, such as LANs, WANs, routers, switches, Wi-Fi components, cellular components, wired and optical components, and the internet. In one scenario two or more of the users 101 are located in the same room, and their devices 102 communicate via Wi-Fi with the collaboration server 205.

In another scenario two or more of the users 101 are separated from each other by thousands of miles and their devices 102 communicate with the collaboration server 205 via the internet. The walls 102c, 102d, 102e can be multitouch devices which not only display images, but also can sense user gestures provided by touching the display surfaces with either a stylus or a part of the body such as one or more fingers. In some embodiments, a wall (e.g., 102c) can distinguish between a touch by one or more fingers (or an entire hand, for example), and a touch by the stylus. In one embodiment, the wall senses touch by emitting infrared light and detecting light received; light reflected from a user's finger has a characteristic which the wall distinguishes from ambient received light. The stylus emits its own infrared light in a manner that the wall can distinguish from both ambient light and light reflected from a user's finger. The wall 102c may, for example, be an array of Model No. MT553UTBL MultiTaction Cells, manufactured by MultiTouch Ltd., Helsinki, Finland, tiled both vertically and horizontally. In order to provide a variety of expressive means, the wall 102c is operated in such a way that it maintains a "state." That is, it may react to a given input differently depending on (among other things) the sequence of inputs. For example, using a toolbar, a user can select any of a number of available brush styles and colors. Once selected, the wall is in a state in which subsequent strokes by the stylus will draw a line using the selected brush style and color.

Collaboration System Including a Shared Workspace

The technology disclosed includes a collaboration environment in which users participate in digital whiteboarding sessions or collaboration meetings from network nodes located across the world. A user or a participant can join and participate in the digital whiteboarding session, using display clients, such as browsers, for large format digital displays, desktop and laptop computers, or mobile computing devices. Collaboration systems can be used in a variety of environments to allow users to contribute and participate in content generation and review by accessing a virtual workspace (e.g., a canvas or a digital whiteboard). Users of collaboration systems can join collaboration sessions (or whiteboarding sessions) from remote locations around the world. Participants of a collaboration meeting can share digital assets such as documents, spreadsheets, slide decks, images, videos, line drawings, annotations, prototype designs, software and hardware designs, user interface designs, etc. with other participants in a shared workspace (also referred to as a virtual workspace or a canvas). Other examples of digital assets include software applications such as third-party software applications or proprietary software applications, web pages, web resources, cloud-based applications, APIs to resources or applications running on servers.

In some collaboration sessions, at least one or more users may want to share live video stream from remote or local sources of video data as described above. The technology disclosed allows the user to add a live streaming object to a shared collaboration workspace and share that workspace with other users by sending an invitation to other users from using the user interface elements provided by the collaboration system. Inviting one or more users to the collaboration session to review the live streamed data requires just one click (or one operation). The users can view live streamed data in the shared collaboration workspace and review the data as received and displayed on the shared collaboration workspace. Multiple live stream objects can be added as required to view multiple live streams of content sourced from respective cameras.

A live stream object can be added to a shared workspace like other digital assets such as a word processor document, a presentation slide deck, a timer object, etc. The technology disclosed allows setting access permissions to live stream objects by the user who adds the live stream object to the shared collaboration workspace. The user can add permission settings for each participant giving "view only" permission or "edit" permission to a participant. If a participant has editor level permissions for a live stream object, that user can perform all editor operations on the live stream object such as creating video clips, annotating on video frames, etc.

The technology disclosed can be used in a wide range of applications. Consider a security company that provides home and business monitoring services to its clients. The security company monitors factories, warehouses, and other types of manufacturing facilities. The security company has cameras installed in the premises of its clients for monitoring. Other types of sensors can also be installed to detect signals indicating sudden changes in temperature, sound, etc. A person in the security company's office monitors the videos captured by cameras on one or more display monitors. When an incident happens at the monitored premises, the person observing the situation notes the camera number which captured incident and the location in the premises at which the incident has happened. The security company's monitoring person can then call the local police department on the phone to inform them of the incident. The monitoring person describes the incident to the local police department. However, the security company has a limitation that they cannot share the view from the camera capturing the incident as it happens on the premises and captured by the camera. The technology disclosed provide systems and methods to easily share the live stream from any remote source with as many users as desired/permitted. The users may be located in different cities or countries. They can easily join a collaboration session and view the live streamed data as it is received.

Suppose the security company uses the collaboration system including the live streaming technology disclosed herein for monitoring the premises of its clients. The person monitoring the situation can add a live stream object for every camera monitoring the facility or at least include a live stream object for each selected camera from the facility being monitored. Suppose there are ten cameras installed in the premises being monitored, live stream objects for ten cameras can be added to shared collaboration space. In addition to the live stream feeds from the cameras, the monitoring person can add floor plans of the premises to the shared collaboration workspace, emergency exits and maps of the facility can also be added to the shared collaboration space. This information helps participants when reviewing the live stream from the premises and making decisions about response to the incident.

When an incident occurs in the premises, the person monitoring the situation can invite other users such as the client company's chief security officer (CSO) to the shared collaboration workspace to review the security situation in a live stream video. The CSO can then see the live stream videos from multiple cameras on the site and review the situation with the monitoring person of the security company. They can collaboratively decide to take action and whether they need to call the police department to intervene at the location of the incident. They can invite a police officer from the local police department to join the collaboration session. The police officer or a contact person from the police department can join the collaboration session and see the security situation as it occurs live on the live stream camera. All participants from different places and organizations can then review the situation and decide the next steps such as evacuation of the facility, calling fire department, etc.

Therefore, the technology disclosed enables sharing of the information such as livestreaming of videos, facility plans, emergency evacuation plans, emergency monitoring, situation awareness scenarios, law enforcement, government intelligence gathering and analysis, warfare situations, etc. with users in different locations using one click or one operation. The technology disclosed can be applied to other such scenarios such as a military-type activity monitoring and response, planning and execution of law enforcement operations, planning and execution of military operations, evacuation operations from remote locations, etc.

An aspect of the technology disclosed is that it can present live stream videos feeds and also automatically record the livestream video feeds at the server (also referred to as the collaboration server), all within the shared collaboration environment, which can selectively allow correctly permissioned users to interact with the shared content. The server can record the live stream video feeds and allows the users to review and analyze the video recordings. For example, one of the participants can decide to review the video from a particular camera from an earlier timestamp such as a video clip from 5 minutes earlier than the current timestamp. The user can use the tools provided by the collaboration system to bring up the video analysis tools and view the recording at any given time. All participants can view the recording in the shared collaboration workspace. The technology disclosed also provides video editing tools to make video clips from live stream videos and review the video clips in the collaboration session. Users can annotate on video frames while reviewing a recorded video while it is being played back.

The technology disclosed also includes logic to perform various types of analysis on the image frames extracted from the recorded videos from live stream. For example, the technology disclosed can extract all or selected keyframes from a recorded video at the server node. The server can run a trained Artificial Intelligence (AI) model to classify the keyframes for threat detection or anomaly detection. If the AI model classifies one or more image frames then the technology disclosed can put those images in the shared workspace (spatial event map) for review in a threat detection or anomaly detection review collaboration session. Therefore, the technology disclosed reduces the manual effort required for analyzing live streamed videos. The technology disclosed can trigger alarms when a threat or anomaly is detected in an image. An employee can then review the image and start a collaboration session with all relevant participants to review the threat or anomaly detected.

The following section presents an example of live streaming of videos in a collaboration session.

Examples of Video Live Streaming in a Shared Workspace

FIGS. 2A to 2J present various examples of user interface elements and tools provided by the technology disclosed for data streaming and sharing of data streams amongst participants of a collaboration session.

Figure 2A:
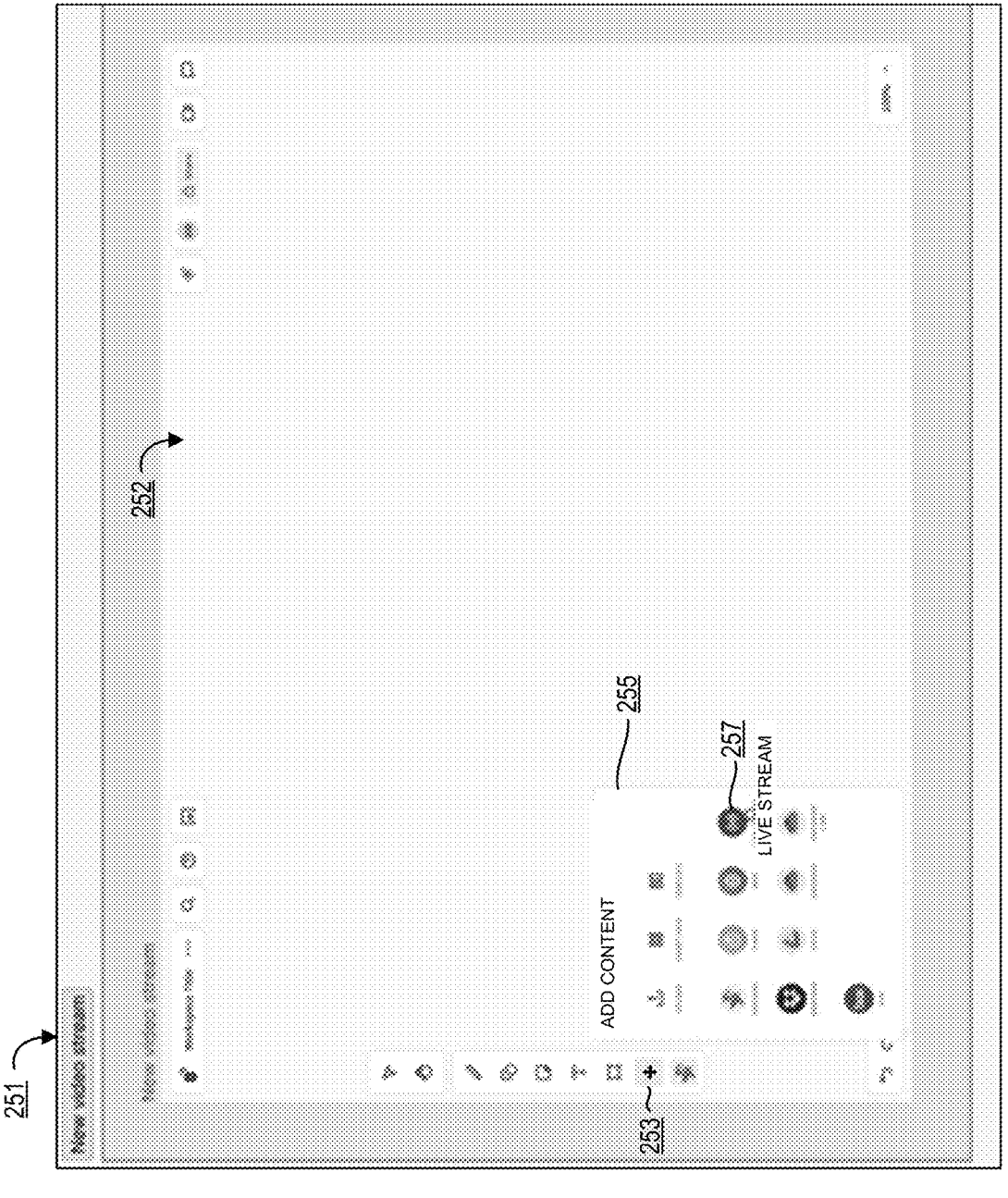

FIG. 2A presents a user interface 251 provided by the collaboration system. The user interface 251 includes a user interface element 253 that can be selected by a user to add new digital assets to a shared collaboration workspace 252. When the user interface element 253 is selected by the user, the collaboration system displays an "Add Content" menu 255 on the user interface 251. The user can select a user interface element 257 to add a live stream object to the workspace 252.

Figure 2B:
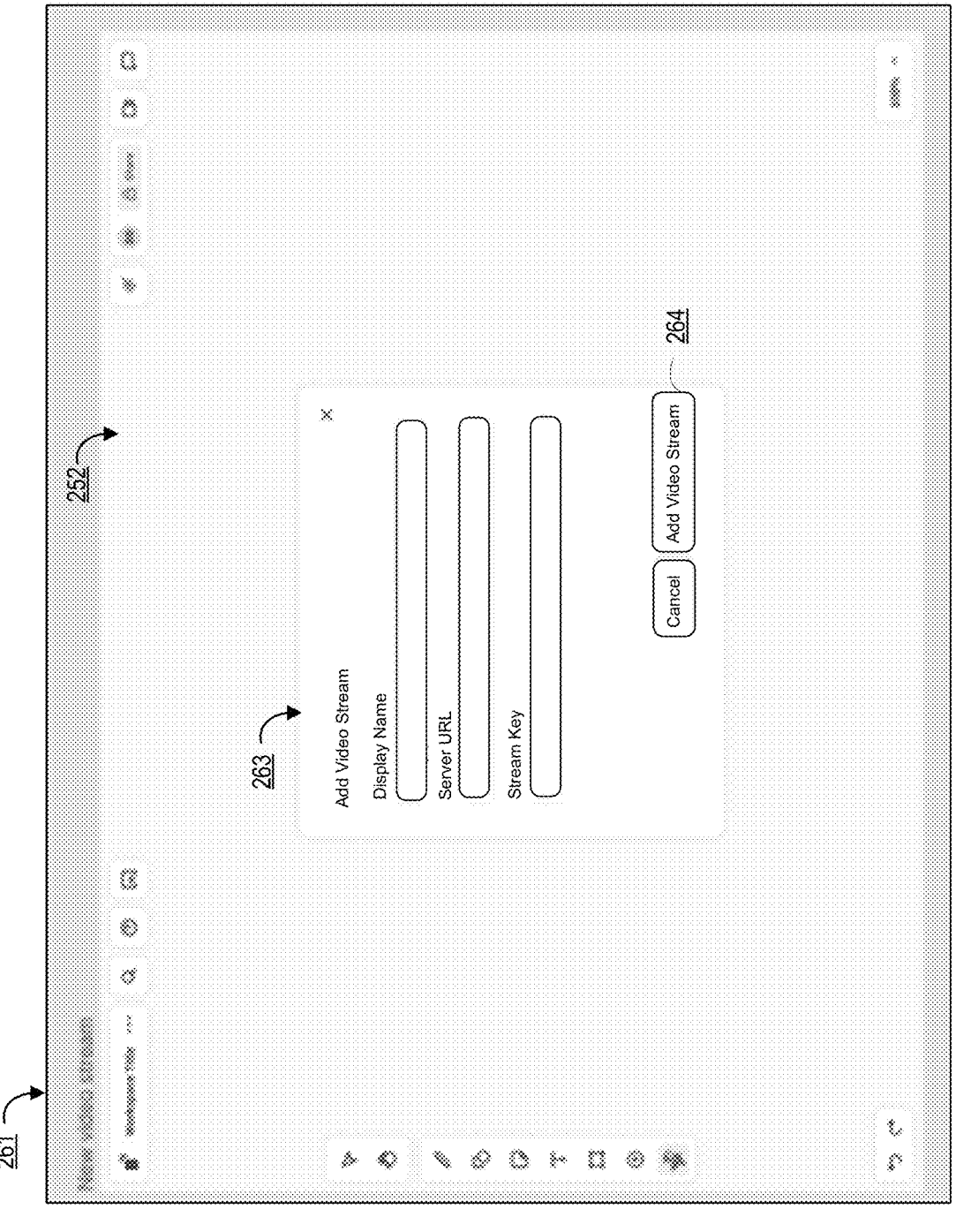

FIG. 2B presents a user interface 261 that displays an "Add Video Stream" dialog box 263. The dialog box 263 is displayed to the user when the user selects the user interface element 257 (as shown in FIG. 2A) to add a live stream object to the shared collaboration workspace 252. The user provides information about the video stream such as "display name" of the video stream, a "server URL" of the video stream and a "stream key" (also referred to as a key) that is used by the collaboration server to access the live video stream from the server that hosts the live video stream or a device that generates the video stream such as an IP camera. Other information such as a "type" of the video stream, geographical location of the video camera that is capturing the video, name of the facility or business from where the video is being live streamed, etc. can also be recorded by the system. The user can then select an "add video stream" button (264) to add the live stream object to the shared collaboration workspace. Live video streams can be added from a variety of sources that can be remote or local to the computing device. Live streaming of data such as video data can be sourced from head-mounted cameras on soldiers as they participate in an operation or cameras installed on a vehicle as it moves through a city or even cameras installed on a drone as it flies. The videos captured by these cameras (or sensors) can be live streamed to a shared workspace which is then viewed by multiple participants in different locations around the world. The participants can collaborate and participate in collaborative decision making regarding the operation or situation as it live streamed from cameras. The technology disclosed provides tools and techniques for the participants to actively participate in the collaboration session during the livestreaming of the video such as by adding comments, drawing, annotating or using other types of tools on the shared workspace to collaborate while the live streamed video is presented in the shared container. Other applications of the technology disclosed include live streaming videos from airports, railway stations, an emergency evacuation situation or from other places where government or another organization is observing activities of users. A user can add multiple streams of videos received from multiple cameras to a shared collaboration workspace. The user can invite participants from anywhere in the world with a single operation (such as clicking or selecting an invite participant user interface element) in the collaboration system. The live stream video can be recorded by the server and made available to the participants of the collaboration session for review and collaboration in a synchronous video playback session. Clips or segments from the video can be created for review and analysis by different participants, as desired. The participants can comment on the videos which are then stored as overlays to image frames.

Figure 2C:
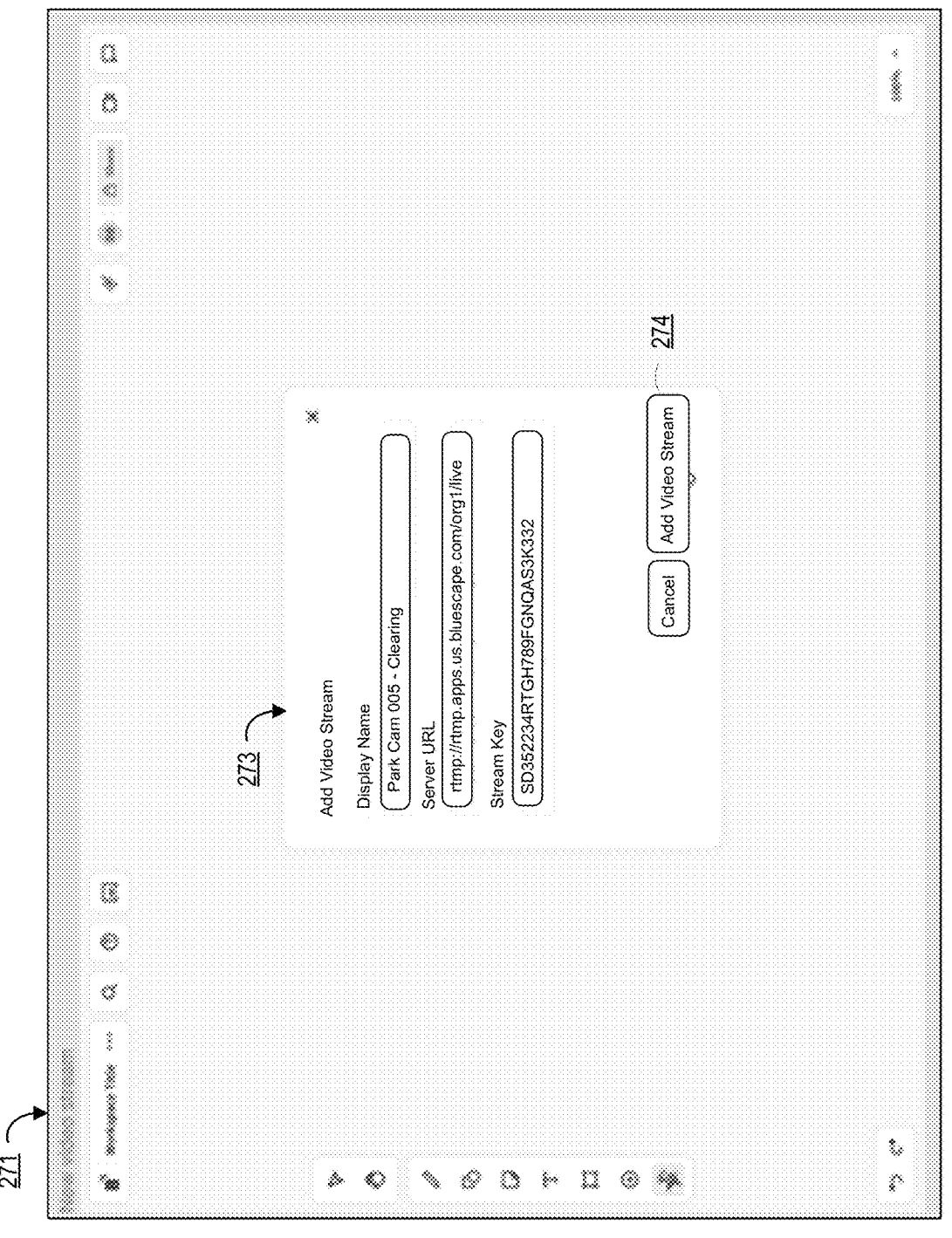

FIG. 2C presents a user interface 271 including a dialog box 273 in which the user has entered the data related to the live stream video such as the "display name", "server URL" and "stream key". The user can now select the "add video stream" button 274 to add a live stream object to the shared collaboration workspace.

Figure 2D:
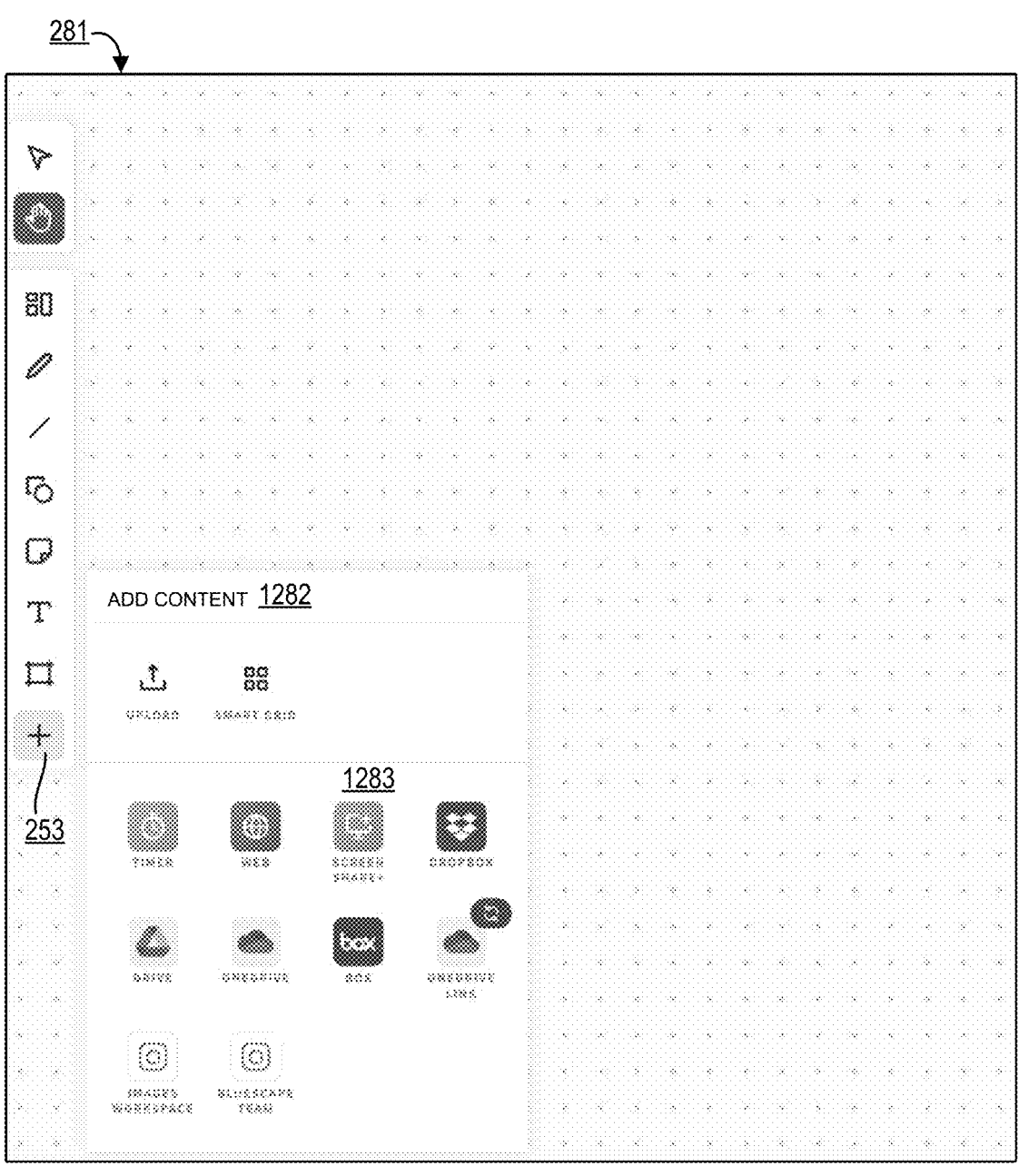

FIG. 2D presents another example user interface 281 that includes a dialog box 1282. The dialog box 1282 can be displayed by selecting the user interface element 253. A user interface element 1283 can be selected to start a data streaming (or live streaming) dialog box.

Figure 2E:
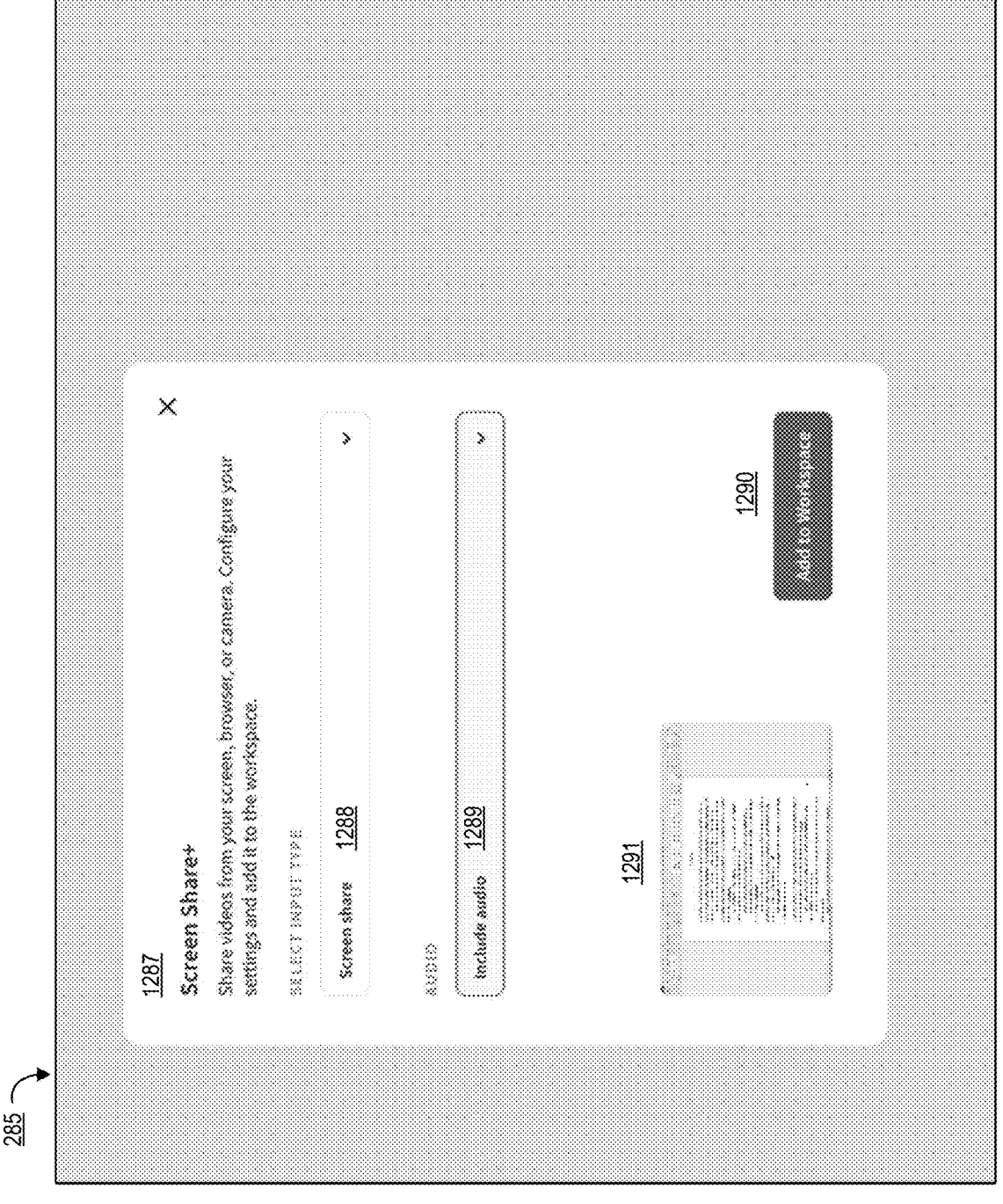

FIG. 2E presents a user interface 285 that includes a dialog box 1287 labeled as "screen share+". This dialog box is displayed on the user interface 285 in response to selection of the user interface element 1283 in FIG. 2D. The dialog box 1287 allows a user to select a data stream (such as a video feed from a camera, computer screen, or browser) for adding to the collaboration workspace. The user can select a data stream source such as "screen share", "camera", "browser", etc. using a drop-down menu 1288. The user can select whether to add audio with the data stream by selecting an appropriate option from the drop-down menu 1289. A preview of the selected data stream from the selected source is displayed in a preview window 1291. The user can select a user interface element 1290 to add the selected data stream to the collaboration workspace.

Figure 2F:
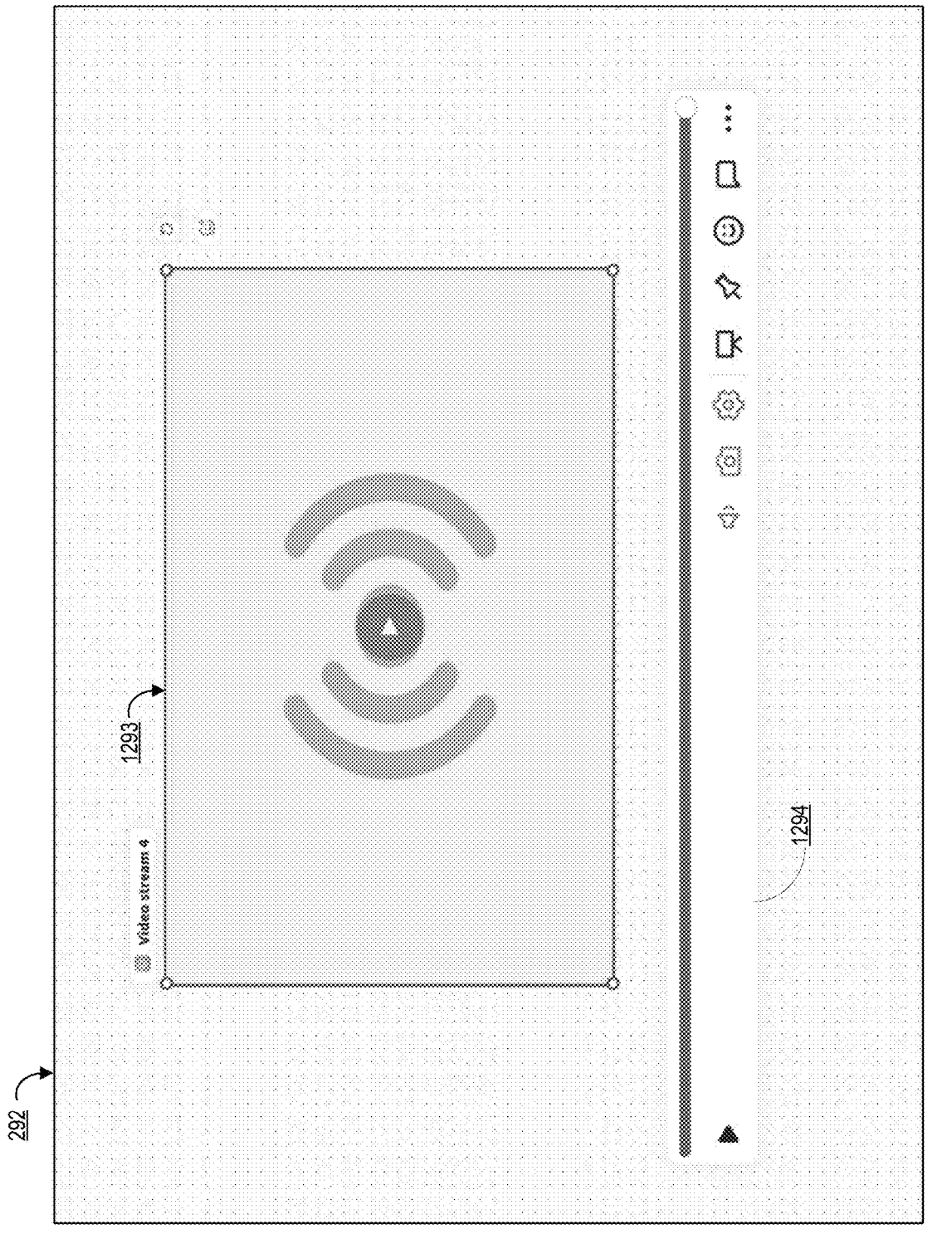

FIG. 2F presents a user interface 292 that includes the data stream object 1293 displayed on the collaboration workspace. The data stream object is labeled as "video stream 4". A control bar 1294 is displayed on the user interface 292 that includes controls for playback of the video streaming 1293.

Figure 2G:
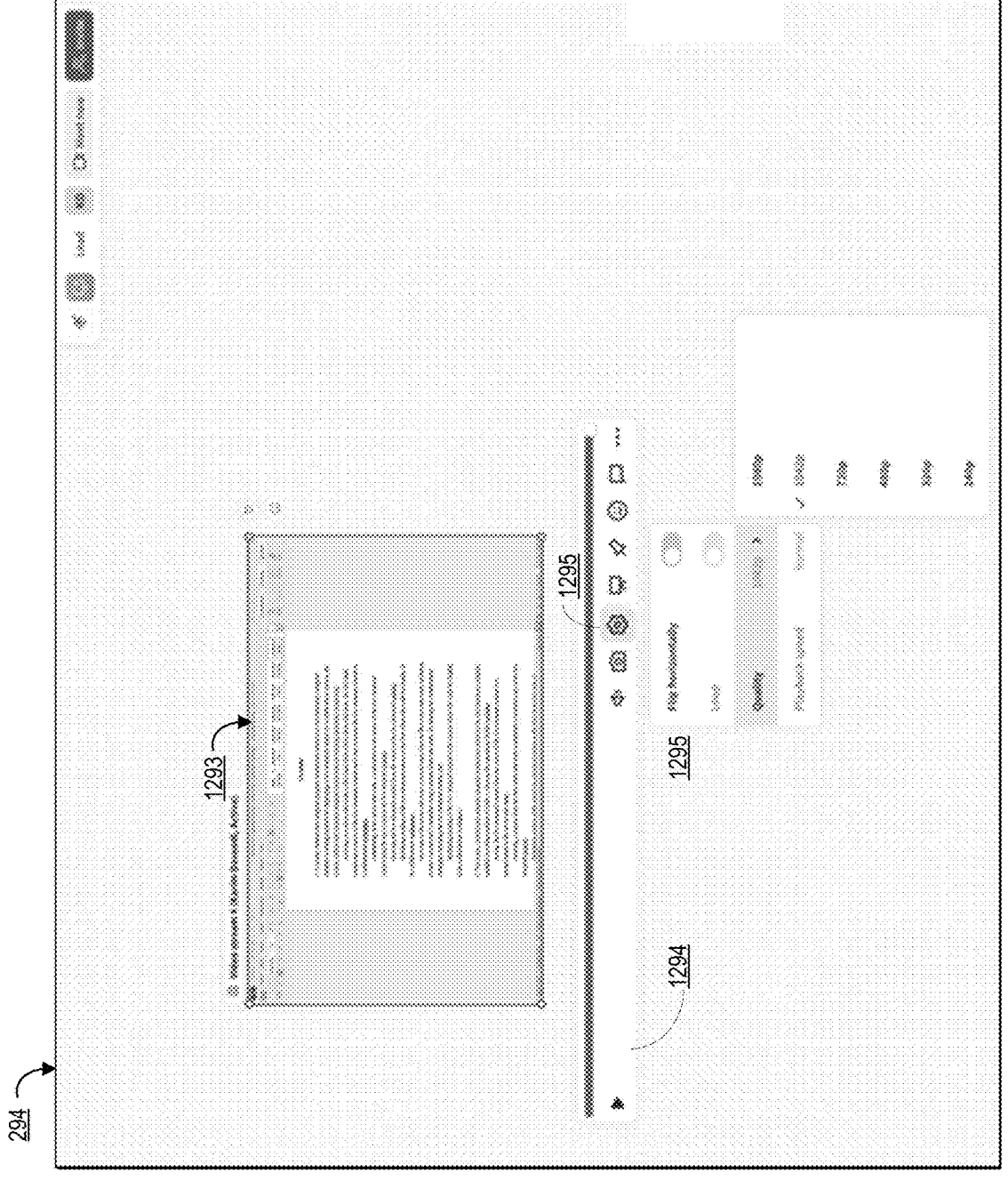

FIG. 2G presents a user interface 294 in which a user interface element 1295 has been selected by a user to select a resolution at which the user wants to view the video stream 1293. The user interface element 1295 causes a drop-down menu 1296 to display and provide various setting options such as selection of quality setting such as pixel resolution value. Another option is provided by the menu 1296 is flip the contents in the 1293, horizontally.

Figure 2H:
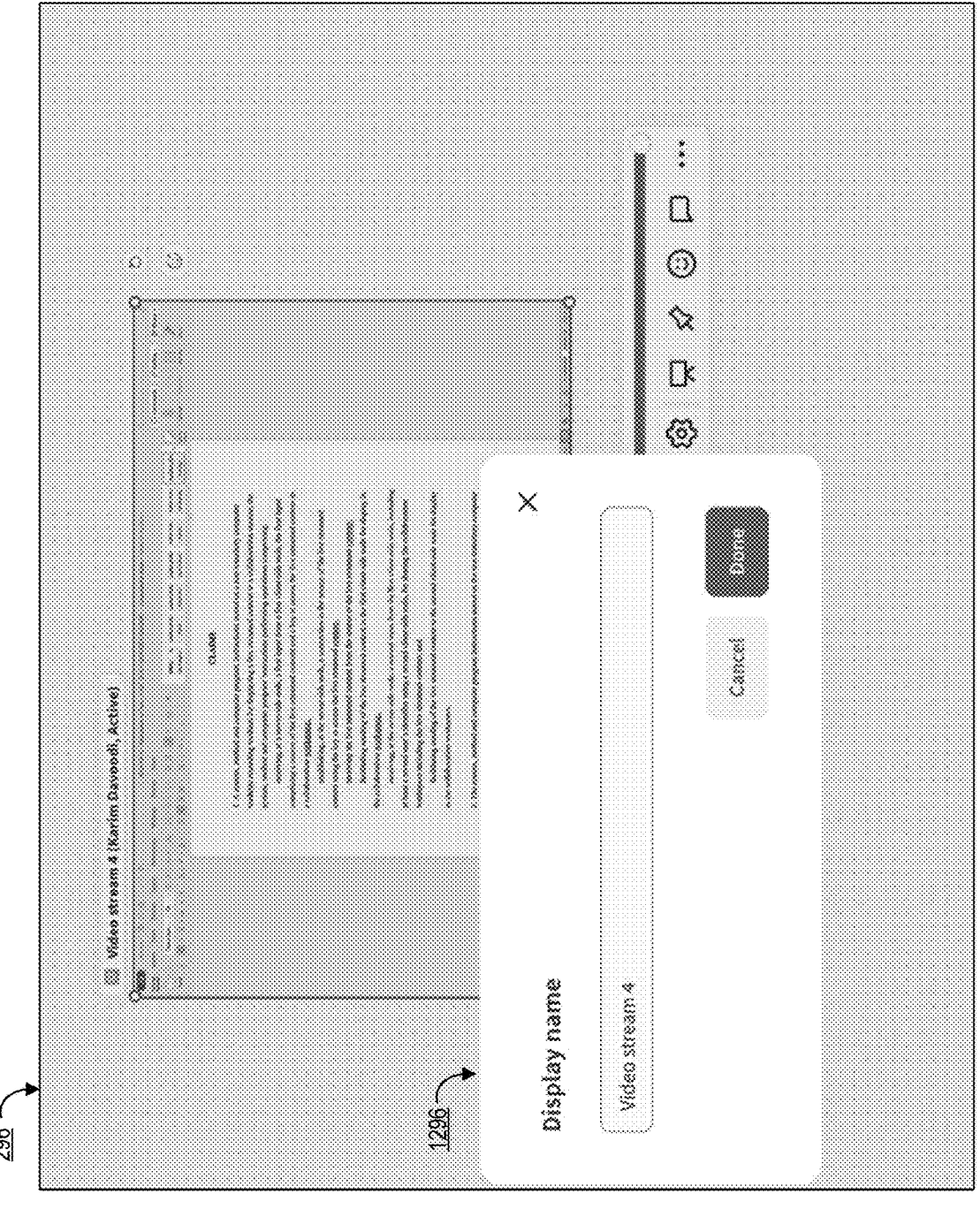
Figure 21:
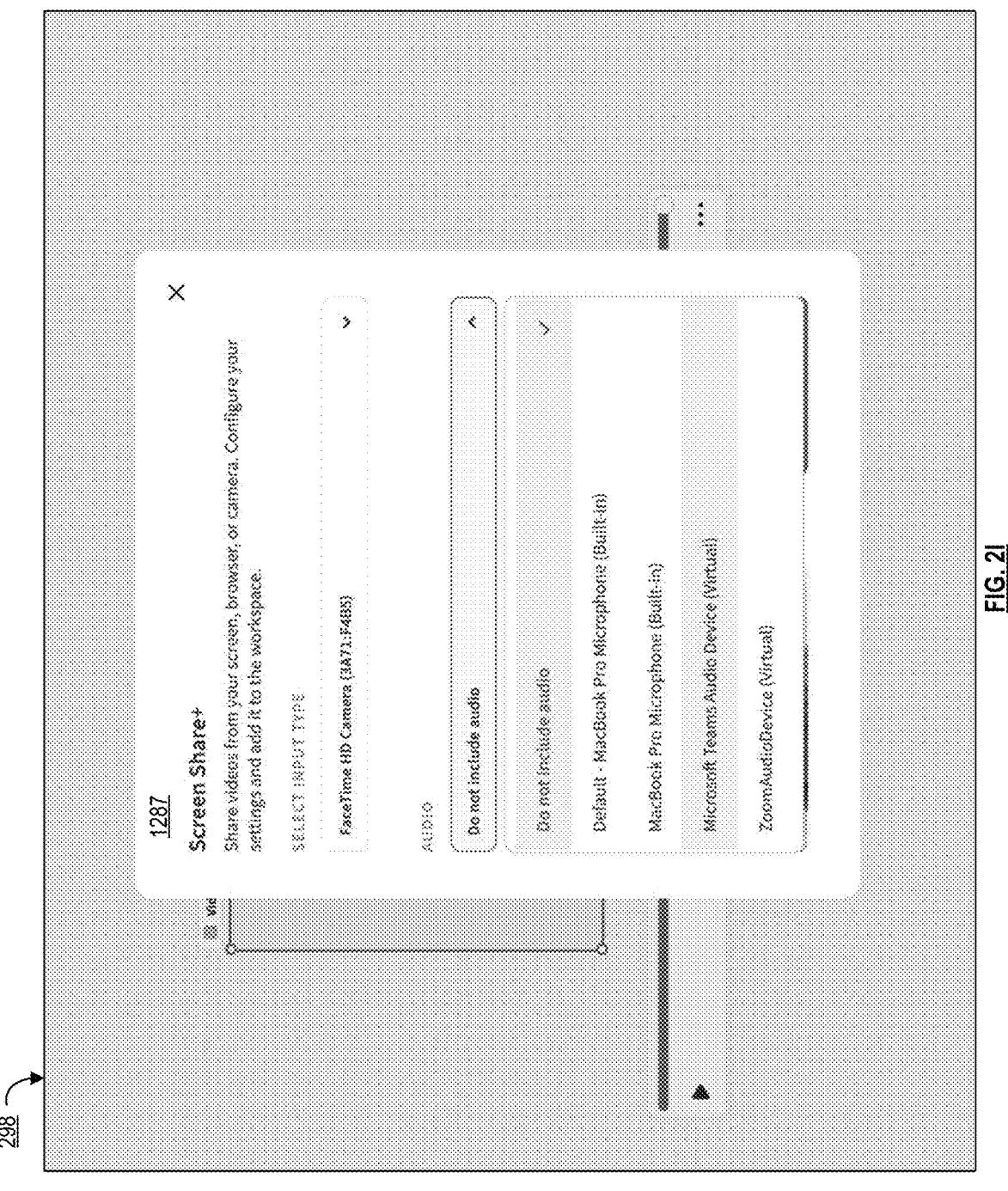

FIG. 2H presents a user interface 296 in which a dialog box 1296 is displayed to change the display name of the video stream object. The user can enter a new name for the video stream object and select "done" user interface element to change the name of the video stream object in the collaboration workspace.

FIG. 2I presents a user interface 298 in which the dialog box 1287 is used to select an audio input for the video streaming object.

Figure 2J:

FIG. 2J presents a user interface 299 that shows four digital assets 1301, 1302, 1303 and 1304 presented on the collaboration workspace. One of the digital assets (1304) is a data streaming object.

Figure 3A:
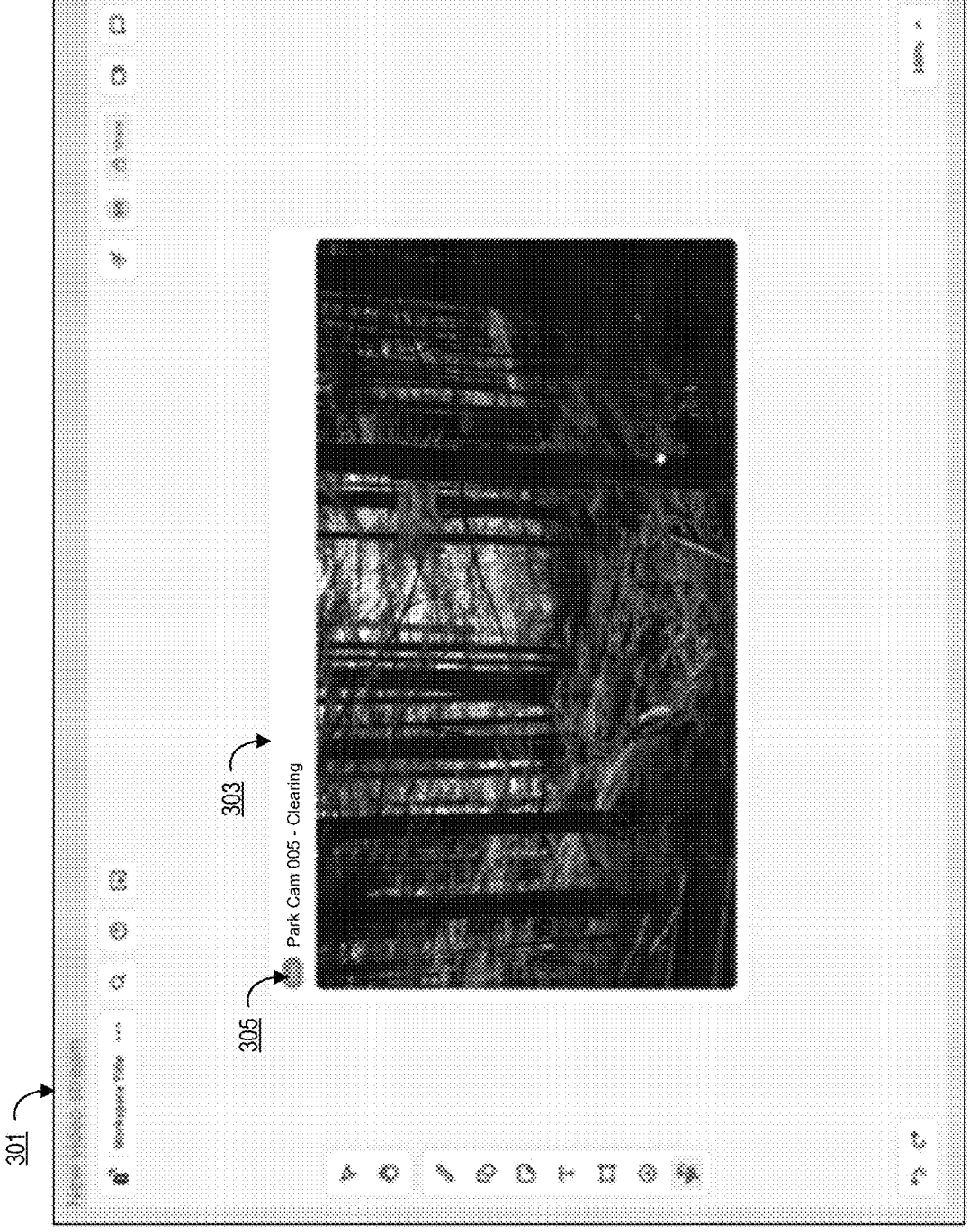
FIGS. 3A, 3B, 3C, 3D, 3E and 3F present user interface elements to initiate live streaming of video feed and setting up of a plurality of live streaming objects in a collaboration workspace.

FIG. 3A shows a user interface 301 that includes a video live streaming object 303 displayed on the shared collaboration workspace. The title "Park Cam 005—Clearing" of the live stream video is displayed on the top of the window displaying the live streaming object 303. A red colored graphical icon 305 is also displayed on the top left of the live streaming object 303. The red colored graphical icon is labeled as "Live" indicating to the user that the video stream displayed in the object 303 is a live video stream from the source camera at the remote location.

Figure 3B:
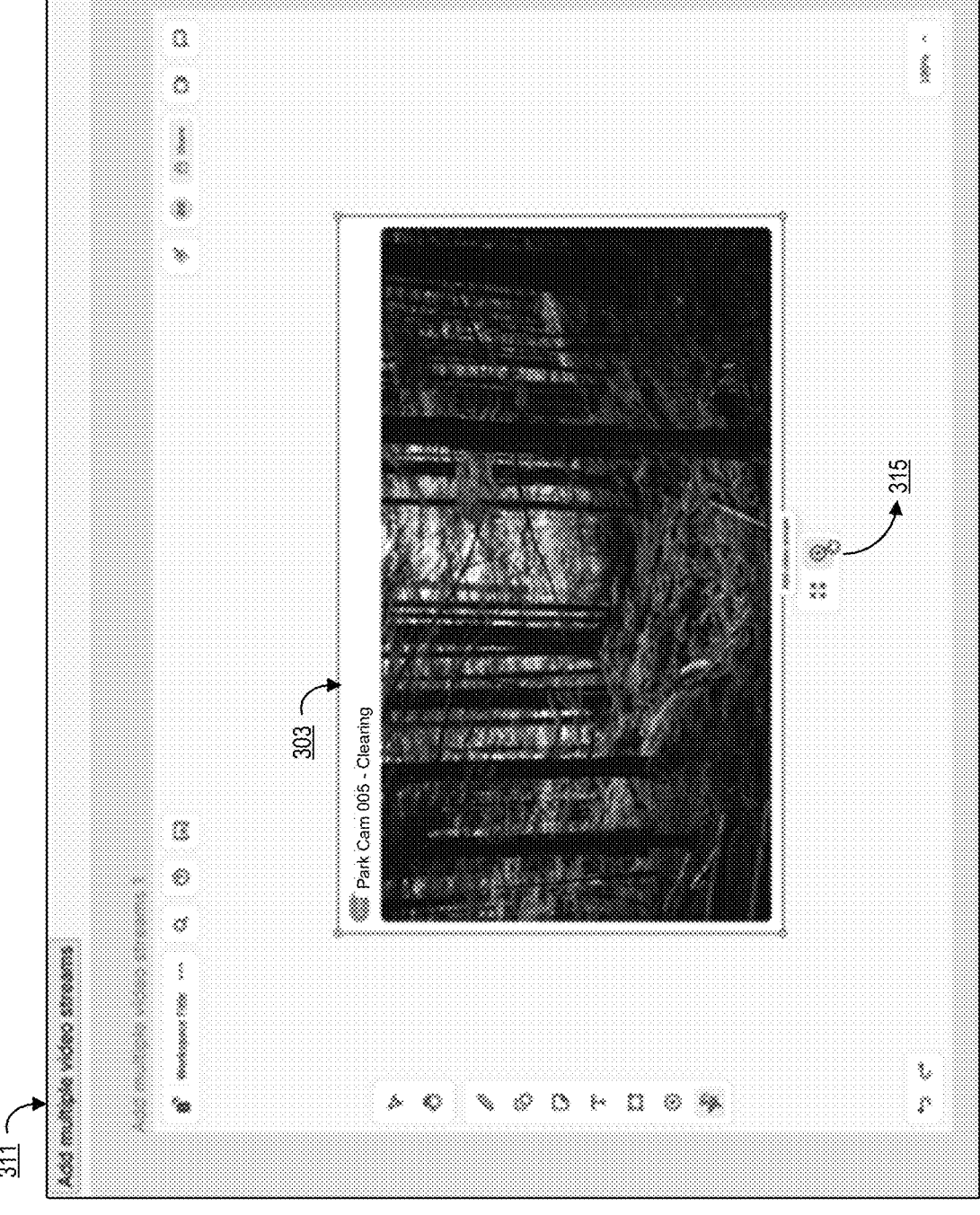

FIG. 3B shows a user interface 311 in which a user interface element 315 is displayed below the live stream object 303. The user interface element 315 can be selected by a user to include a new live stream object to the shared collaboration workspace. The user selects the user interface element 315 to add a new live video stream object to the workspace.

Figure 3C:
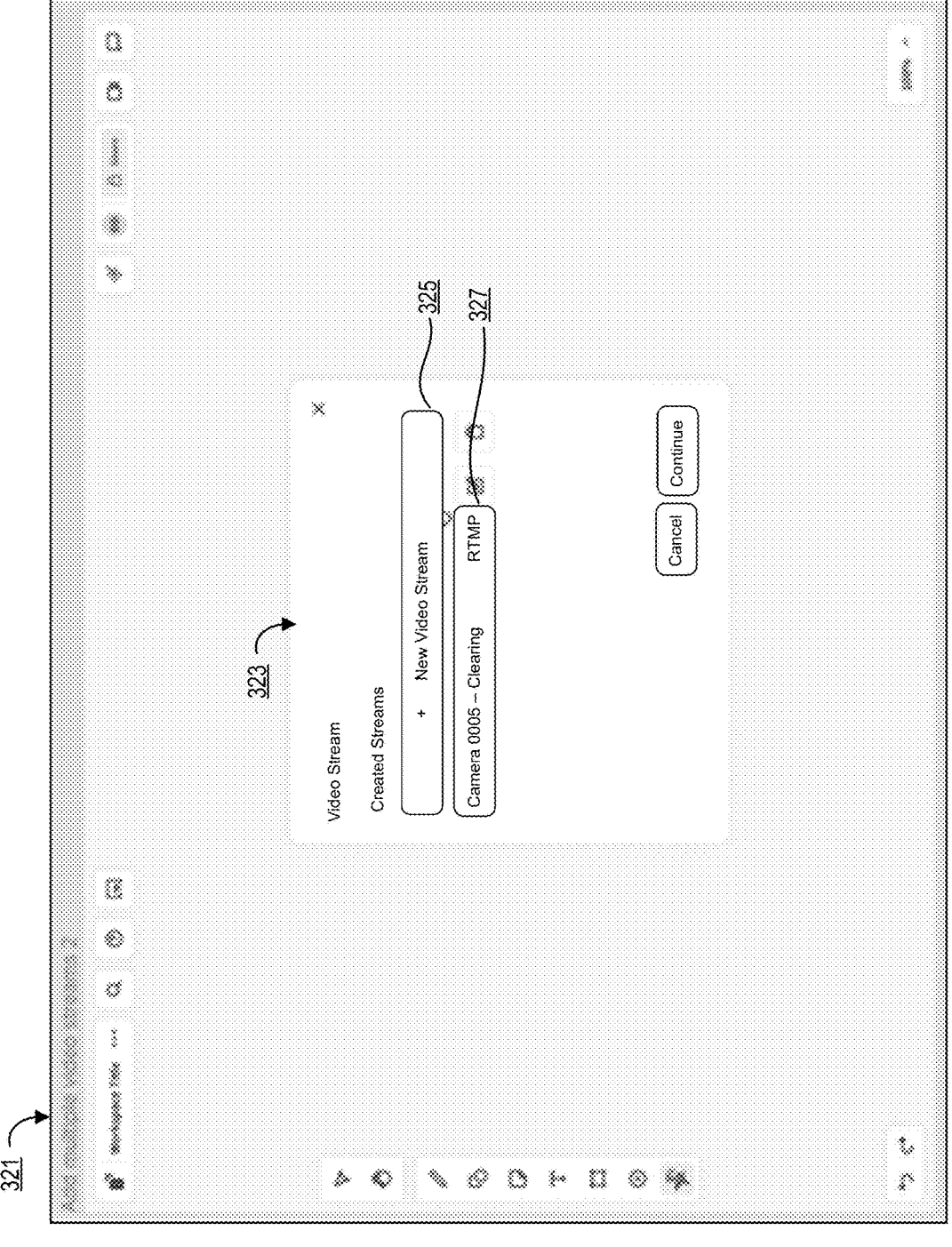

FIG. 3C shows a user interface 321 in which a dialog box 323 is displayed after the user selects the user interface element 315 (in FIG. 3B) to add new live video stream object to the workspace. The dialog box 323 includes a user interface element (or a button) 325 that can be selected to add a new live video stream to the shared collaboration workspace. The existing live video stream objects already added to the workspace are also listed in the dialog box 323. For example, the user interface element 327 includes the name and connection protocol for the live video streaming object that is already added in the shared collaboration workspace.

Figure 3D:
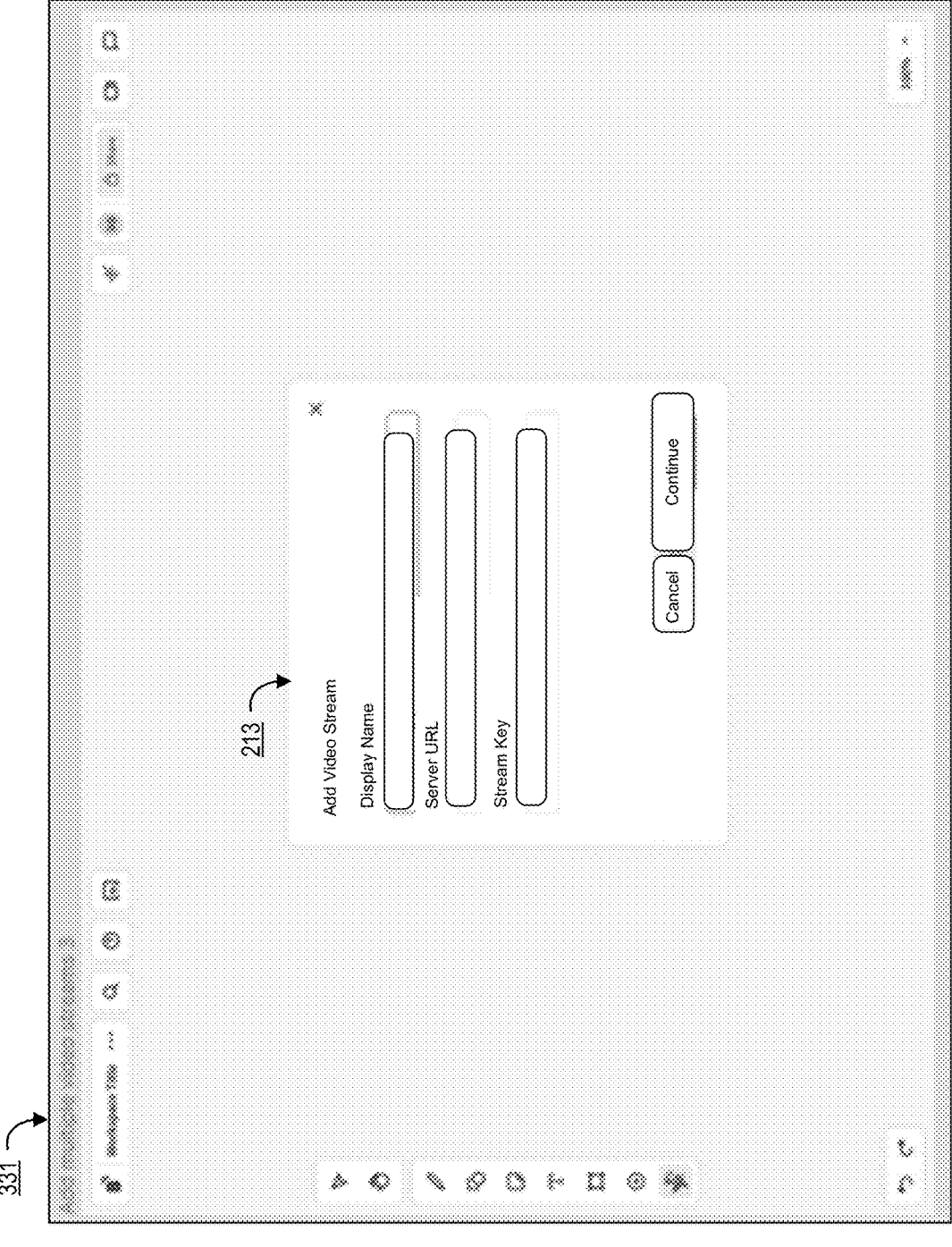

FIG. 3D presents a user interface 331 that includes the dialog box 213 which is displayed when the user selects the user interface element 325 (as shown in FIG. 3C). The dialog box 213 can be used to provide the details of the live video stream that the user wants to add to the shared collaboration workspace.

Figure 3E:
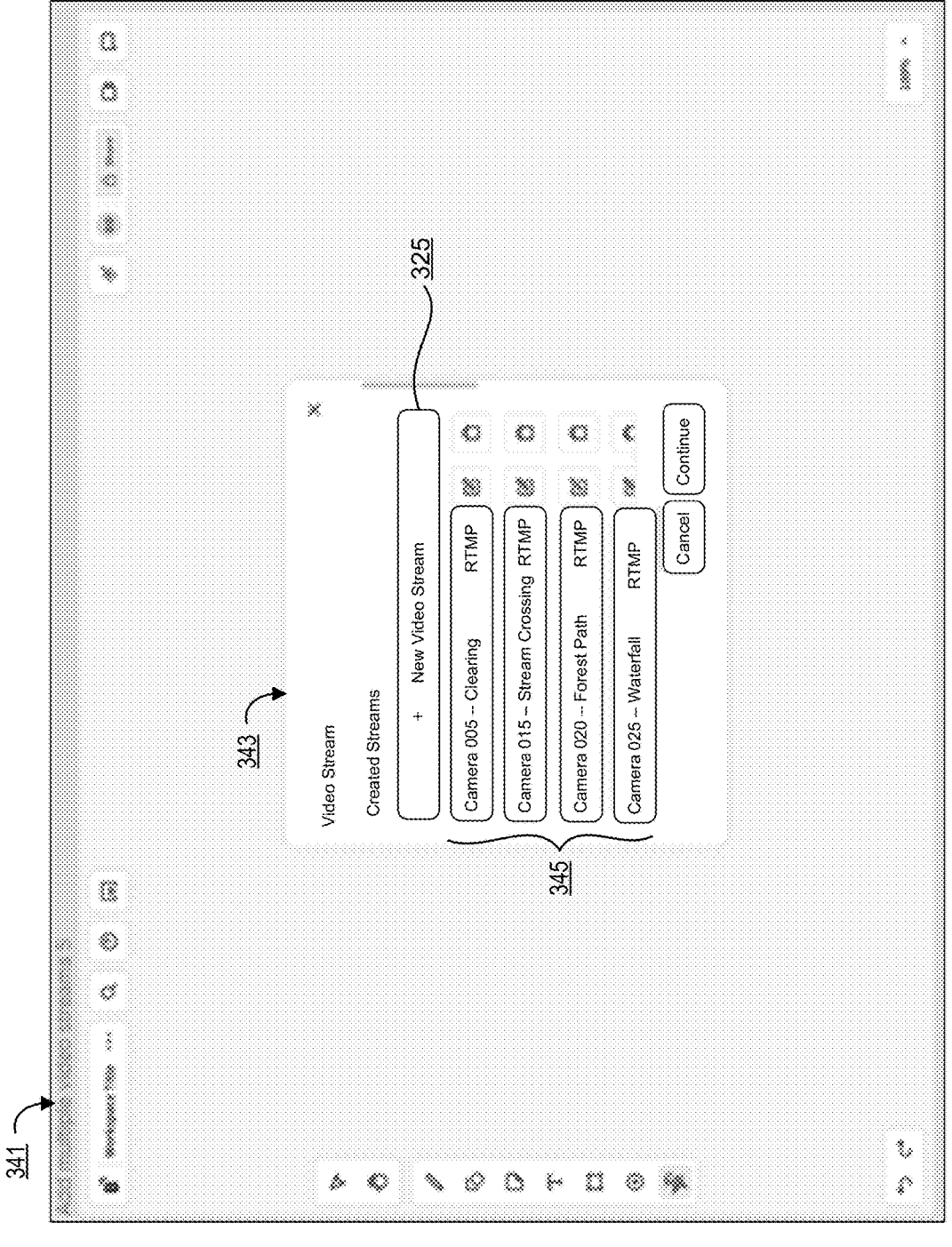

FIG. 3E shows a user interface 341 that includes a user interface 343 displayed on the shared collaboration workspace when a user selects a user interface element to add a new live stream object in the shared collaboration workspace. The user interface 343 presents a list (345) of live stream objects currently included in the shared collaboration workspace. The user interface 343 also displays the user interface element 325 to add further live stream objects to the shared collaboration workspace.

Figure 3F:
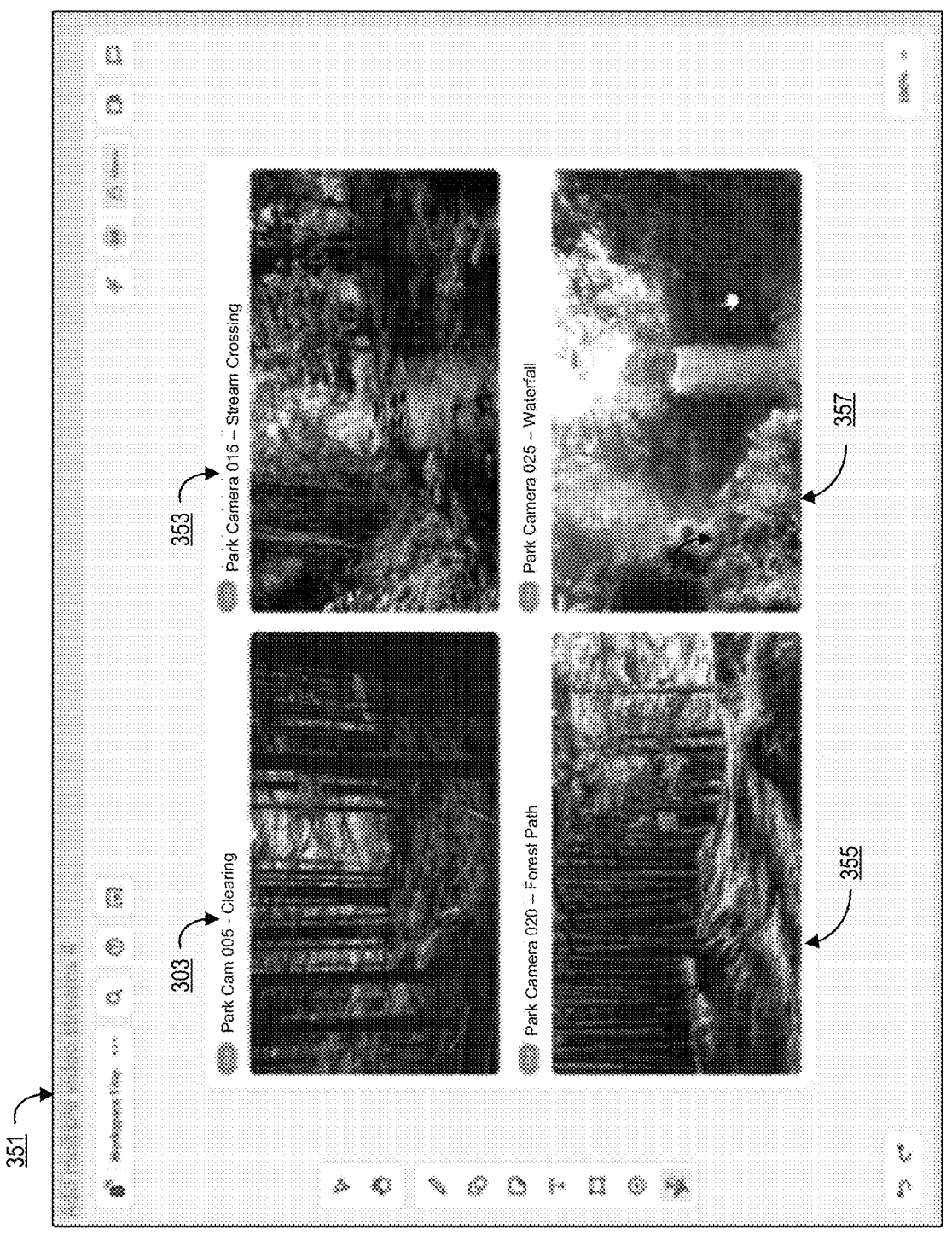

FIG. 3F presents a user interface 351 that shows four live stream objects (303, 353, 355, 357) displayed on the shared collaboration workspace. The four live stream objects are arranged in a matrix form and are presenting live video streams from respective source video cameras. The arrangement of live streaming objects and window size of each live stream object can be changed by a user.

Figure 4A:
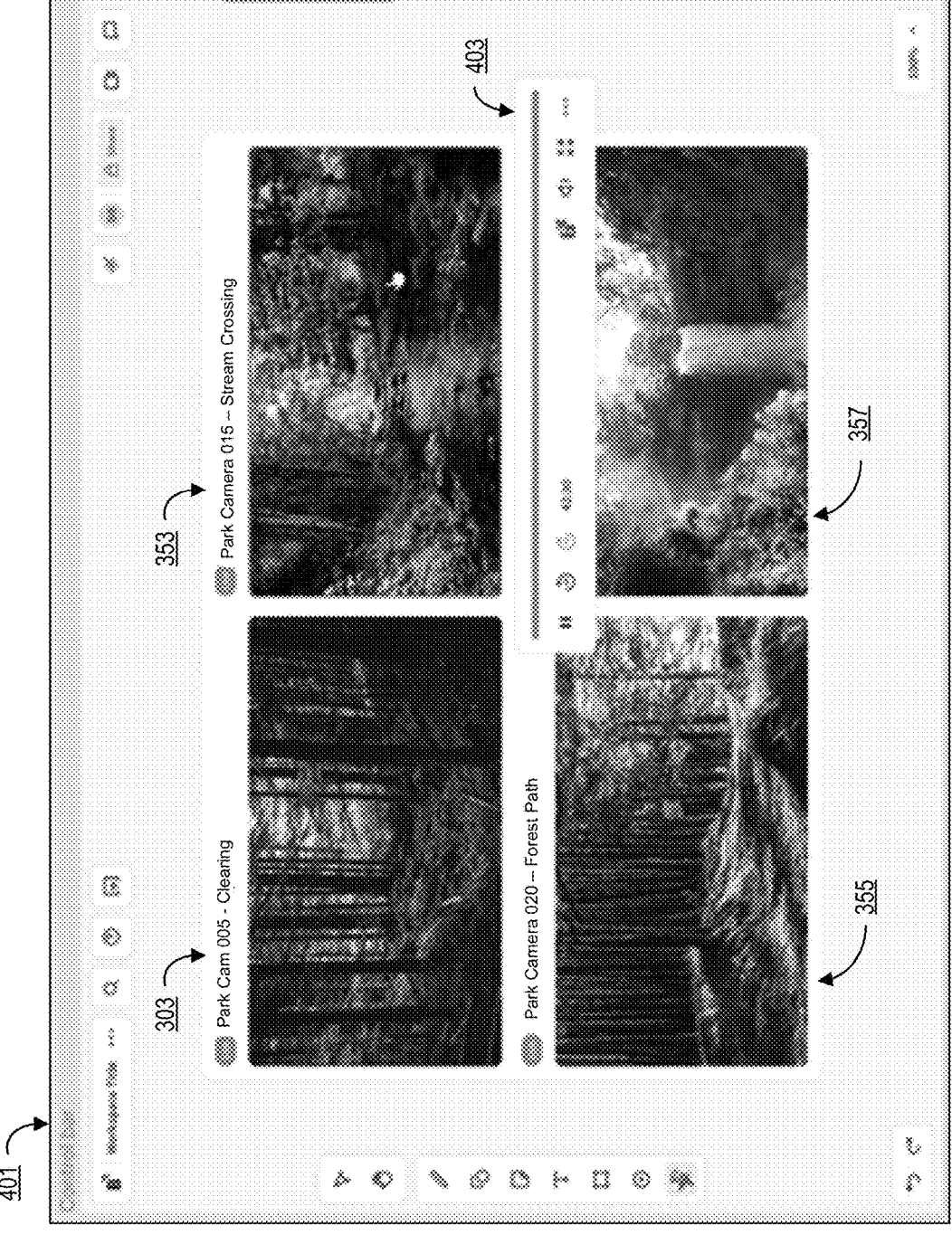
FIGS. 4A, 4B, 4C, 4D, 4E, 4F, 4G and 4H present user interface elements including a toolbar for playback of recorded video in a collaboration workspace.

FIG. 4A presents a user interface 401 that presents a shared collaboration workspace including four live stream objects (303, 353, 355, 357) arranged in a matrix form and presenting live video streams from respective source video cameras. The user has selected the video live streaming object 353 such as by clicking or pressing on the video live streaming object 353. The selection of the video live streaming object causes the collaboration system to display a toolbar 403 on the user interface 401. The toolbar 403 includes tools that can be used to record and a live streaming video or playback a recorded and to make clips of a live streaming video for review at a later time.

Figure 4B:
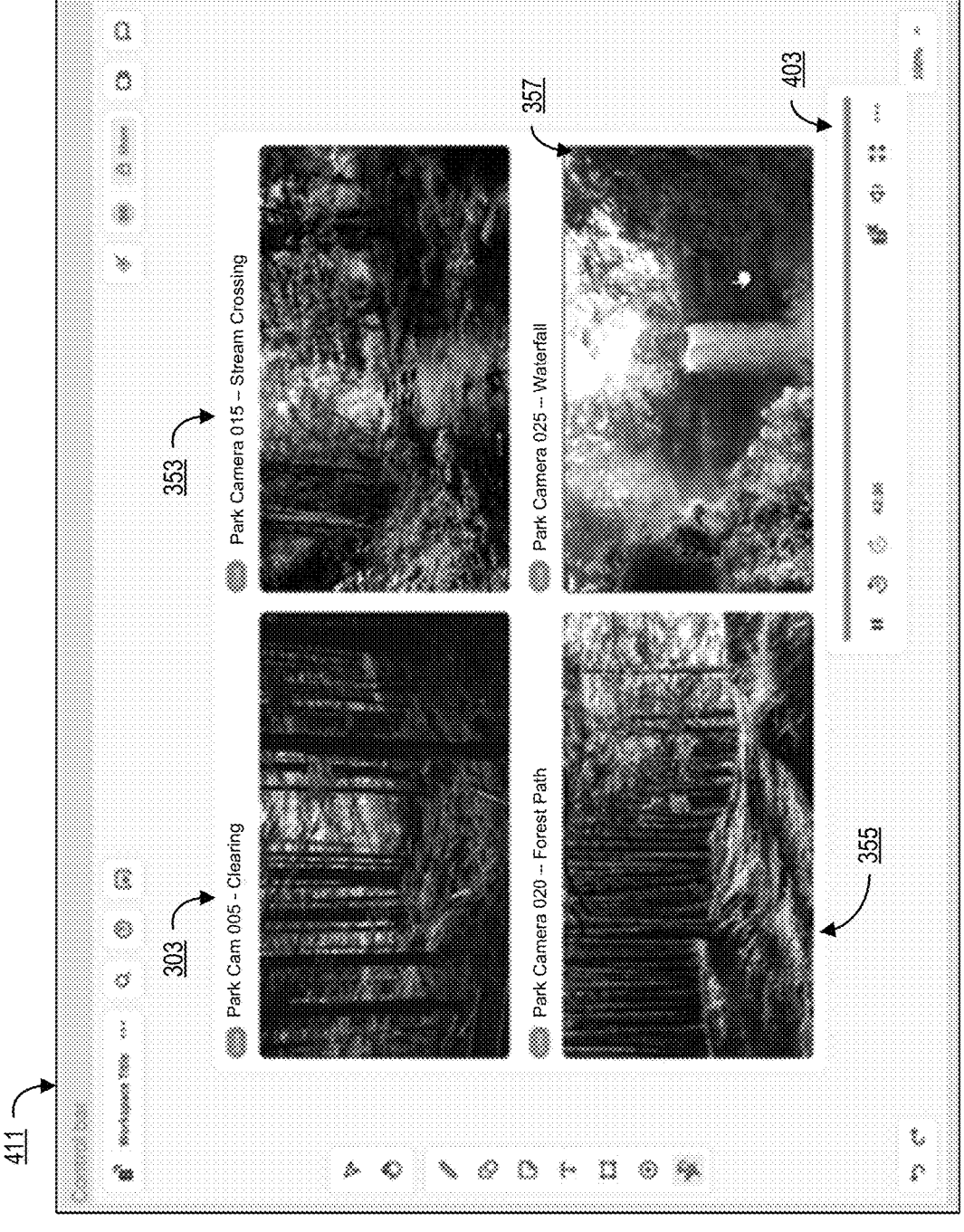

FIG. 4B presents a user interface 411 in which the toolbar 403 is invoked for another live streaming object (357) in the shared collaboration workspace.

Figure 4C:
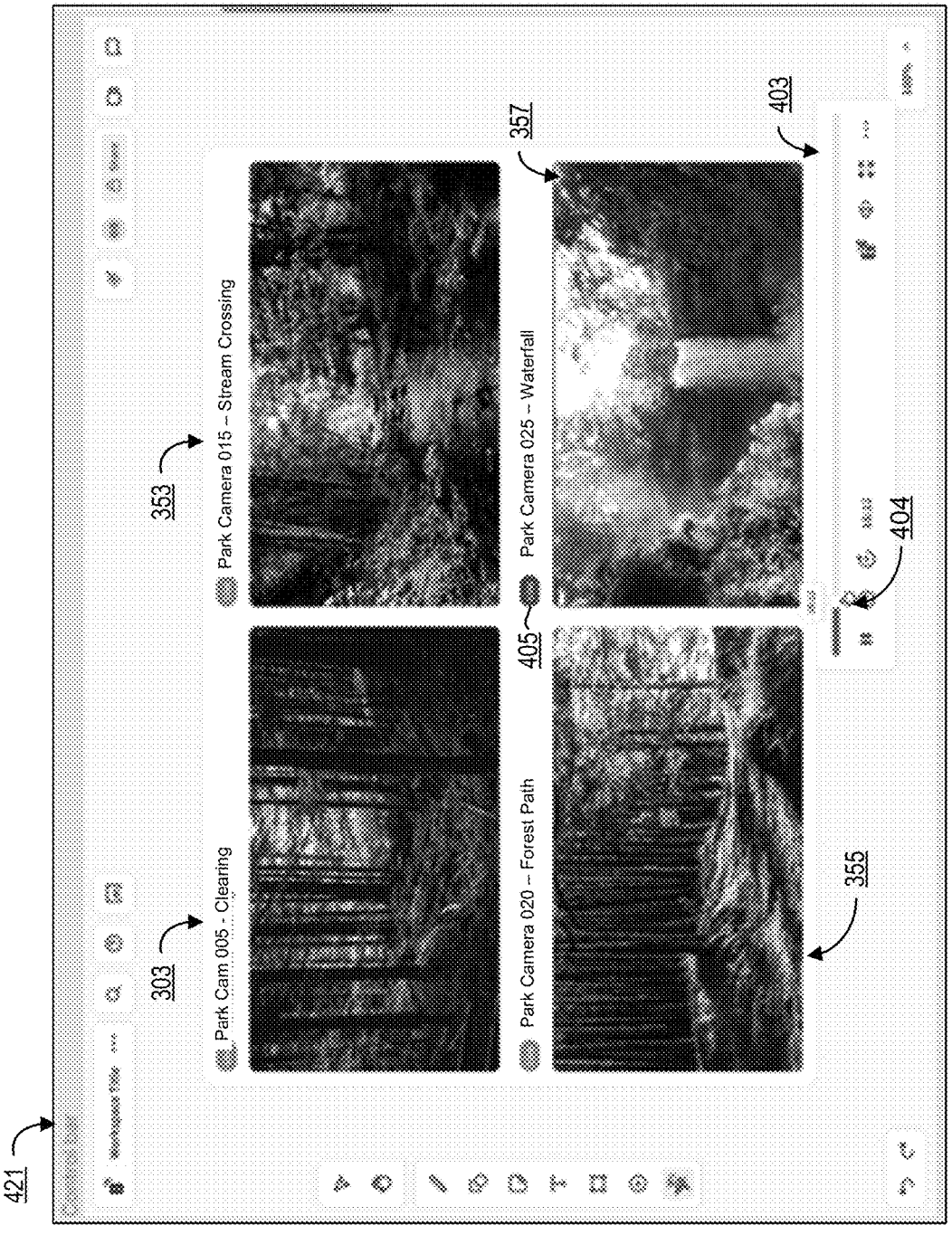

FIG. 4C presents a user interface 421 in which the user plays the recorded video from the source camera for the live video stream object 357 using the toolbar 403. The user moves the scrubber 404 provided on the toolbar 403 to scroll back to an earlier timestamp and playback the video from that timestamp. Note that when a recorded video is played in a live video stream object, the red colored graphical icon (405) labeled as "Live" on the top left portion of the live video streaming object turns gray. This indicates to the users of the collaboration system that the video played back in this window is a recorded video and not a live stream from the source camera.

Figure 4D:
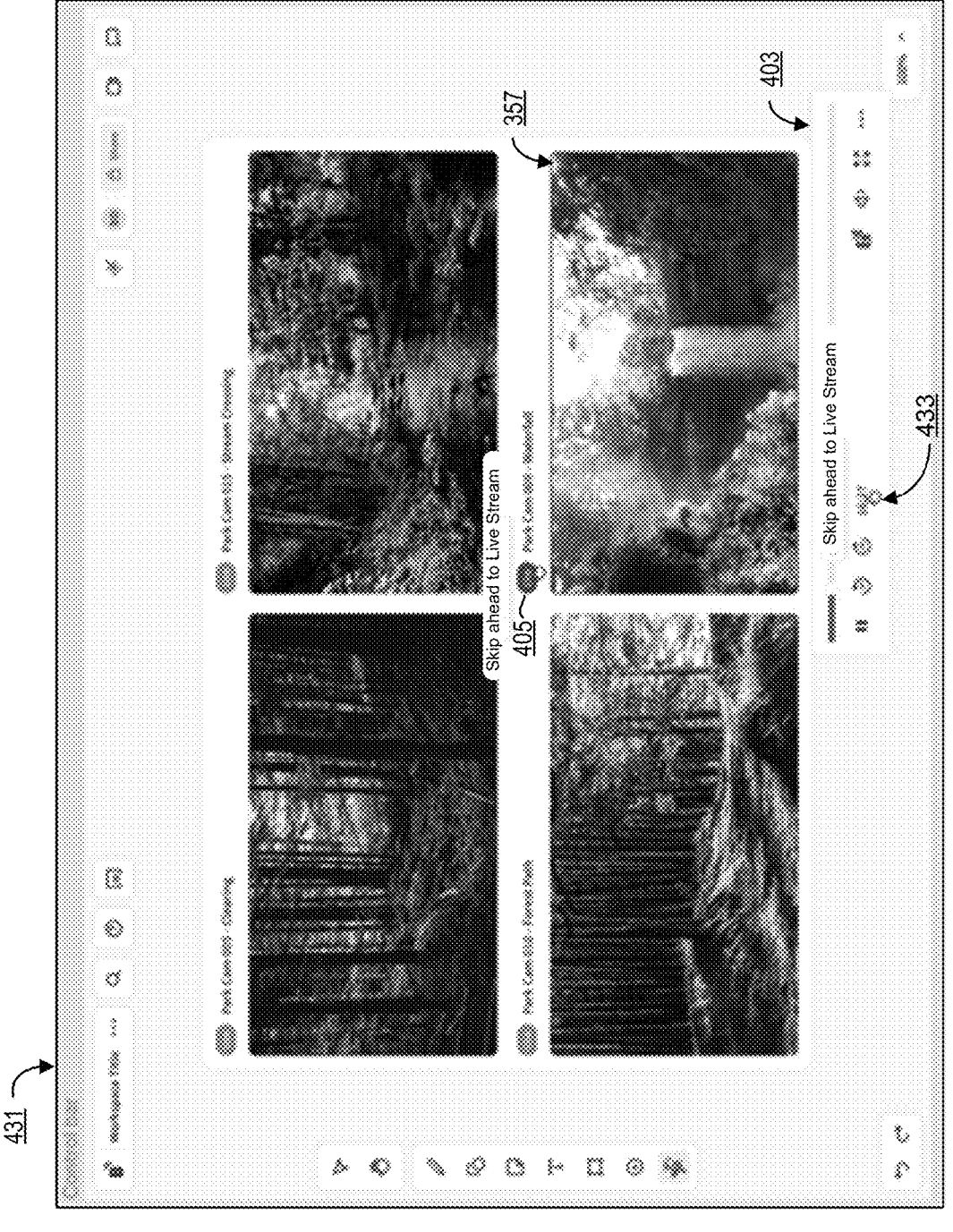

FIG. 4D presents a user interface 431 that shows a user playing back the recorded video for the live stream object 357. The user can use video playback controls (or video playback tools) provided on the toolbar 403. The user can select user interface elements to pause the playback of the video. The user can also forward or rewind the video playback by a predefined amount of time such as 10 seconds, 15 seconds, 30 seconds, or more, using the respective user interface elements provided on the toolbar. The user can select a user interface element 433 to skip ahead to view live video stream from the source camera for the live video stream object 357. The user can also select the user interface element 405 located at the top left corner of the live video stream object 357 to skip ahead to the live video stream from the source camera for the live video stream object 357.

Figure 4E:
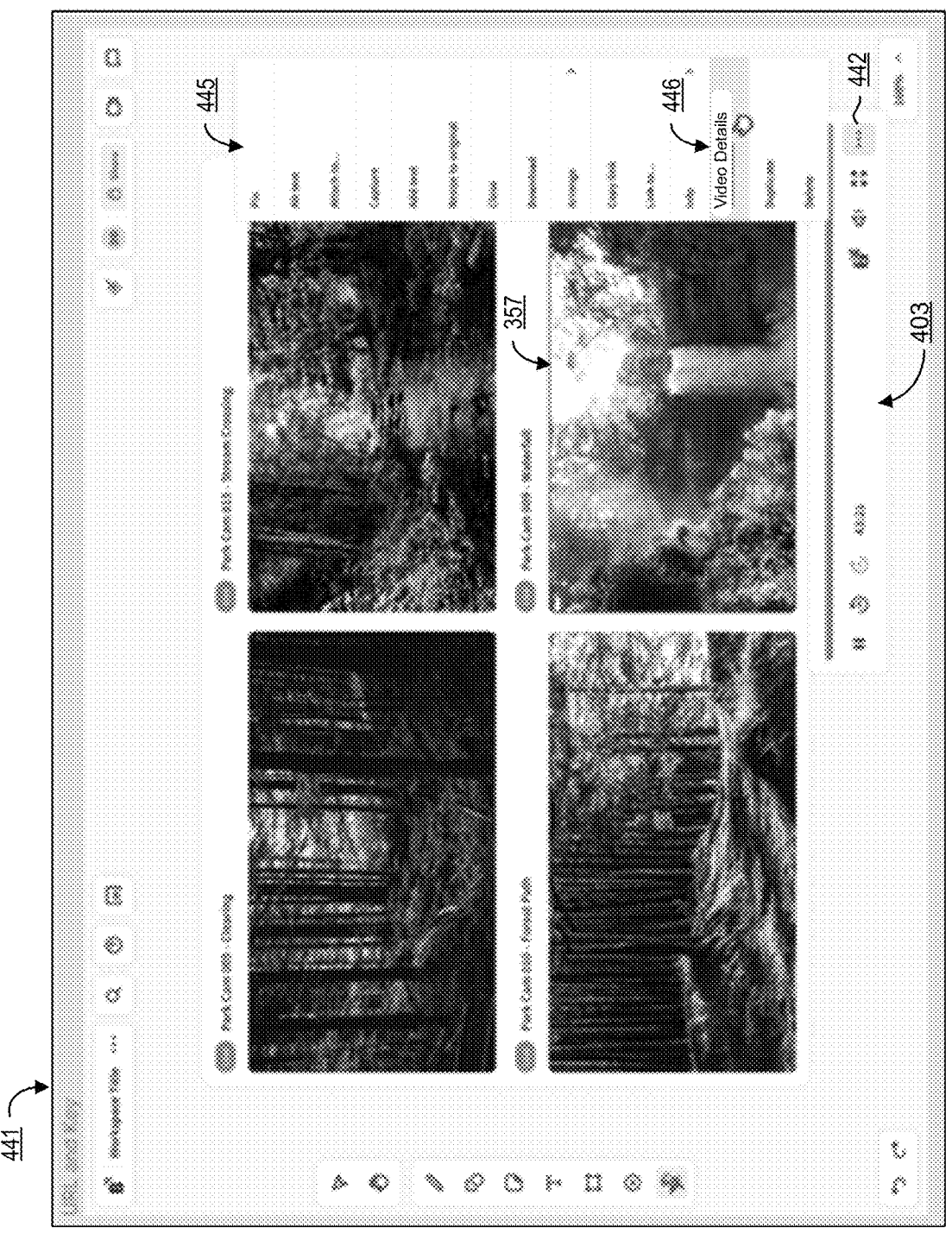

FIG. 4E presents a user interface element 441 that shows a menu 445 with a list of functions available to the user. The menu 445 can be invoked by the user by selecting a user interface element 442 from the toolbar 403. The menu is invoked for the same live stream object 357 for which the toolbar is invoked by the user. The menu provides several functions that can be used by the user to perform functions, for example, "pin" the live stream object to a particular location on the shared collaboration workspace, "attach file" to the live stream object, "capture" an image from the video displayed on the live stream object, "add text" to an image frame of the video displayed in the live stream object, "restore to original" version of live stream object, "close" the live stream object, "download" the recorded video from the live stream object, "arrange" the live stream object, display "video details", "duplicate" the live stream object and "delete" the live stream object. It is understood that the functions listed above are presented as an example and further functions can be provided to the users in the menu 445.

Figure 4F:
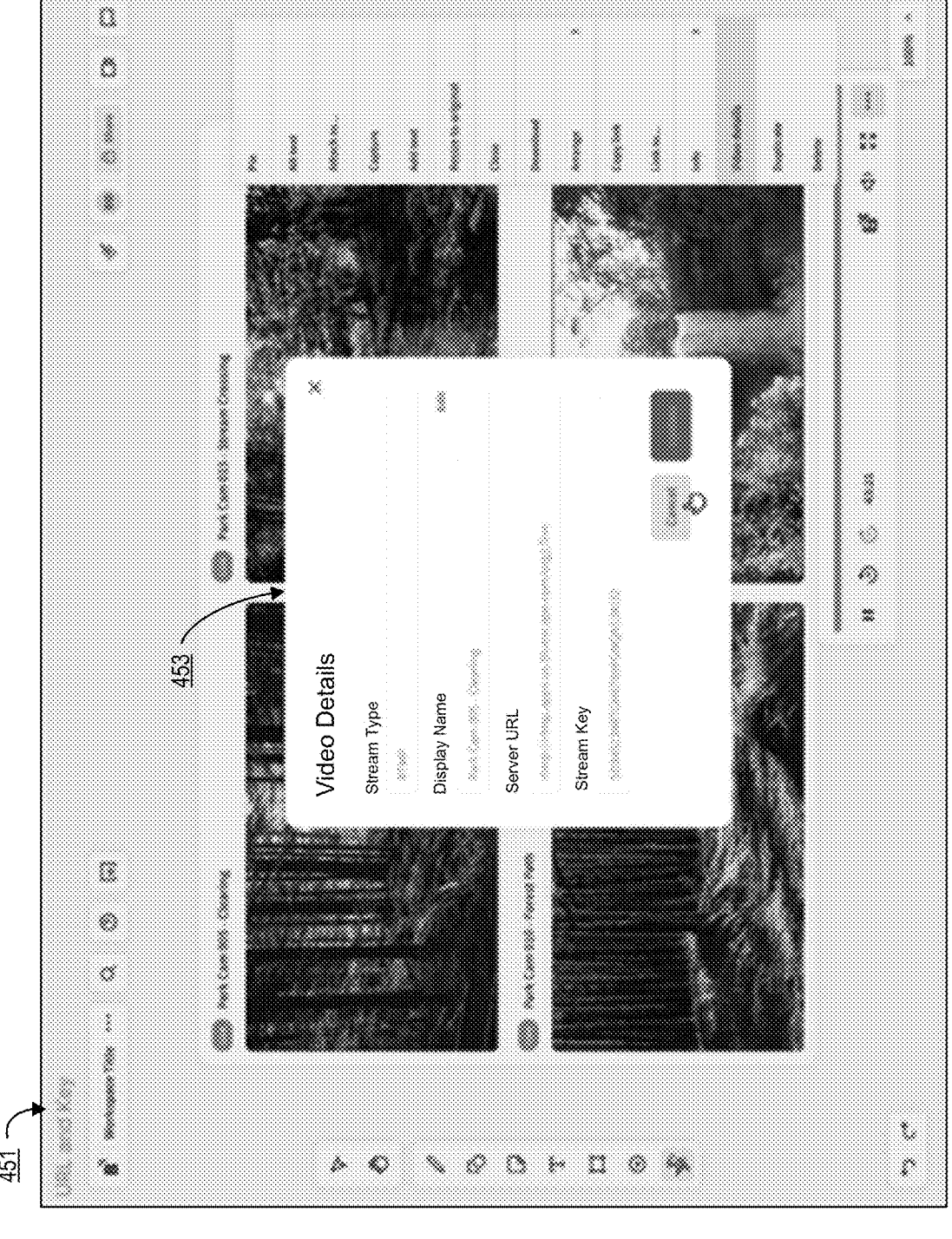

FIG. 4F presents a user interface 451 which includes a "video details" user interface 453 that is displayed in response to the user selection of the "video details" menu item 446 in FIG. 4E. The video details user interface 453 presents the details about the video such as "stream type", "display name", "server URL", and "stream key". It is understood that other information about the video such as a "user or owner name", "geographical location" of the source camera, etc. can be included in the video details information presented on the video details user interface 453.

Figure 4G:
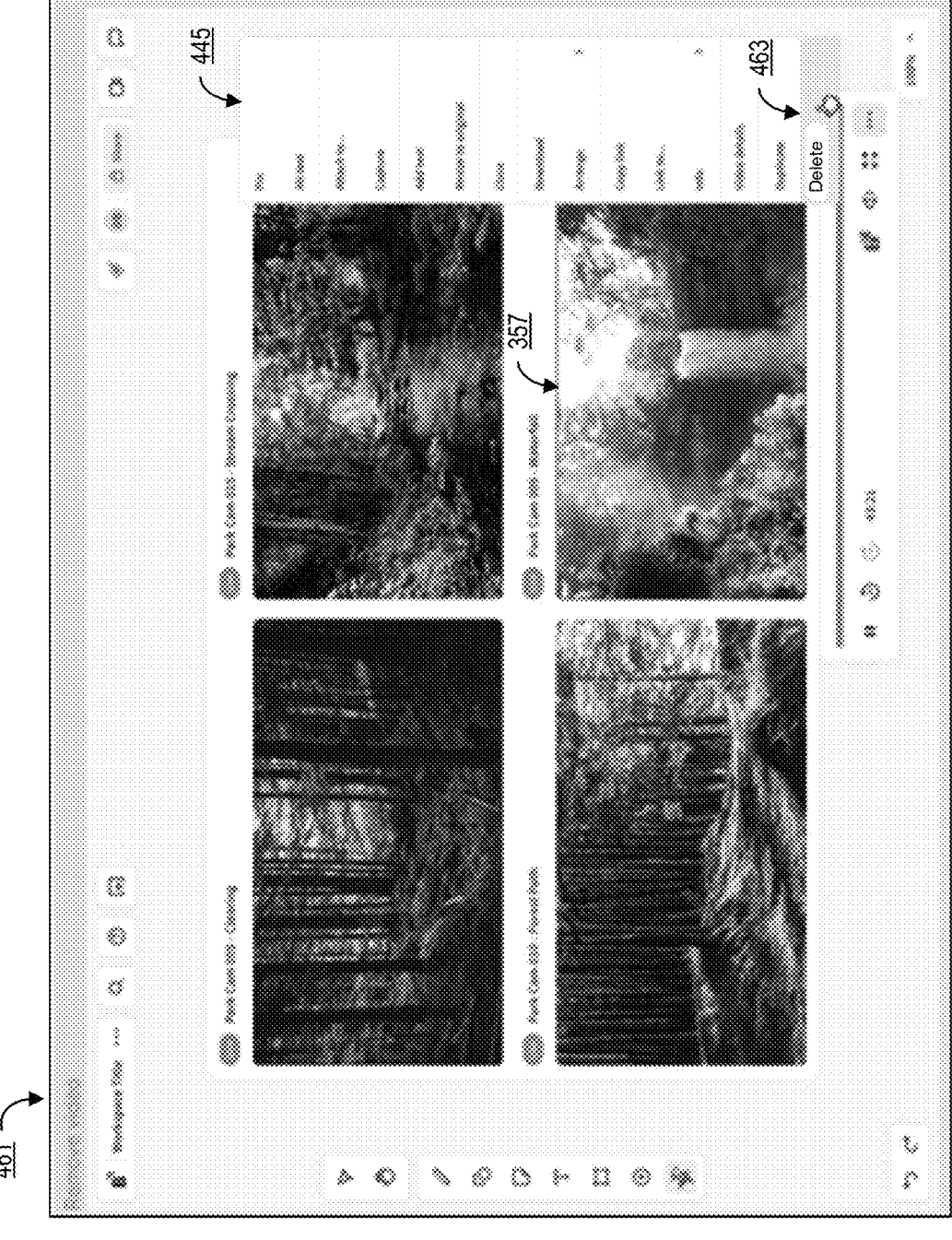

FIG. 4G presents a user interface 461 that shows the menu 445 selected for the live stream object 357. A user selects a "delete" (463) menu item to delete the live stream object 357 from the shared collaboration workspace.

Figure 4H:
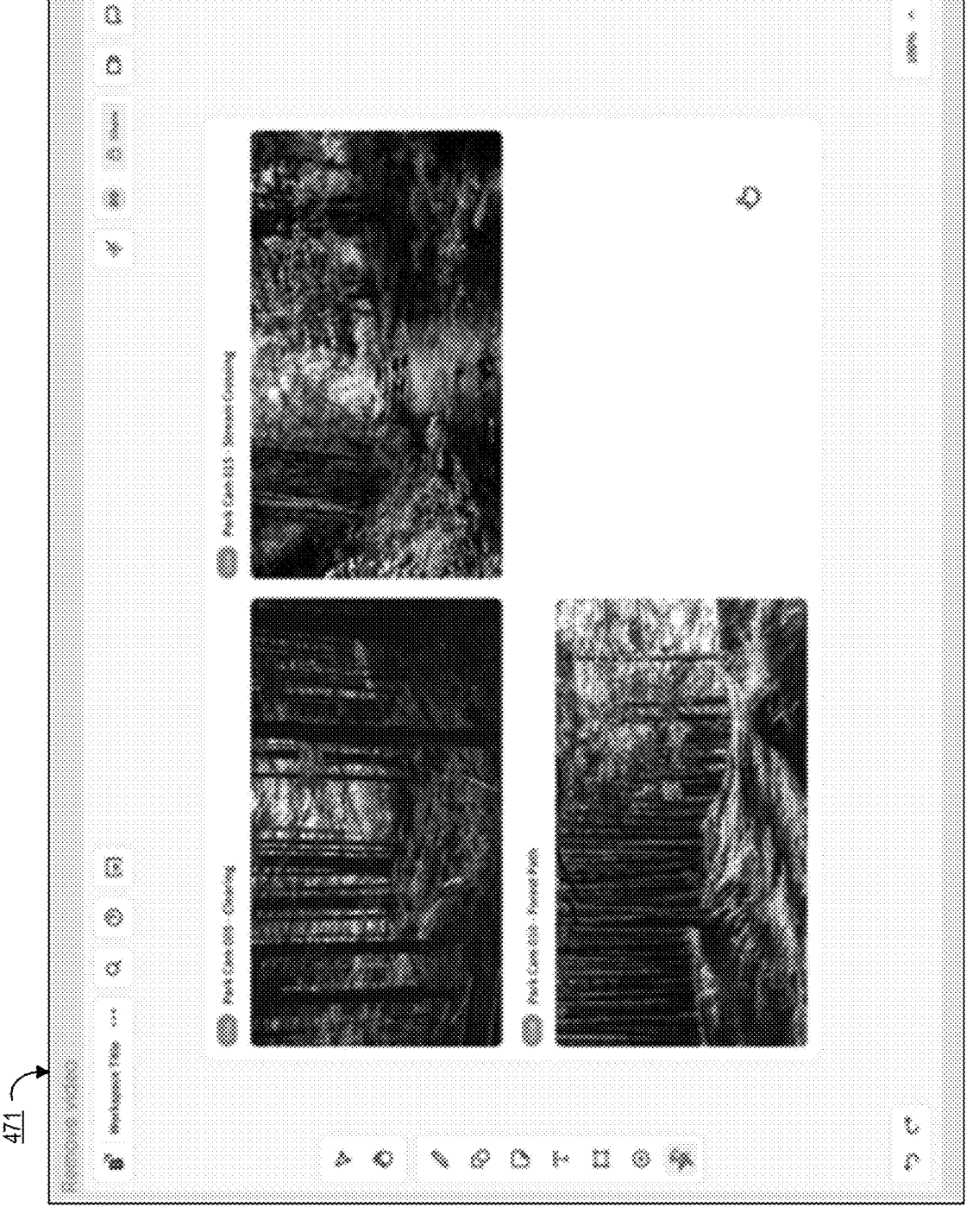

FIG. 4H presents a user interface 471 in which the live stream object 357 of FIG. 4G has been deleted in response to the user selection of the "delete" (463) menu item.

FIGS. 5A to 5E present various arrangements of live stream objects in the shared collaboration workspace. The collaboration system allows the users to arrange the live stream object windows in different sizes as required.

Figure 5A:
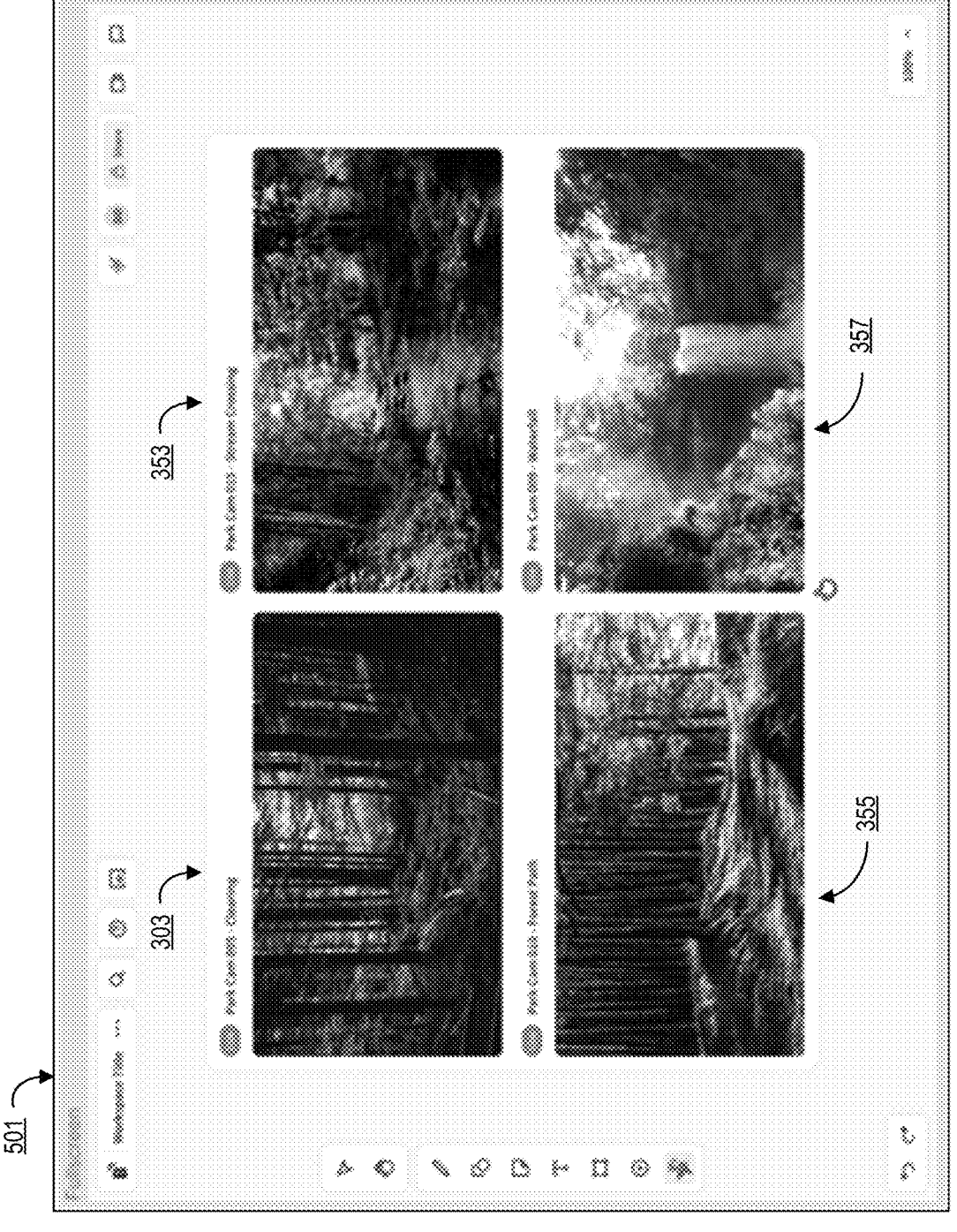
FIGS. 5A, 5B, 5C, 5D, 5E and 5F present user interface elements including a toolbar for arranging a plurality of live streaming objects (or digital assets) in a collaboration workspace.

FIG. 5A presents a user interface 501 in which four live stream objects (303, 353, 355, 357) arranged in a matrix form on a shared collaboration workspace. In the user interface 501, the display screen also includes tool bars or tools arranged along the top edge and the left edge of the screen.

Figure 5B:
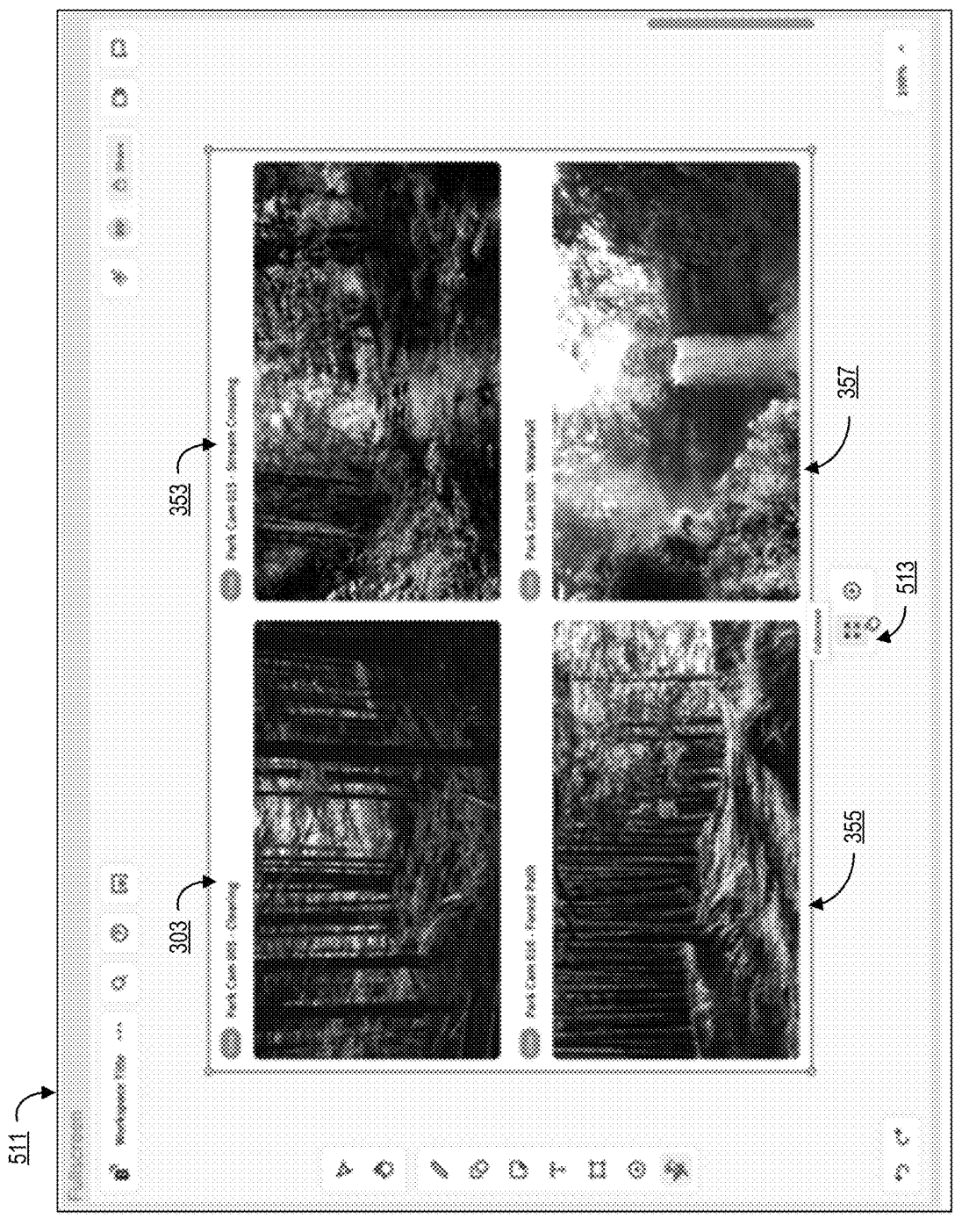

FIG. 5B presents a user interface 511 in which a user selects the four live stream objects (303, 353, 355, 357) arranged in a matrix form and selects a user interface element 513 to display the live stream object in a full screen mode.

Figure 5C:
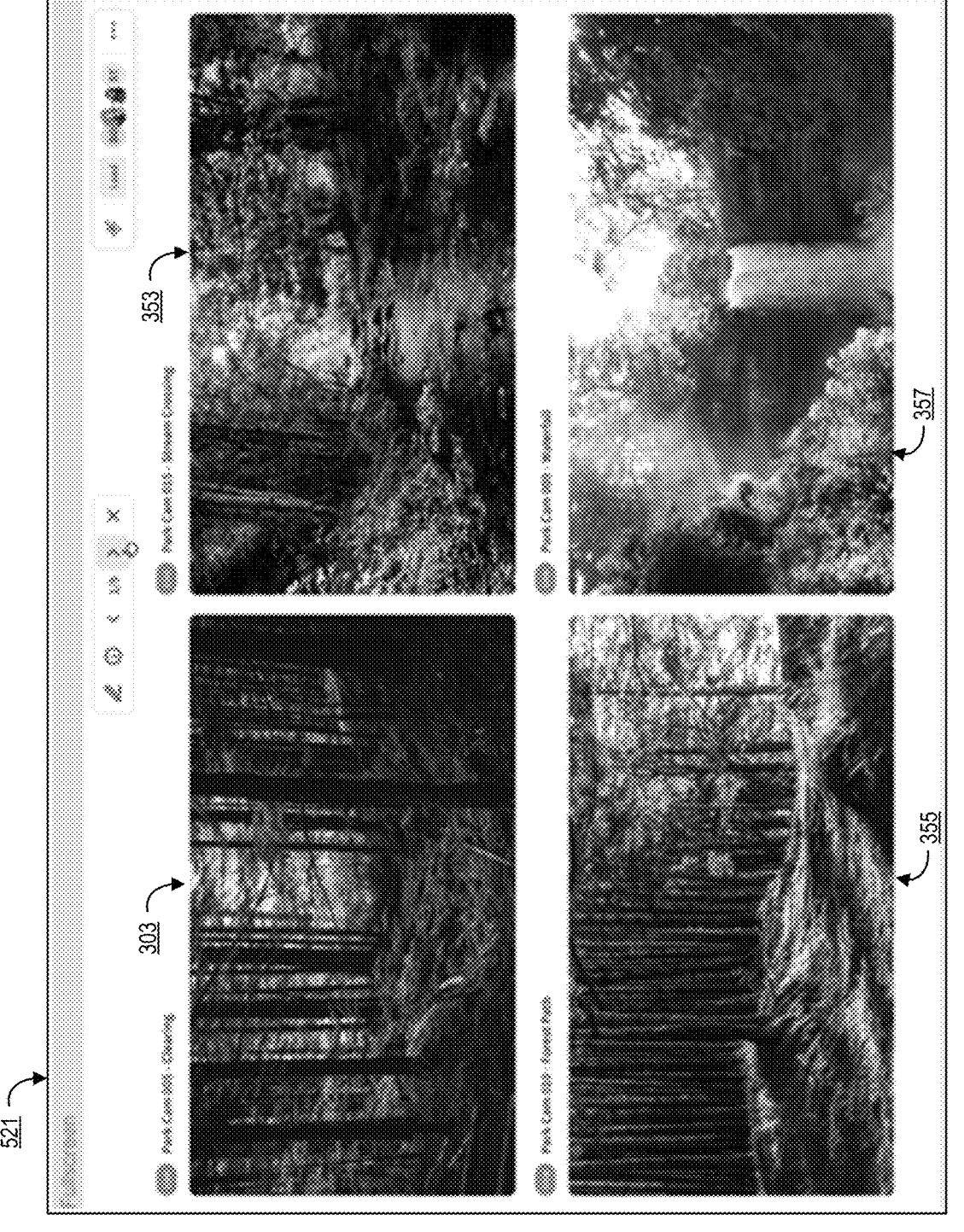

FIG. 5C presents a user interface 521 in which the four live stream objects (303, 353, 355, 357) are displayed in full screen mode in response to user selection of the user interface element 513 as shown in FIG. 5B. Note that the full screen mode of FIG. 5C does not include toolbars along the top and left edges of the display screen as in FIGS. 5A and 5B. Further, in this mode, another toolbar is displayed (top center) that allows the user to initiate various functions, such as selecting different live stream objects, annotating live stream objects, and/or initiating a scrubbing feature to rewind and fast forward a live stream object.

Figure 5D:

FIG. 5D presents a user interface 531 in which the live stream object 303 is displayed in full screen mode. Only one live stream object (303) is displayed in the display area of the digital display.

Figure 5E:

FIG. 5E presents a user interface 541 in which a user selects a user interface element 543 from the toolbar 403 to display the selected live stream object 357 in full screen mode.

Figure 5F:
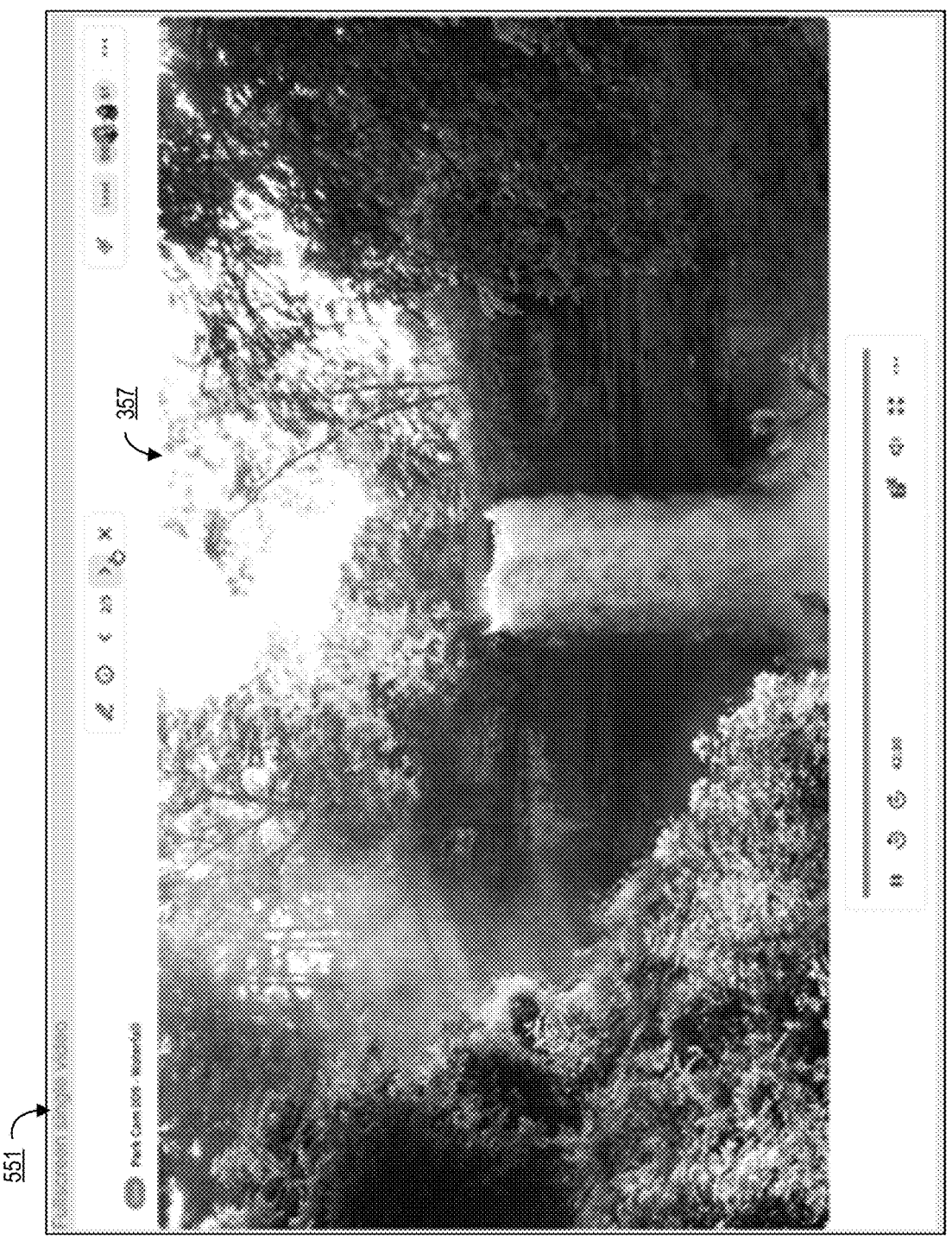

FIG. 5F presents a user interface 551 in which the live stream object 357 is displayed in a full screen mode in response to the user selection of the user interface element 543 from the toolbar 403 as shown in FIG. 5E.

Figure 6A:
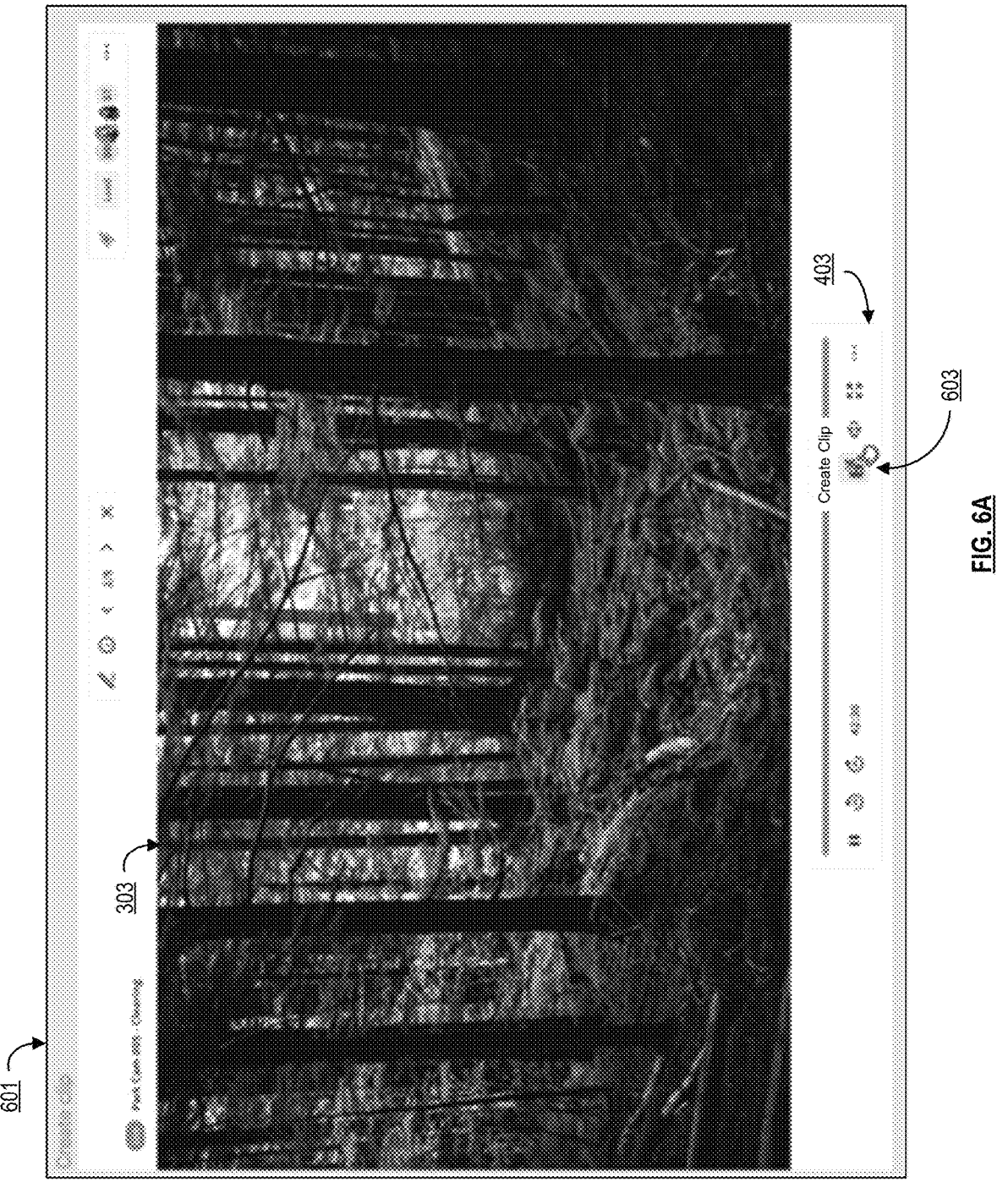
FIGS. 6A, 6B, 6C and 6D present an example of creating a video clip from live streamed data in a collaboration workspace.

FIG. 6A presents a user interface 601 that displays a live stream object 303 in full screen mode. The user interface 601 also displays the toolbar 403. The user can select a user interface element 603 on the toolbar 403 to "create clip" from the live streaming video in the live stream object 303. The clip created using the clip creation tool 603 is stored in a storage linked to the collaboration server and is available for playback in a shared collaboration session.

Figure 6B:
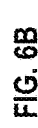

FIG. 6B presents a user interface 611 that displays a "create clip" user interface 613 to create a clip from the live stream object 303. The user can create a name for the clip in the user interface 613 and choose the duration of the clip or select a starting frame and ending frame from the video frame viewer 615 in the create clip user interface. The video frame viewer provides a user interface element 616 to scroll through the image frames for selection of a starting frame when creating the clip. The user can select the "create clip" button on the create clip user interface 613 to create the clip.

Figure 6C:
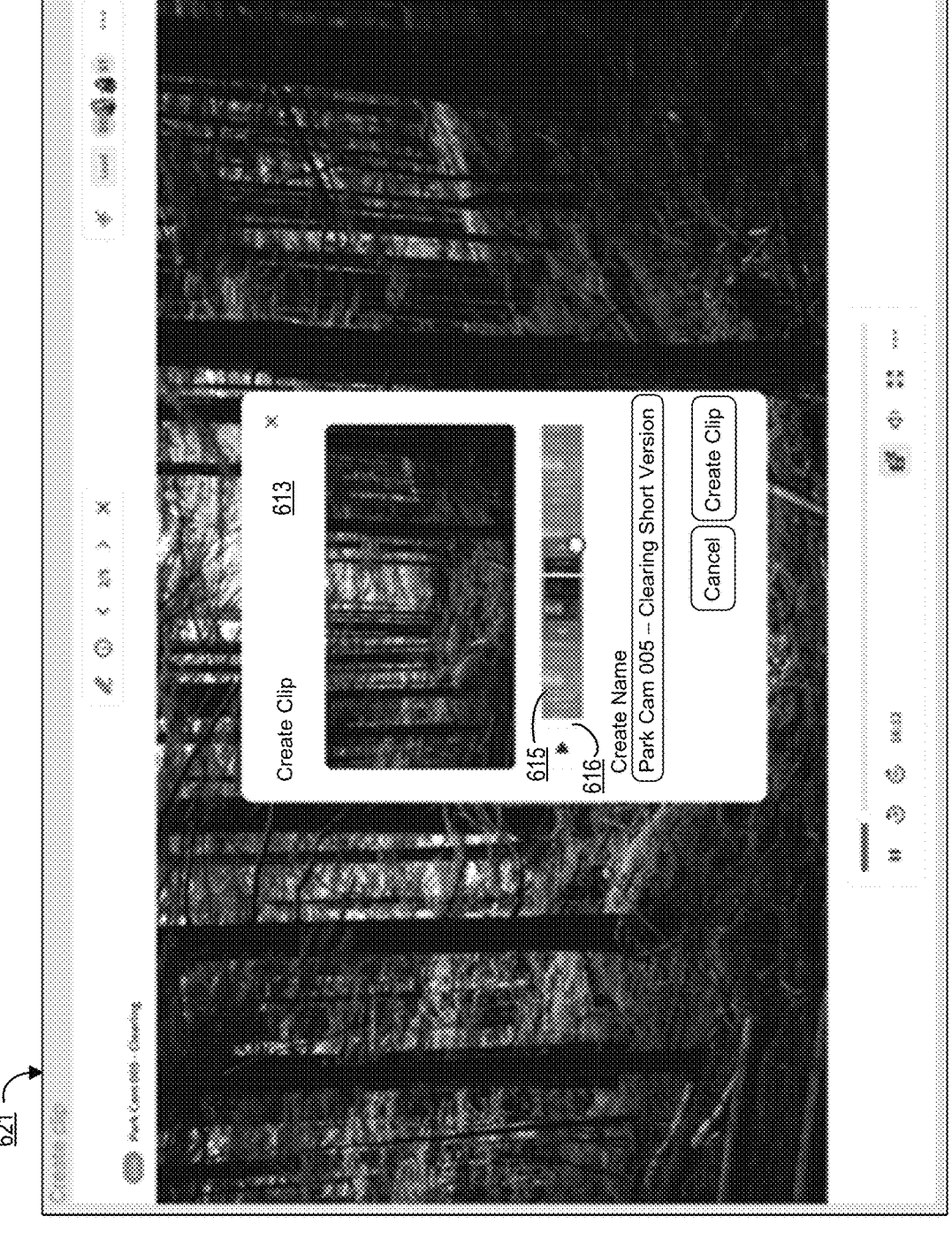

FIG. 6C presents a user interface 621 in which the user selects the starting and ending frames using the frame viewer 615 to create the video clip.

Figure 6D:
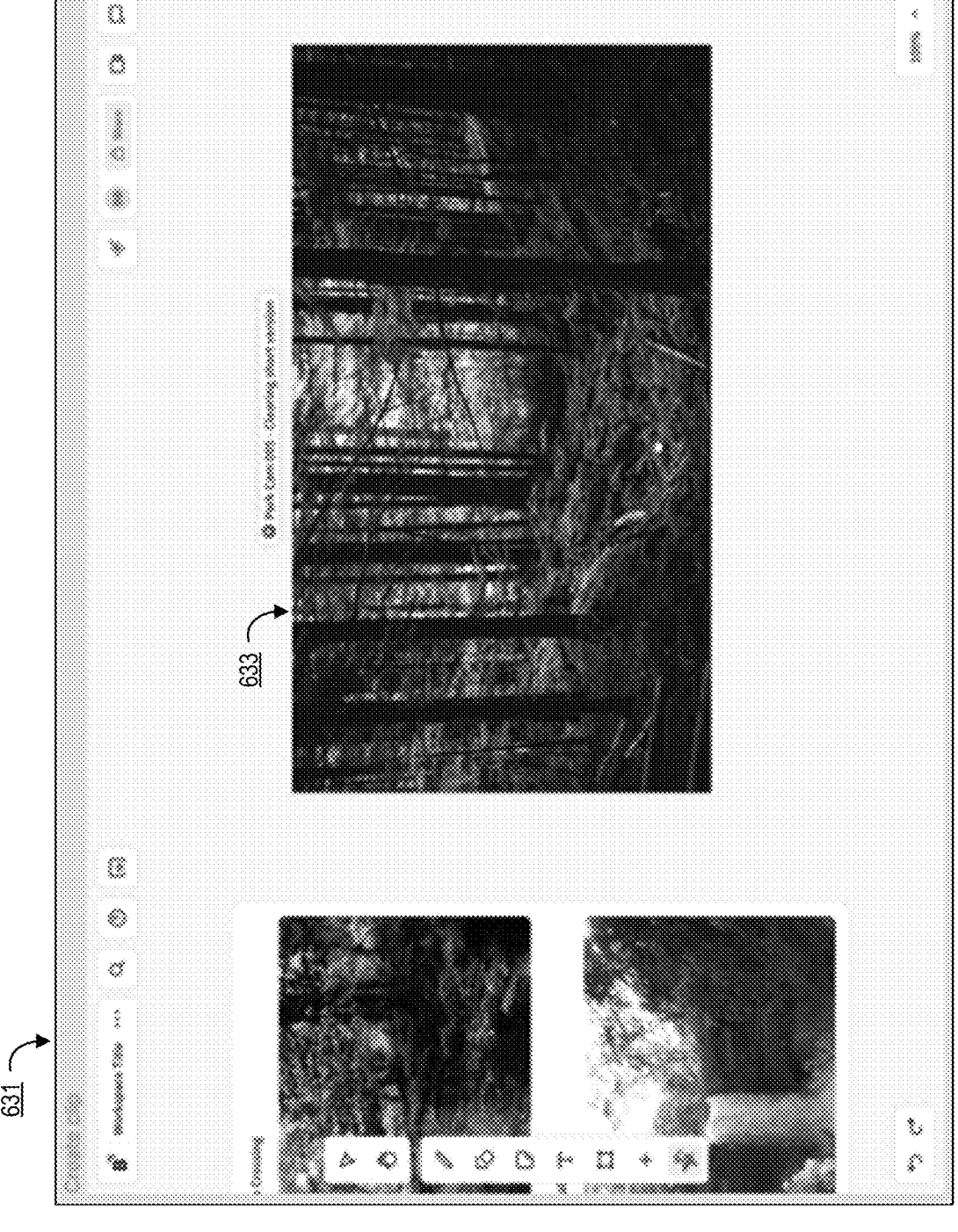

FIG. 6D presents a user interface 631 in which the video clip created by the user using the "create clip" user interface 613 is displayed in a user interface of a video object (633) on the shared collaboration workspace in the collaboration session. The user can playback the video clip in the user video object 633.

The technology disclosed includes logic to screen cast content from one or more users in a collaboration session in live streaming objects. The participants of the collaboration session can view the display screen or a portion of the display screen as shared by the user in the live stream object.

Figure 7A:
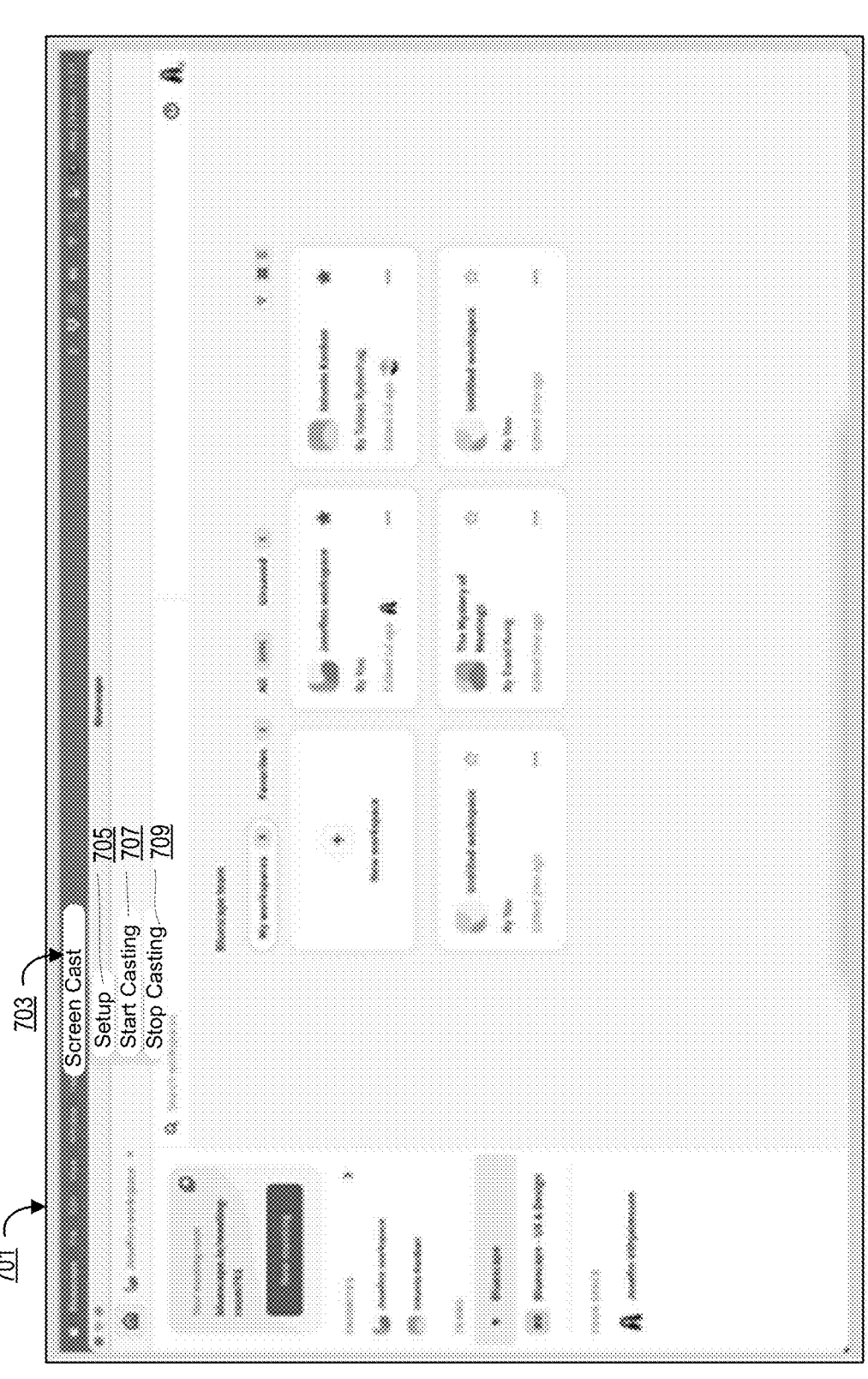
FIGS. 7A, 7B, 7C, 7D, 7E, 7F and 7G present an example of setting up screen casting in a collaboration workspace.

FIG. 7A presents a user interface 701 that illustrates a drop down menu "screen cast" (703) for screen casting the viewport or a portion of the viewport of a user's digital display in a collaboration session. Screen casting allows other participants to join the collaboration session and view, at least, the portions that are "casted" from the user. The screen cast menu 703 includes menu items to "setup" (705) the screen casting, "start casting" 707 and "stop casting" 709 the screen casting during a collaboration session.

Figure 7B:
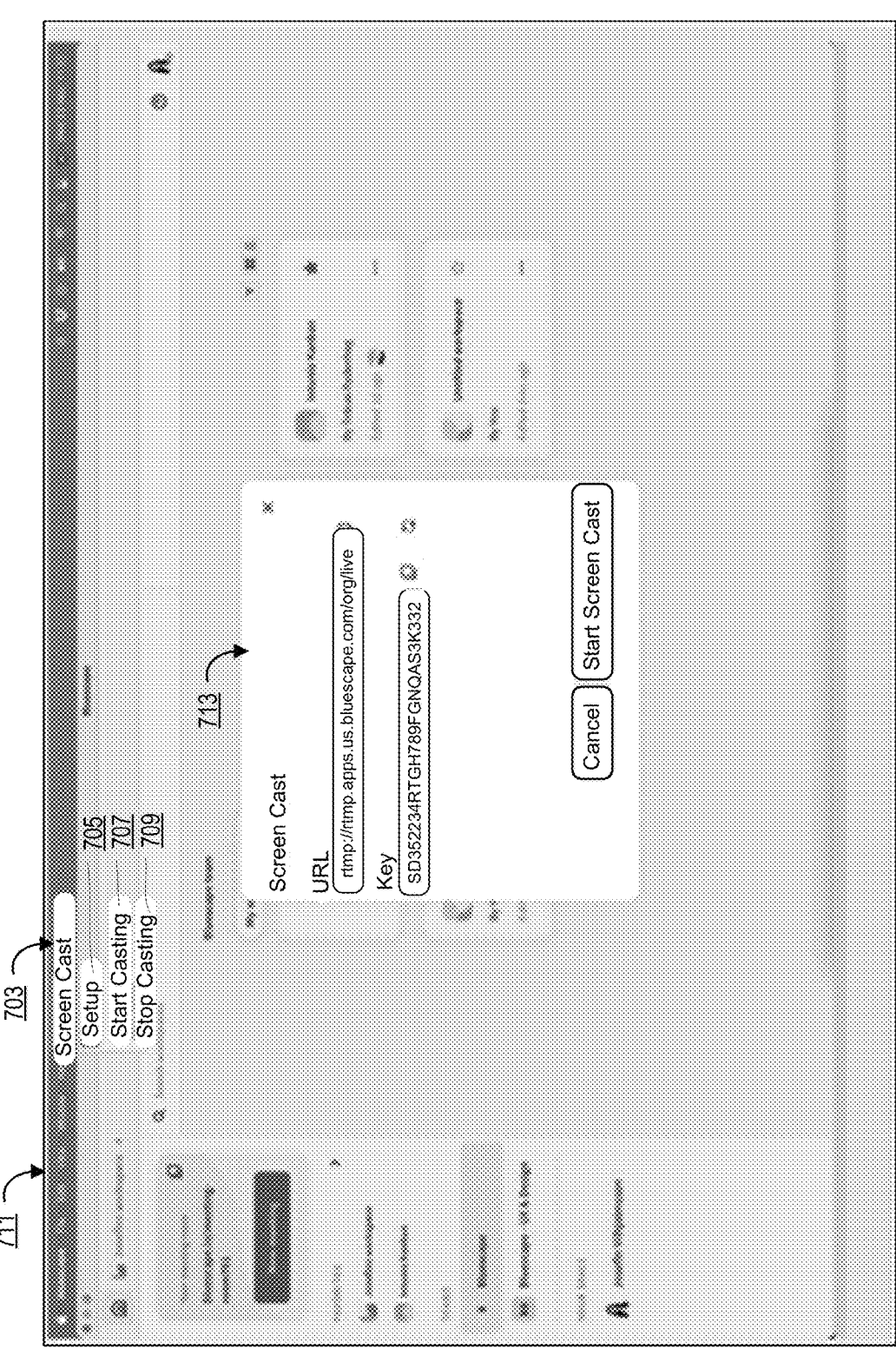

FIG. 7B presents a user interface 711 which includes a screen cast dialog box 713 that is displayed when a user selects the "setup" menu item 705 from the "screen cast" menu 703. The user can enter the URL and Key for the screen cast. This information will be entered by the other participants in their respective computing devices when they want to join this screen cast. The user can select the "start screen cast" button on the user interface 713 to start the screen cast.

Figure 7C:
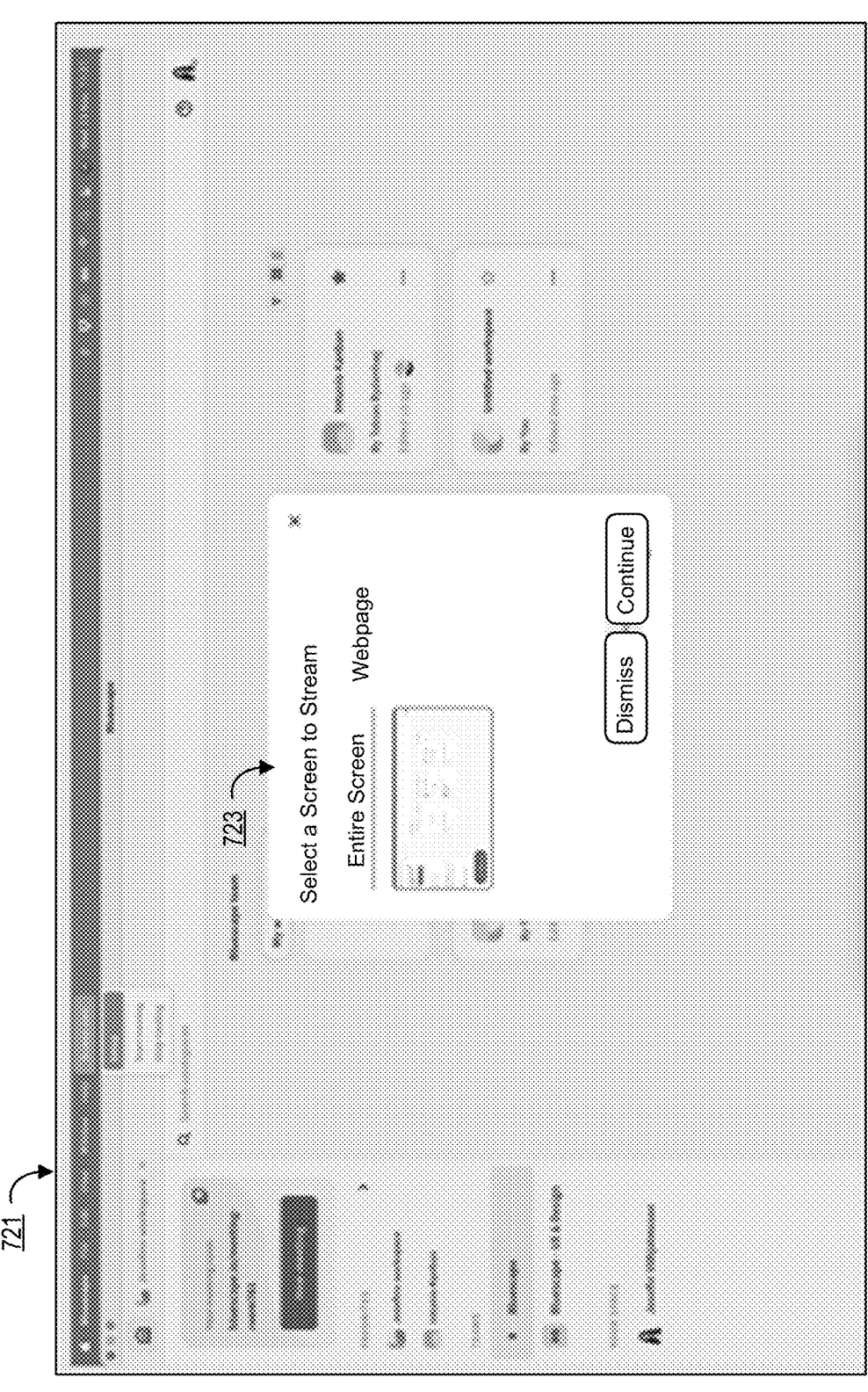

FIG. 7C presents a user interface 721 that includes a user interface 723 displayed on the display screen in response to the user's selection of the "start screen cast" button in FIG.

7B. The user interface 723 presents an option to the user to screen cast the entire screen or to select a webpage for screen casting. The user interface 723 can provide other options to the user as well such as providing a list of software or web applications from which the user can select one or more applications for screen casting. The collaboration system can also provide an option to the user to select a portion of the screen (such as by drawing boundary using a cropping tool or selecting points on the digital display) for screen casting.

Figure 7D:
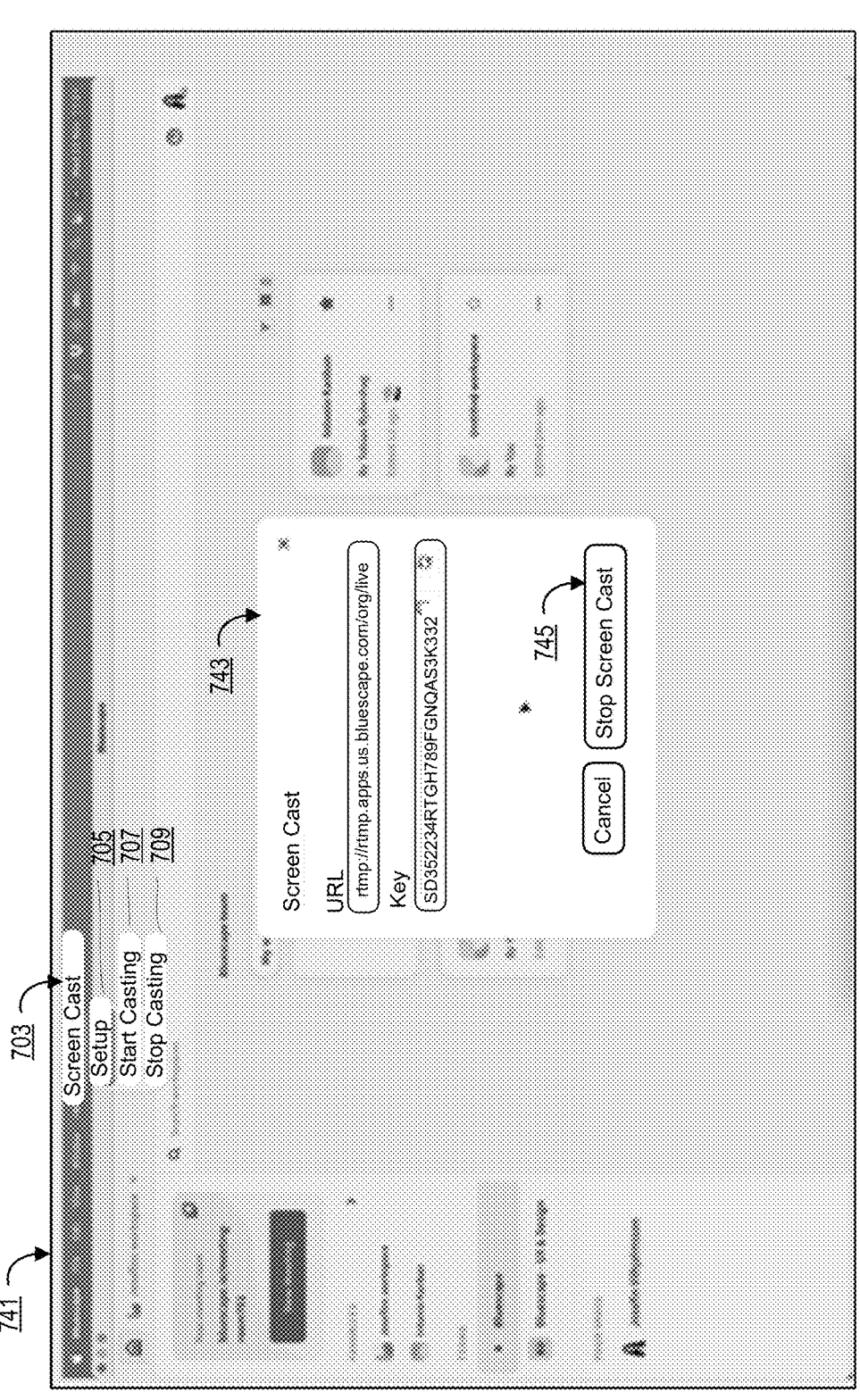

FIG. 7D presents a user interface 741 that includes the screen cast user interface 743. The screen cast user interface is displayed in response to the user's selection of "stop casting" (707) menu item from the screen cast menu 703. The user interface 743 displays the details of the ongoing screen cast session such as its URL and Key as shown on the user interface 743. The user can select a user interface element (such as a button) 745 to stop the screen cast. This selection will then stop the screen cast and the display screen or selected application from the user's computing device will not be screen casted to other participants of the collaboration session.

Figure 7E:
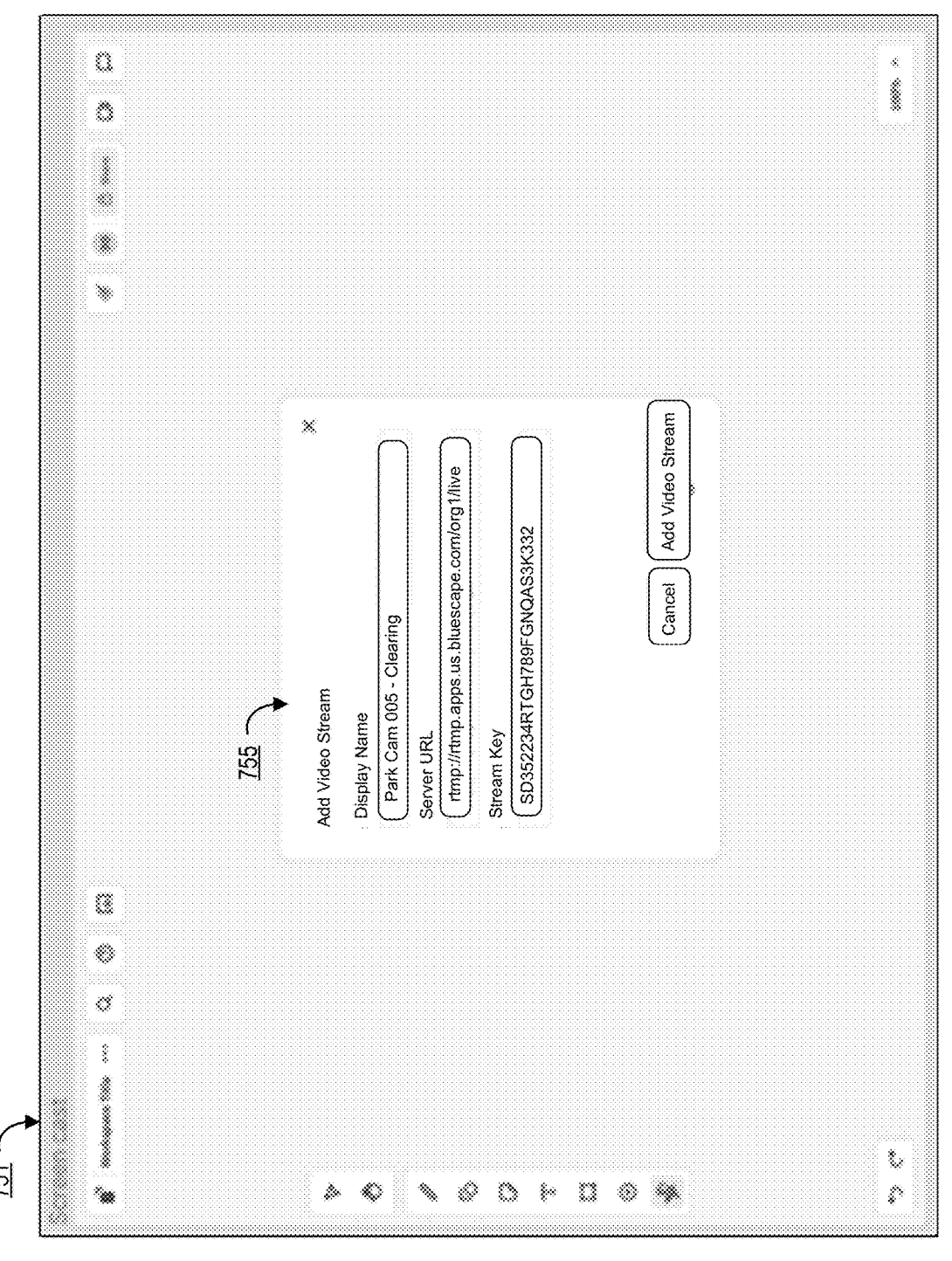

FIG. 7E presents a user interface 751 that illustrates that a user can add one or more video streams to the screen cast session. For example, the user can select the "add video stream" user interface or dialog box 755 to provide the details of the video stream that will be included in the screen casting session. The user can select "add video stream" button on the user interface 755 to create the live streaming object that will display the live video stream from the source camera.

Figure 7F:
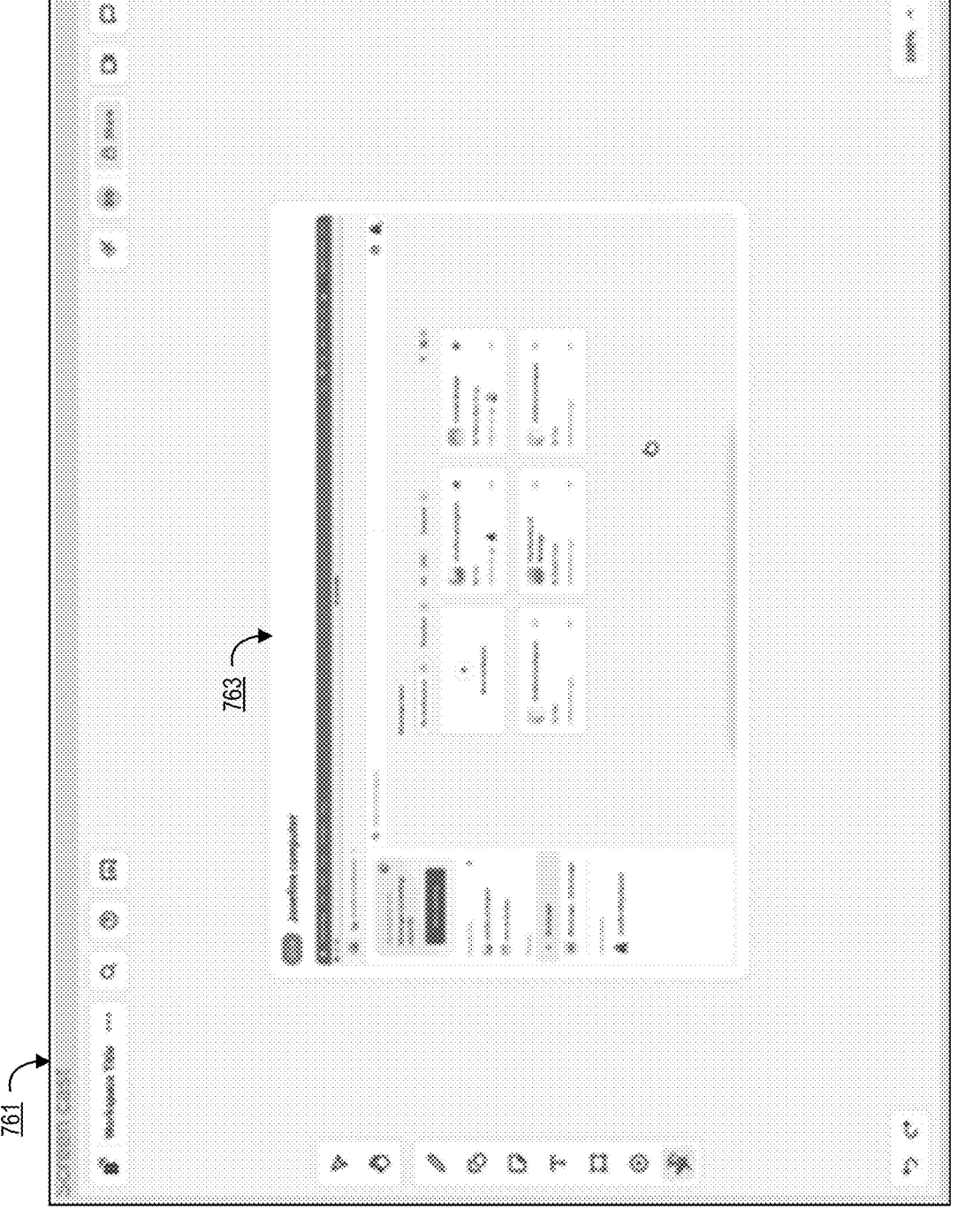

FIG. 7F presents a user interface 761 that includes another user's screen cast 763 displayed on the shared collaboration workspace. The user interface 763 can provide a name of the user whose computer screen or application is being screen casted and also include a user interface element indicating an active or a live screen cast session in progress. For example, a red color graphical icon or a user interface element with a label "Live" on the top left corner of the user interface 763 indicates that the window 763 is displaying a live screen cast session.

Figure 7G:
Figure 8:
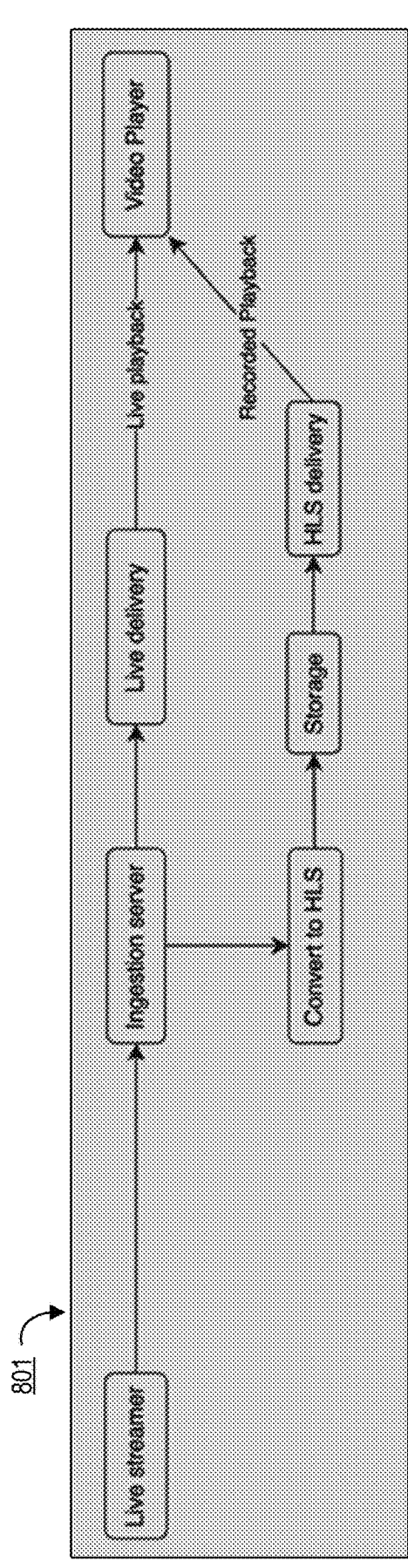
FIGS. 8 and 9 present example architectures for implementing live streaming of data in a collaboration workspace.
Figure 9:
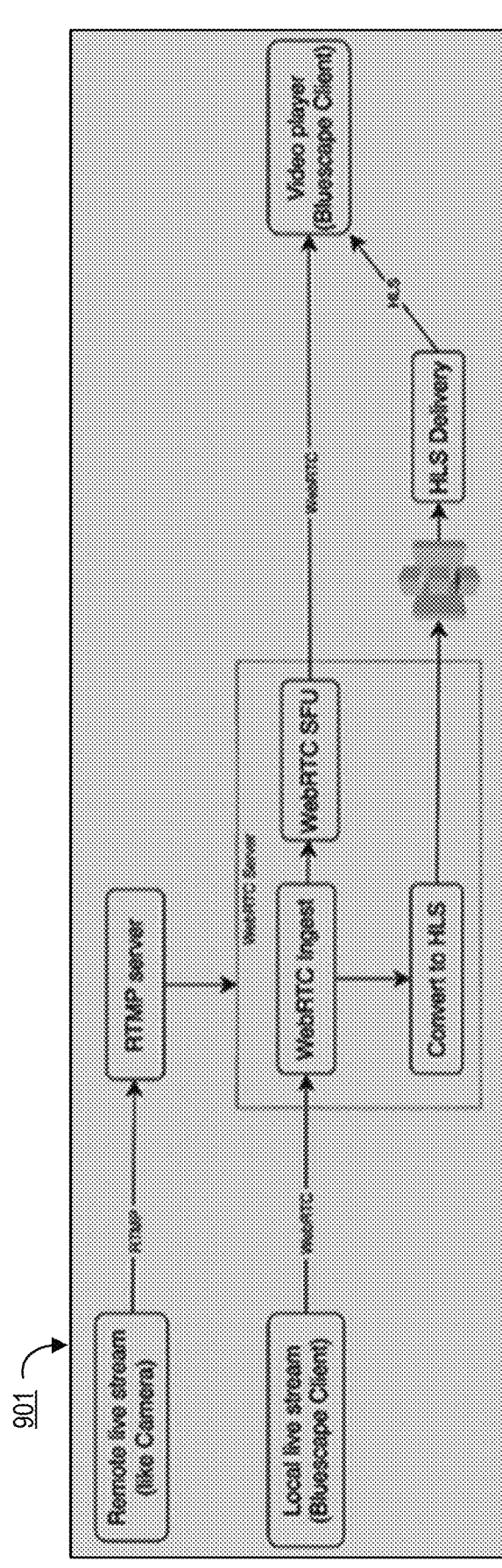

FIG. 7G presents a user interface in which multiple screen cast sessions are displayed on a shared collaboration workspace. For example, the user interface 771 includes four screen cast sessions that are displayed in four windows labeled as 773, 775, 777 and 779. Each screen cast window is displaying content from a different source computing device. The data related to the source computing device such as the name of the computing device can be presented on the top part of the screen cast window. The screen cast session can include the live stream objects and can also include content from the virtual workspace of another participant. Architecture for Live Streaming and Screen Casting in a Shared Workspace FIGS. 8 and 9 present and example architecture for implementing the live streaming and screen casting technology as described above. The architecture presented in FIGS. 8 and 9 is an example implementation of the technology disclosed, it is understood that the technology disclosed can be implemented using additional or alternative architectural components. Alternate arrangements of architectural components and alternate data flows between components can be used to implement the live streaming and screen casting in a shared collaboration workspace as presented above.

The technology disclosed can add live video object to a shared collaboration workspace for live streaming of video content. The live video object can be provided content from a local live stream or a remote live stream. The technology disclosed can support WebRTC protocol for local live streaming of content and RTMP or RTMPS protocol for remote live streaming of content. The technology disclosed can play the local live stream in real-time latency and remote live stream in low latency using the WebRTC instead of HLS protocol in playback to achieve this performance. The technology disclosed can play recorded live video with synchronized playback in which the playback at the followers' computing devices are synchronized to playback of the video at the computing device of the leader of the collaboration session.

The following types of objects and data are used by the technology disclosed to implement the live streaming in a shared collaboration workspace:

Video object: This object is created when a video file is uploaded to shared collaboration workspace.

Live video object: The video object that is created when a live stream is added to the shared collaboration workspace.

Live stream: Any content that is received by the collaboration system as a stream of data is referred to as a live stream.

Local live stream: A stream of data that is received from the same computing device on which the user is running the client-side logic of the collaboration system. Examples of such sources include desktop screen, desktop window, webcam, video capture card, a USB storage device, etc.

Remote live stream: Remote live stream content is received from remote devices or remote sources over a communication protocol. The remote sources of live streaming data can include cameras installed at remote locations and connected to the client computing device directly or via one or more severs. The remote device (such as camera) which is the source of the streaming data does not need to run a client-side computing logic of the collaboration system.

Stream Key: Stream key is a security token that is used for authenticating the incoming data streams to the server of the collaboration system.

Real-time latency: This is the latency in the live stream playback and is usually less than one second.

Low Latency: This is the latency in live stream playback and is usually more than real-time latency (which is around one second) but less than five seconds.

FIG. 8 presents an illustration 801 presenting two modes of content streaming that can be performed by using the technology disclosed. The first mode is known as live playback and the second mode is referred to as recorded playback. FIG. 8 present a high-level diagram of components that can be used to implement the live and recorded playback of streaming content in the shared collaboration workspace.

The first path (on the top) in FIG. 8 includes components (live streamer, ingestion server, live delivery component, video player) that implement the live streaming of content such as live video streaming. The live content is delivered directly from the ingestion server. The collaboration system uses WebRTC protocol for delivering live streaming content to the video player. Note that the collaboration system can use other video stack and delivery protocols to deliver the live streaming content to the video player. WebRTC technology improves the real time playback of live stream data and help to achieve low latency in live stream playback.

The second path (on the bottom) in FIG. 8 includes components (live streamer, ingestion server, converter to HLS encoding, storage to store the streaming data, HLS delivery component to the video player, and the video player to playback the recorded video) that implement the recorded playback of streaming content such as playback of recorded videos. The recorded content is delivered from the storage where the video or other type of content is stored. The collaboration system uses HLS component to the deliver the recorded live stream content (such as recorded videos from live stream videos) to the video player. Note that the collaboration system can use other video stack and delivery protocols to process and deliver the recorded streaming content to the video player.

FIG. 9 (labeled as 901) presents two types of ingestion processing logic of streaming content that can be performed by the technology disclosed. The first type of ingestion processing logic is for RTMP streams and the second type of ingestion processing logic is for WebRTC streams. The video player uses WebRTC protocol to playback live streaming data and HLS protocol to playback recorded videos from live streaming content. The RTMP server in FIG. 9 (also referred to as RTMP ingest server) accepts live streams from remote live streaming sources such as cameras, IP-cameras, etc. The WebRTC ingest server accepts live streams from the local live streaming sources such as the client device. The collaboration system includes logic to deliver the WebRTC input as WebRTC stream to client-side computing devices. The collaboration system may not perform any operations on the live streaming content when delivering the live streaming data to the client devices that play the live streaming data on video player. The RTMP input data can be changed to WebRTC format when delivered to client devices.

Figure 11A:
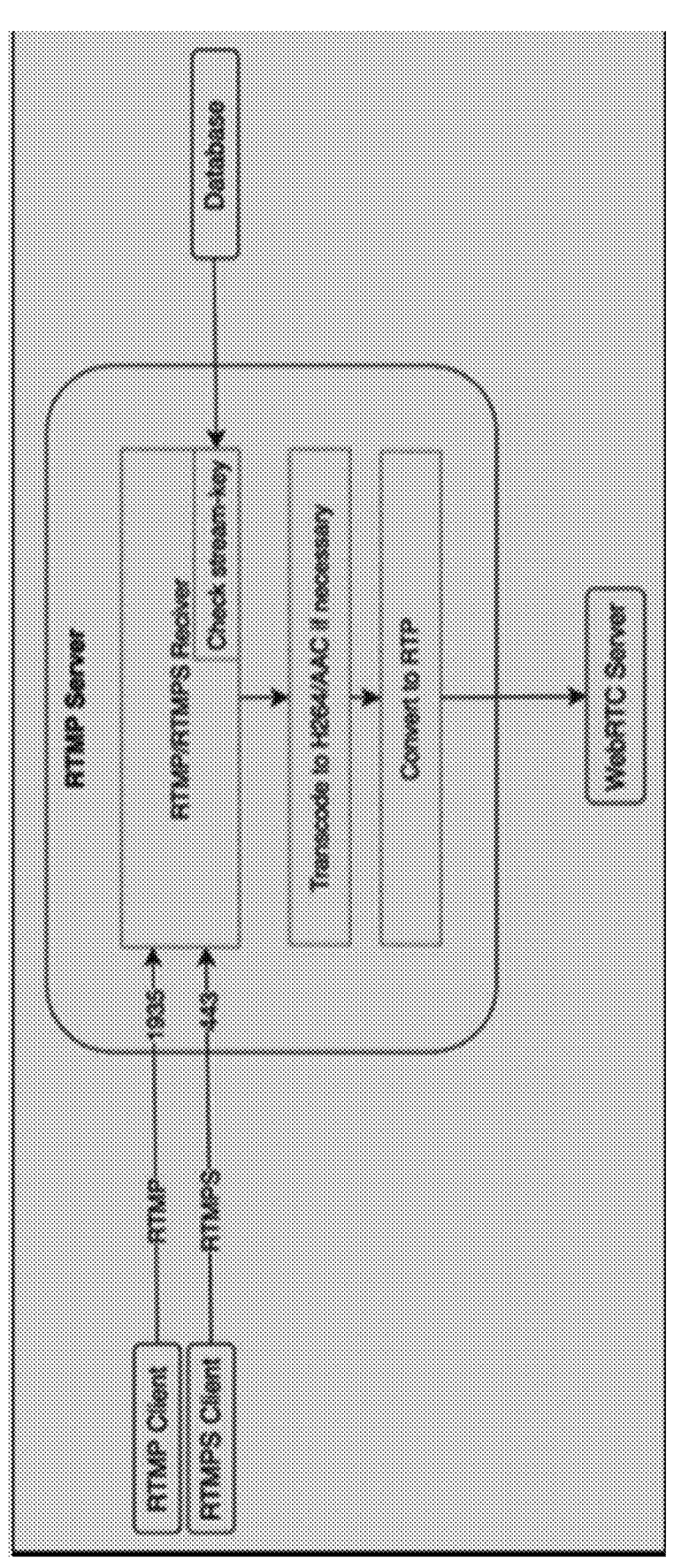
Figure 11B:
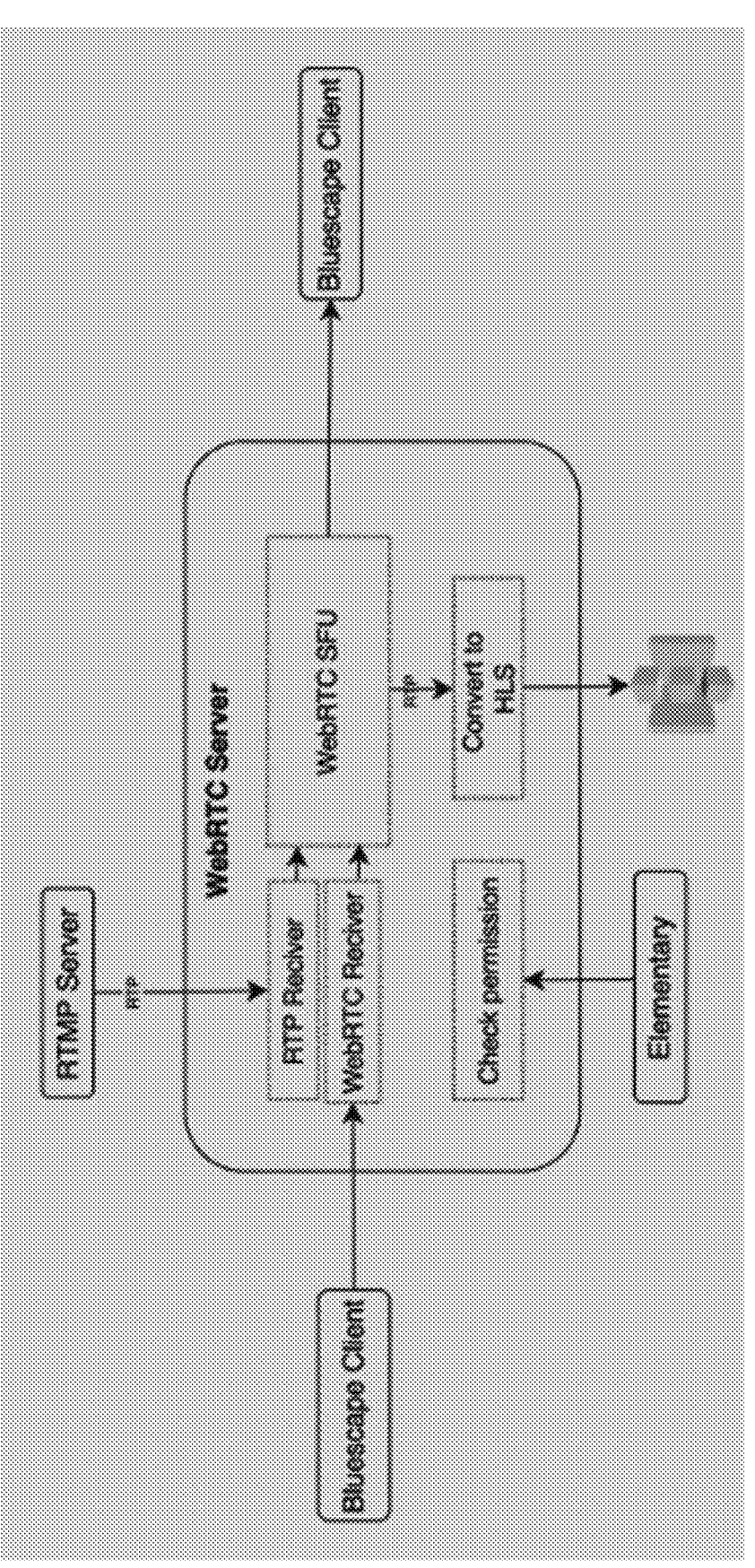
Figure 11C:
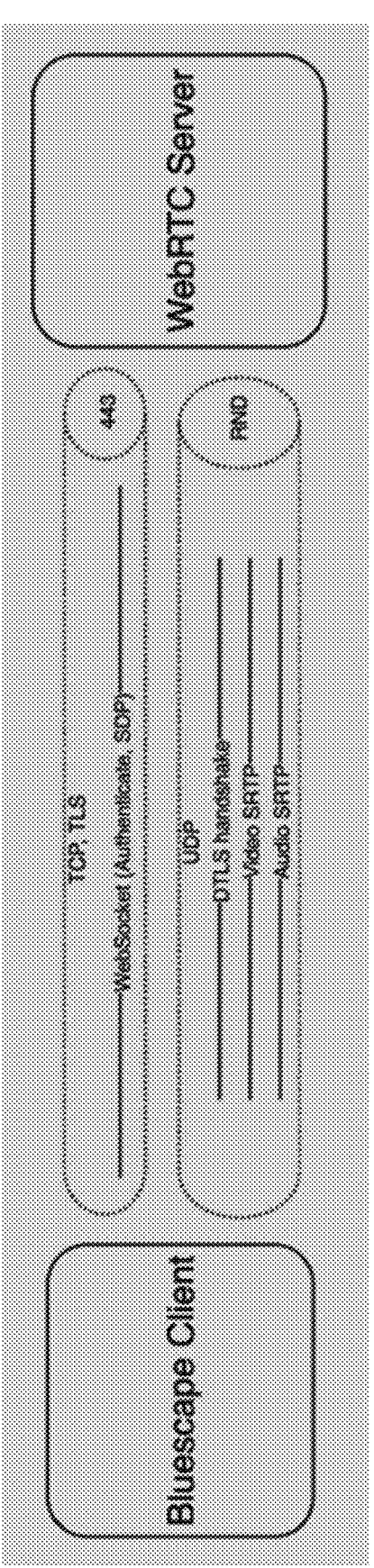

FIGS. 11A, 11B, 11C and 11D present example implementation of the technology disclosed. FIGS. 11A, 11B and 11C present details of the RTMP server implementation, RTMP server security implementation, WebRTC server implementation, WebRTC server security implementation. These examples also present details of scalability of RTMP server and WebRTC server implementations.

The RTMP server can receive RTMP and RTMPS streams and send them to WebRTC server. The RTMP server has two TCP ports. The port 1935 listens to RTMP clients and the port 443 listens to RTMPS clients beard each client can have a stream key that allows the client to stream video to the server. RTMP server can do transcoding on the stream if it's codecs a note H264/AAC. The RTMP server can convert the data stream to RTP to send the data to WebRTC server. The WebRTC server can then share the data stream with client devices participating in the collaboration workspace.

Transcoding can be performed on some input data streams depending on their coded type. The RTMP server can be implemented separately from the WebRTC server so that the RTMP server can run on GPU devices (or GPU nodes).

The technology disclosed can use stream-keys all identifiers to protect access from unauthorized users. The stream-key or the identifier can be generated by a client device or by the server for use by the client device. A data stream can be sent to RTMP server using two parameters: A uniform resource locator (or URL) of the RTMP server and a stream-key that can be unique for each live stream (or video stream).

The technology disclosed supports RTMPS protocol in addition to RTMP protocol. The RTMPS protocol uses TLS to support secure connections. It can also use port 443 that is usually open in firewalls.

The WebRTC server can have the following three responsibilities.

(1) The WebRTC server can act as a WebRTC media server for delivering local streams of data amongst client device Participating in the collaboration session. The WebRTC server can act like a collaboration server. A client device can send a live stream to the server and another client device participating in the collaboration session can access the live stream or streaming data if the client device has permission or has credentials to access the streaming data.

(2) The WebRTC server can convert live streaming data to RTMP for sending the streaming data to client device. This can reduce the latency. A different codec such as HLS can be used for recording the live streaming data for playback of the live streamed data.

(3) The WebRTC server can convert live streamed data to HLS for storing the data to cloud-based storage such as S3 for use in playback when requested by the client devices. The technology disclosed can multiplex audio and video streams and generate HLS playlists and media segments such video clips, etc.

FIG. 11C shows a connection or data communication between a client device (labeled as Bluescape Client) and the WebRTC server (also referred to as a server). There are two connections between the client device and server: A TCP/TLS connection and a UDP connection. The technology disclosed can use a TCP/TLS connection to establish a WebSocket to do the WebRTC signaling functions. The WebSocket can be used to handshake user identify and authentication. This can also be used to transfer media connection configuration in SDP. WebRTC server can listen on 443 port for WebSocket connection. A UDP connection can be used to handle DTLS and SRTP. The DTLS is based on TLS for UDP. The technology disclosed can use a cryptography key for SRTP. The SRTP is used to secure video and audio channels. The technology disclosed can open a random UDP port to receive any video and audio stream from a client device. This can be different for each client and media type.

The client device (labeled as Bluescape client in FIG. 11C) can broadcast to WebRTC. The technology disclosed can use a collaboration workspace security model to check the permission of the sender. The technology disclosed can check whether a user has required authorization to stream data such as the user can be required to have "edit" permission in a collaboration workspace to be able to send live stream data in a collaboration session to other client device.

The technology disclosed can use TLS in signaling connection and it can use DTLS and SRTP in media connections. The technology disclosed supports AES128 and AES256 security protocols.

The technology disclosed can record live streaming data in HLS format. The technology disclosed can generate a dynamic manifest for HLS as the start and end of a live data stream are unknown. The media segments can be stored in a cloud-based storage such as S3. The HLS manifest may not be stored with the video in the cloud-based storage. The technology disclosed can store metadata to generate a dynamic manifest. The segment's (or media clip or video clip) timestamp and sequence in the name of the file is stored to identify the segment.

The RTMP server can ingest the individual data stream and send it to the WebRTC server. This can be replicated when the number of streams increase. The technology disclosed can do replication based on resource usage of PODS in Kubernetes.

The WebRTC server can implement a different scalability model. For each of the data streams, the technology disclosed can have a room in one of the WebRTC PODS. The receiver of the stream needs to know in which POD the room of the stream exists. The technology disclosed implements a programmable load balancer to handle the traffic. Suppose we have multiple instances of WebRTC server. The following steps can be used for sending the stream.

A client device (or RTMP server) connects to the Load balancer.

The Load balancer chooses a WebRTC instance and passes traffic to it. The Load balancer can store a WebRTC instance IP and live video stream identifier in a database.

The following steps can be used for receiving the live data stream.

A client device connects to the Load balancer.

The Load balancer gets the WebRTC instance IP from database for the live video identifier.

The Load balancer passes traffic to that WebRTC instance.

For security mode, the technology disclosed can generate an access token and give it to the remote streamer. The technology disclosed can generate an access token with the name stream key. The following steps can be used for adding RTMP live video to Workspace.

(1) The user can add an RTMP live video object to collaboration workspace.

(2) The client device can generate the stream key and gives it to the user and stores it in DB: (stream-key, user-id, workspace-id, object-id).

(3) The user with an external RTMP streamer sends a stream with stream-key.

(4) The RTMP server searches stream key in database, if the server does not find the stream key, it rejects the client, if the server finds the stream key, it has workspace-id, user-id, and object-id:

(a) It checks if the user is valid and is the owner of the object.

(b) It checks if the workspace and the object are valid.

Send a local live stream: For sending the local live stream, the following operations are performed.

The local live stream is generated by the Bluescape client. It means we know which user wants to send a stream. The technology disclosed may only allow the owner of the live video object to stream live video:

(1) The user adds a live video object to collaboration workspace.

(2) The client device can request the WebRTC server to broadcast a live stream for the live video object.

(3) The WebRTC server checks if the user has EDIT permission and also if the user who is requesting the live streaming object is the owner of the live streaming object such as the live video object.

Receive live stream from Back-end: For receiving the live stream, the following operations are performed.

Like other objects or digital assets inside workspace or the collaboration workspace, the technology disclosed can deliver live streams inside the workspace. The client device can receive and play live video or other types of live stream objects. It means the technology disclosed can check the permission of the receiver like other objects. The technology disclosed can allow the user to play live video if he/she has "view" permission in workspace or collaboration workspace.

FIG. 11D presents example of live stream object (or a live stream video object) that can be added to a collaboration workspace.

FIG. 11E presents details of the data elements that comprise the video object data structure as shown in FIG. 11D.

FIG. 11F presents details of the delivery API to deliver recorded video content to client-side computing devices for playback.

FIG. 11G presents duration API for live stream data.

FIG. 11H presents API for managing RTMP stream key in the database.

FIG. 11I present examples of storage, configuration parameters and metrics for live stream data.

Computer System

Figure 10:
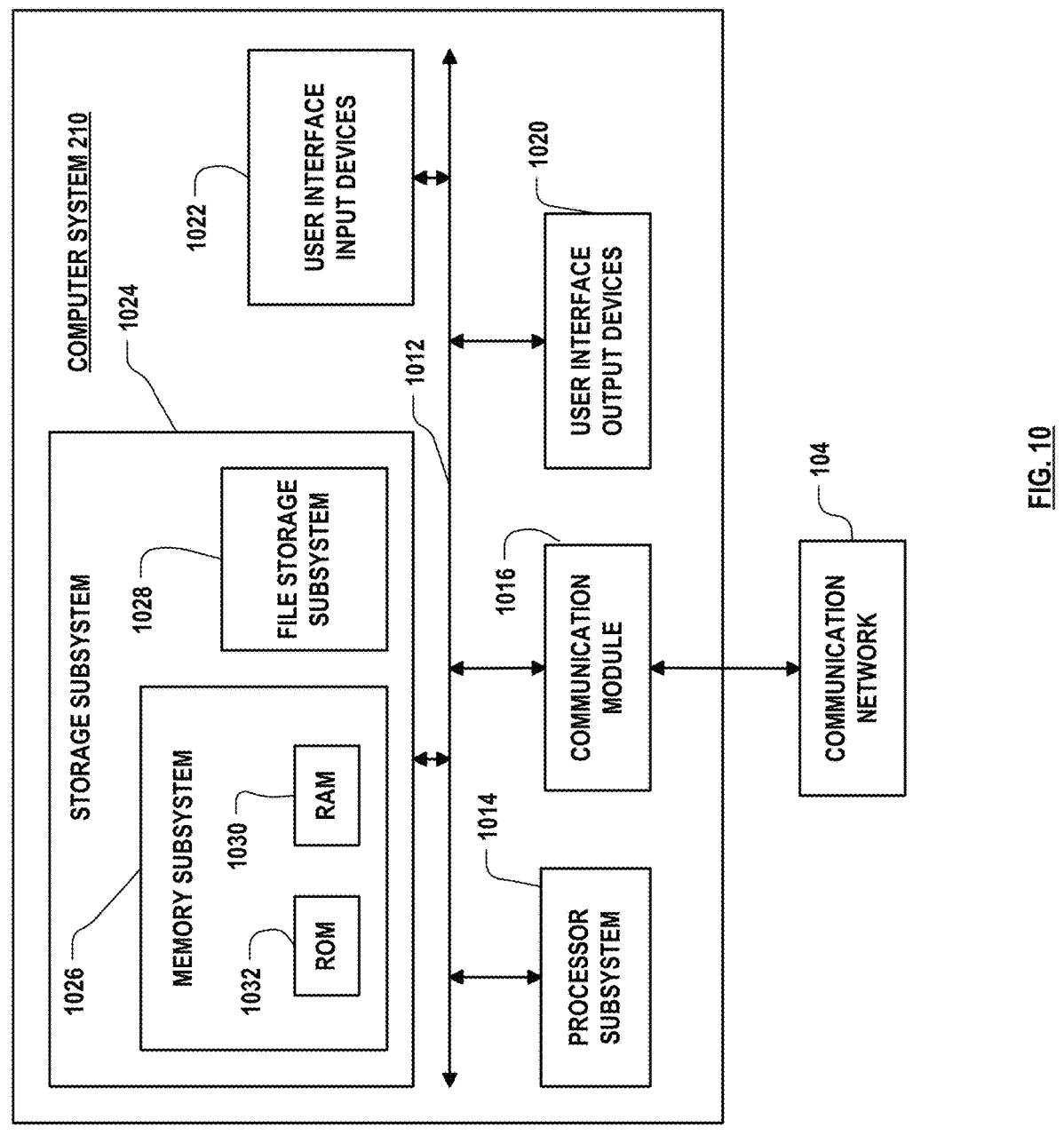
FIG. 10 presents a computer system that implements live data streaming in a collaboration workspace.

FIG. 10 is a simplified block diagram of a computer system, or network node, which can be used to implement the client functions (e.g., computer system 210) or the server-side functions (e.g., server 205) for live streaming of data. A computer system typically includes a processor subsystem 1014 which communicates with a number of peripheral devices via bus subsystem 1012. These peripheral devices may include a storage subsystem 1024, comprising a memory subsystem 1026 and a file storage subsystem 1028, user interface input devices 1022, user interface output devices 1020, and a communication module 1016. The input and output devices allow user interaction with the computer system. Communication module 1016 provides physical and communication protocol support for interfaces to outside networks, including an interface to communication network 204, and is coupled via communication network 204 to corresponding communication modules in other computer systems. Communication network 204 may comprise many interconnected computer systems and communication links. These communication links may be wireline links, optical links, wireless links, or any other mechanisms for communication of information, but typically it is an IP-based communication network, at least at its extremities. While in one embodiment, communication network 204 is the Internet, in other embodiments, communication network 204 may be any suitable computer network.

The physical hardware component of network interfaces is sometimes referred to as network interface cards (NICs), although they need not be in the form of cards: for instance, they could be in the form of integrated circuits (ICs) and connectors fitted directly onto a motherboard, or in the form of macrocells fabricated on a single integrated circuit chip with other components of the computer system.

User interface input devices 1022 may include a keyboard, pointing devices such as a mouse, trackball, touchpad, or graphics tablet, a scanner, a touch screen incorporated into the display (including the touch sensitive portions of large format digital display such as 102c), audio input devices such as voice recognition systems, microphones, and other types of tangible input devices. In general, use of the term "input device" is intended to include all possible types of devices and ways to input information into the computer system or onto computer network 104.

User interface output devices 1020 may include a display subsystem, a printer, a fax machine, or non-visual displays such as audio output devices. The display subsystem may include a cathode ray tube (CRT), a flat panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from the computer system to the user or to another machine or computer system.

Storage subsystem 1024 stores the basic programming and data constructs that provide the functionality of certain embodiments of the present invention.

The storage subsystem 1024 when used for implementation of server nodes, comprises a product including a non-transitory computer readable medium storing a machine-readable data structure including a spatial event map which locates events in a workspace, wherein the spatial event map includes a log of events, entries in the log having a location of a graphical target of the event in the workspace and a time. Also, the storage subsystem 1024 comprises a product including executable instructions for performing the procedures described herein associated with the server node.

The storage subsystem 1024 when used for implementation of client-nodes, comprises a product including a non-transitory computer readable medium storing a machine readable data structure including a spatial event map in the form of a cached copy as explained below, which locates events in a workspace, wherein the spatial event map includes a log of events, entries in the log having a location of a graphical target of the event in the workspace and a time. Also, the storage subsystem 1024 comprises a product including executable instructions for performing the procedures described herein associated with the client node.

For example, the various modules implementing the functionality of certain embodiments of the invention may be stored in storage subsystem 1024. These software modules are generally executed by processor subsystem 1014.

Memory subsystem 1026 typically includes a number of memories including a main random-access memory (RAM) 1030 for storage of instructions and data during program execution and a read only memory (ROM) 1032 in which fixed instructions are stored. File storage subsystem 1028 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer readable medium such as one or more CD-ROMs and may be stored by file storage subsystem 1028. The host memory 1026 contains, among other things, computer instructions which, when executed by the processor subsystem 1014, cause the computer system to operate or perform functions as described herein. As used herein, processes and software that are said to run in or on the "host" or the "computer," execute on the processor subsystem 1014 in response to computer instructions and data in the host memory subsystem 1026 including any other local or remote storage for such instructions and data.

Bus subsystem 1012 provides a mechanism for letting the various components and subsystems of a computer system communicate with each other as intended. Although bus subsystem 1012 is shown schematically as a single bus, alternative embodiments of the bus subsystem may use multiple busses.

The computer system 210 itself can be of varying types including a personal computer, a portable computer, a workstation, a computer terminal, a network computer, a television, a mainframe, a server farm, or any other data processing system or user device. In one embodiment, a computer system includes several computer systems, cach controlling one of the tiles that make up the large format display such as 102c. Due to the ever-changing nature of computers and networks, the description of computer system 210 depicted in FIG. 10 is intended only as a specific example for purposes of illustrating the preferred embodiments of the present invention. Many other configurations of the computer system are possible having more or less components than the computer system depicted in FIG. 10. The same components and variations can also make up each of the other devices 102 in the collaboration environment of FIG. 1, as well as the collaboration server 205 and database 206 as shown in FIG. 1B.

Certain information about the drawing regions active on the digital display 102c are stored in a database accessible to the computer system 210 of the display client. The database can take on many forms in different embodiments, including but not limited to a MongoDB database, an XML database, a relational database, or an object-oriented database.

The applicant hereby discloses in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. The applicant indicates that aspects of the present technology may consist of any such feature or combination of features. In view of the foregoing description, it will be evident to a person skilled in the art that various modifications may be made within the scope of the technology.

The foregoing description of preferred embodiments of the present technology has been provided for the purposes of illustration and description. It is not intended to be exhaustive or to limit the technology to the precise forms disclosed. Obviously, many modifications and variations will be apparent to practitioners skilled in this art. For example, though the displays described herein are of large format, small format displays can also be arranged to use multiple drawing regions, though multiple drawing regions are more useful for displays that are at least as large as 12 feet in width. In particular, and without limitation, any and all variations described, suggested by the Background section of this patent application or by the material incorporated by reference are specifically incorporated by reference into the description herein of embodiments of the technology. In addition, any and all variations described, suggested or incorporated by reference herein with respect to any one embodiment are also to be considered taught with respect to all other embodiments. The embodiments described herein were chosen and described in order to best explain the principles of the technology and its practical application, thereby enabling others skilled in the art to understand the technology for various embodiments and with various modifications as are suited to the particular use contemplated. It is intended that the scope of the technology be defined by the following claims and their equivalents.

What is claimed is:

1. A method providing live streamed content in a collaboration session, the method comprising:

receiving, by a server device, first data from a first client device, the first data comprising a source of the live streamed content and a key associated with the live streamed content to access the live streamed content in a collaboration workspace, wherein the key is unique to the live streamed content and a new key is generated for subsequent live streamed content;

establishing, at the server device, a connection to the source of the live streamed content using the key associated with the live streamed content to access the live streamed content;

receiving, by the server device, the live streamed content from the source of the live streamed content;

sending, by the server device, the live streamed content to the first client device for display in the collaboration workspace;

receiving, by the server device, second data from the first client device, including at least a second user's identifier using a second client device, for sharing the collaboration workspace including the live streamed content;

receiving, by the server device, third data from the second client device, including at least the key, and authorizing display of the live streamed content in the collaboration workspace at the second client device; and sending, by the server device, collaboration data including the live streamed content to the second client device, and causing display of the live streamed content in the collaboration workspace at the second client device.

2. The method of claim 1, further including:

storing, by the server device, the live streamed content received from the source of the live streamed content in a storage linked to the server device;

receiving, by the server device, a request from the first client device to playback a recorded copy of the live streamed content; and sending, by the server device, the stored live streamed content to the first client device to playback the recorded copy of the live streamed content.

3. The method of claim 2, further including:

establishing a leader-follower type collaboration session wherein in the leader-follower type collaboration session, the first client device is a leader and the second client device is a follower; and synchronizing the playback of the recorded copy of the live streamed content at the second client device with the playback of the recording copy of the live streamed content at the first client device.

4. The method of claim 1, further including:

receiving, by the server device, fourth data from the first client device wherein the fourth data includes a starting timestamp and an ending timestamp corresponding to a segment of the live streamed content and an identifier of the live streamed content; and storing, by the server device in a storage linked to the server device, the fourth data identifying the segment of the live streamed content.

5. The method of claim 4, wherein the fourth data includes a segment identifier identifying the segment of the live streamed content, the method further including:

receiving, by the server device, the segment identifier from the first client device;

retrieving, by the server device, from the storage, the segment of the live streamed content by querying the storage using the segment identifier received from the first client device; and sending, by the server device, the retrieved segment of the live streamed content to the first client device for playback in the collaboration workspace.

6. A non-transitory computer readable storage medium impressed with computer program instructions to provide live streamed content in a collaboration session, the instructions, when executed on a processor, implement operations, of a server device, comprising:

receiving, by the server device, first data from a first client device, the first data comprising a source of the live streamed content and a key associated with the live streamed content to access the live streamed content in a collaboration workspace, wherein the key is unique to the live streamed content and a new key is generated for subsequent live streamed content;

establishing, at the server device, a connection to the source of the live streamed content using the key associated with the live streamed content to access the live streamed content;

receiving, by the server device, the live streamed content from the source of the live streamed content;

sending, by the server device, the live streamed content to the first client device for display in the collaboration workspace;

receiving, by the server device, second data from the first client device, including at least a second user's identifier using a second client device, for sharing the collaboration workspace including the live streamed content;

receiving, by the server device, third data from the second client device, including at least the key, and authorizing display of the live streamed content in the collaboration workspace at the second client device; and sending, by the server device, collaboration data including the live streamed content to the second client device, and causing display of the live streamed content in the collaboration workspace at the second client device.

7. The non-transitory computer readable storage medium of claim 6, the operations further comprising:

storing, by the server device, the live streamed content received from the source of the live streamed content in a storage linked to the server device;

receiving, by the server device, a request from the first client device to playback a recorded copy of the live streamed content; and sending, by the server device, the stored live streamed content to the first client device to playback the recorded copy of the live streamed content.

8. The non-transitory computer readable storage medium of claim 7, the operations further comprising:

establishing a leader-follower type collaboration session wherein in the leader-follower type collaboration session, the first client device is a leader and the second client device is a follower; and synchronizing the playback of the recorded copy of the live streamed content at the second client device with the playback of the recording copy of the live streamed content at the first client device.

9. The non-transitory computer readable storage medium of claim 6, the operations further comprising:

receiving, by the server device, fourth data from the first client device wherein the fourth data includes a starting timestamp and an ending timestamp corresponding to a segment of the live streamed content and an identifier of the live streamed content; and storing, by the server device in a storage linked to the server device, the fourth data identifying the segment of the live streamed content.

10. The non-transitory computer readable storage medium of claim 9, wherein the fourth data includes a segment identifier identifying the segment of the live streamed content, the operations further comprising:

receiving, by the server device, the segment identifier from the first client device;

retrieving, by the server device, from the storage, the segment of the live streamed content by querying the storage using the segment identifier received from the first client device; and sending, by the server device, the retrieved segment of the live streamed content to the first client device for playback in the collaboration workspace.

11. A system including one or more processors coupled to memory, the memory loaded with computer instructions to provide live streamed content in a collaboration session, the instructions, when executed on the processors, implement, at a server device, operations comprising:

receiving, by the server device, first data from a first client device, the first data comprising a source of the live streamed content and a key associated with the live streamed content to access the live streamed content in a collaboration workspace, wherein the key is unique to the live streamed content and a new key is generated for subsequent live streamed content;

establishing, at the server device, a connection to the source of the live streamed content using the key associated with the live streamed content to access the live streamed content;

receiving, by the server device, the live streamed content from the source of the live streamed content;

sending, by the server device, the live streamed content to the first client device for display in the collaboration workspace;

receiving, by the server device, second data from the first client device, including at least a second user's identifier using a second client device, for sharing the collaboration workspace including the live streamed content;

receiving, by the server device, third data from the second client device, including at least the key, and authorizing display of the live streamed content in the collaboration workspace at the second client device; and sending, by the server device, collaboration data including the live streamed content to the second client device, and causing display of the live streamed content in the collaboration workspace at the second client device.

12. The system of claim 11, further implementing operations comprising:

storing, by the server device, the live streamed content received from the source of the live streamed content in a storage linked to the server device;

receiving, by the server device, a request from the first client device to playback a recorded copy of the live streamed content; and sending, by the server device, the stored live streamed content to the first client device to playback the recorded copy of the live streamed content.

13. The system of claim 12, further implementing operations comprising:

establishing a leader-follower type collaboration session wherein in the leader-follower type collaboration session, the first client device is a leader and the second client device is a follower; and synchronizing the playback of the recorded copy of the live streamed content at the second client device with the playback of the recording copy of the live streamed content at the first client device.

14. The system of claim 11, further implementing operations comprising:

receiving, by the server device, fourth data from the first client device wherein the fourth data includes a starting timestamp and an ending timestamp corresponding to a segment of the live streamed content and an identifier of the live streamed content; and storing, by the server device in a storage linked to the server device, the fourth data identifying the segment of the live streamed content.

15. The system of claim 14, wherein the fourth data includes a segment identifier identifying the segment of the live streamed content, further implementing operations comprising:

receiving, by the server device, the segment identifier from the first client device;

retrieving, by the server device, from the storage, the segment of the live streamed content by querying the storage using the segment identifier received from the first client device; and sending, by the server device, the retrieved segment of the live streamed content to the first client device for playback in the collaboration workspace.

*    *    *    *    *